(12) United States Patent  
Abe

(10) Patent No.: US 8,103,060 B2  
(45) Date of Patent: Jan. 24, 2012

(54) FEATURE POINT REDUCTION FOR BLOOD VESSEL BIOMETRIC SYSTEM

(75) Inventor: Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 1216 days.

(21) Appl. No.: 11/782,777

(22) Filed: Jul. 25, 2007

(65) Prior Publication Data

US 2008/0037834 A1    Feb. 14, 2008

(30) Foreign Application Priority Data

Jul. 28, 2006 (JP) ................................. 2006-207033
Feb. 26, 2007 (JP) ................................. 2007-046089

(51) Int. Cl.
  *G06K 9/00* (2006.01)
  *G06K 9/46* (2006.01)
(52) U.S. Cl. ......... 382/115; 382/125; 382/190; 382/201
(58) Field of Classification Search ........................ None
  See application file for complete search history.

(56) References Cited

U.S. PATENT DOCUMENTS

| | | | | |
|---|---|---|---|---|
| 6,072,895 A | * | 6/2000 | Bolle et al. .................... | 382/125 |
| 6,301,375 B1 | | 10/2001 | Choi | |
| 7,769,209 B2 | * | 8/2010 | Komura et al. ................ | 382/115 |
| 7,835,546 B2 | * | 11/2010 | Abe ............................... | 382/115 |
| 2002/0031245 A1 | * | 3/2002 | Rozenberg et al. ............ | 382/125 |
| 2009/0080718 A1 | * | 3/2009 | Abe ............................... | 382/125 |
| 2010/0208947 A1 | * | 8/2010 | Muquit et al. ................. | 382/115 |
| 2010/0226558 A1 | * | 9/2010 | Muquit et al. ................. | 382/134 |

FOREIGN PATENT DOCUMENTS

JP    10-295674    11/1998

OTHER PUBLICATIONS

Nadort, A. (May 2007) "The hand vein pattern used as a biometric feature." Masters thesis, Vrije Universiteit.*
Wang et al. (2007) "Minutiae feature analysis for infrared hand vein pattern biometrics." Pattern Recognition, vol. 41 pp. 920-929.*

* cited by examiner

*Primary Examiner* — Bhavesh Mehta
*Assistant Examiner* — Barry Drennan
(74) *Attorney, Agent, or Firm* — Finnegan, Henderson, Farabow, Garrett & Dunner, L.L.P.

(57) ABSTRACT

To suitably reduce data amount. For example, feature points from a branch point or an end point to the next branch point or an end point in a blood vessel line are set as a group. In the three feature points satisfying one of the condition that the absolute value of the outer product of vectors in continuous three feature points is smaller than an outer product threshold value, and the condition that a cosine in the above three feature points is smaller than a cosine threshold value, the middle one of the three feature points satisfying the other of the above conditions and being the smallest is eliminated, for every group.

14 Claims, 43 Drawing Sheets

IN CASE OF
ISOLATED POINT

IN CASE OF
BRANCH POINT

IN CASE OF
END POINT

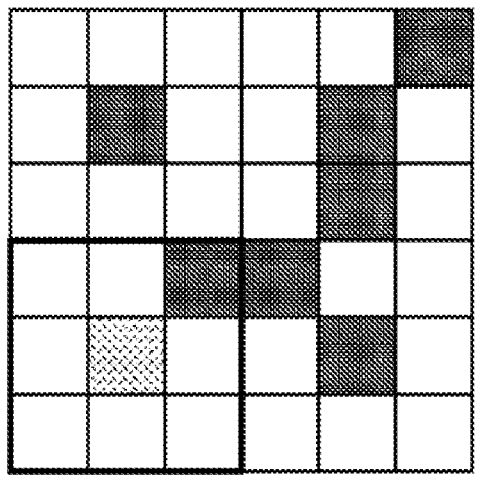
FIG. 4A  END POINT
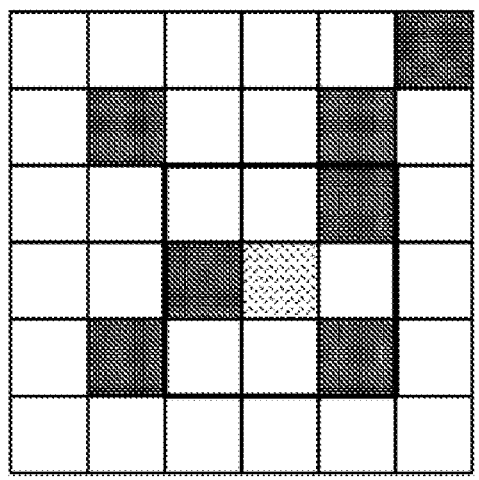
FIG. 4B  BRANCH POINT
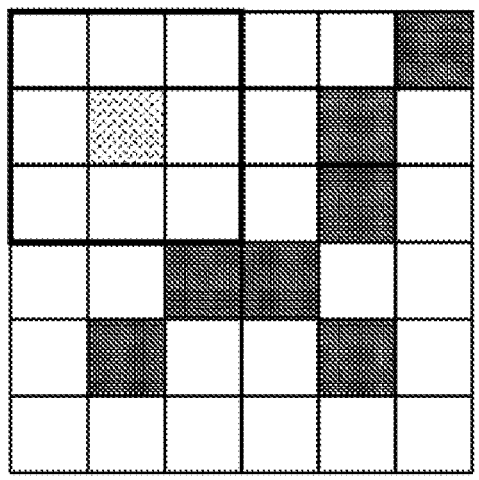
FIG. 4C  ISOLATED POINT

IN CASE OF POINT
ON STRAIGHT LINE

IN CASE OF CURVE POINT

FIG. 9A HORIZONTAL DIRECTION

FIG. 9B VERTICAL DIRECTION

FIG. 9C DIAGONAL DIRECTION

FIG. 14A  IN CASE WHERE EFFECT IS SMALL

FIG. 14B  IN CASE WHERE EFFECT IS LARGE

FIG. 31A
BEFORE EXTRACTION 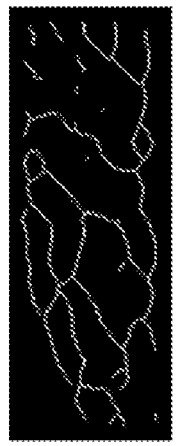 AFTER EXTRACTION 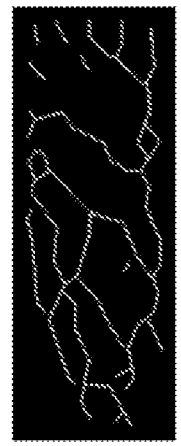
FIG. 31B
BEFORE EXTRACTION 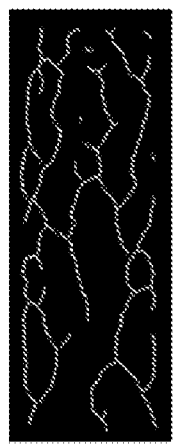 AFTER EXTRACTION 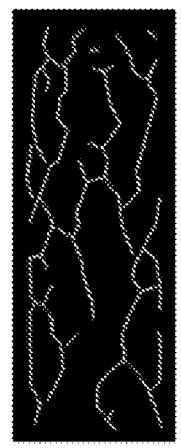
FIG. 31C
BEFORE EXTRACTION  AFTER EXTRACTION 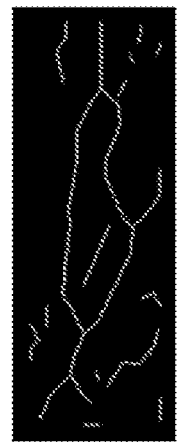

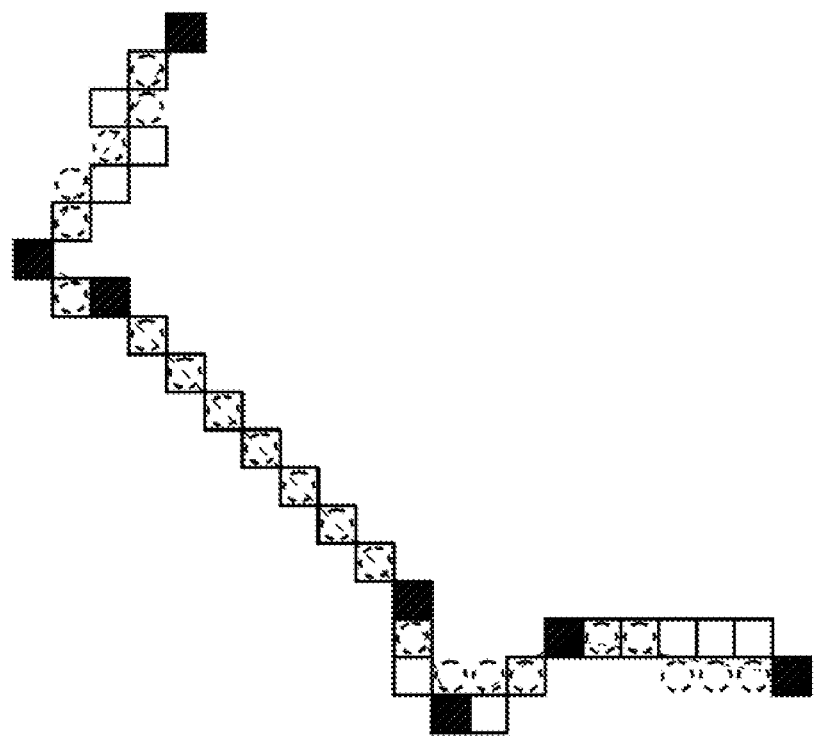
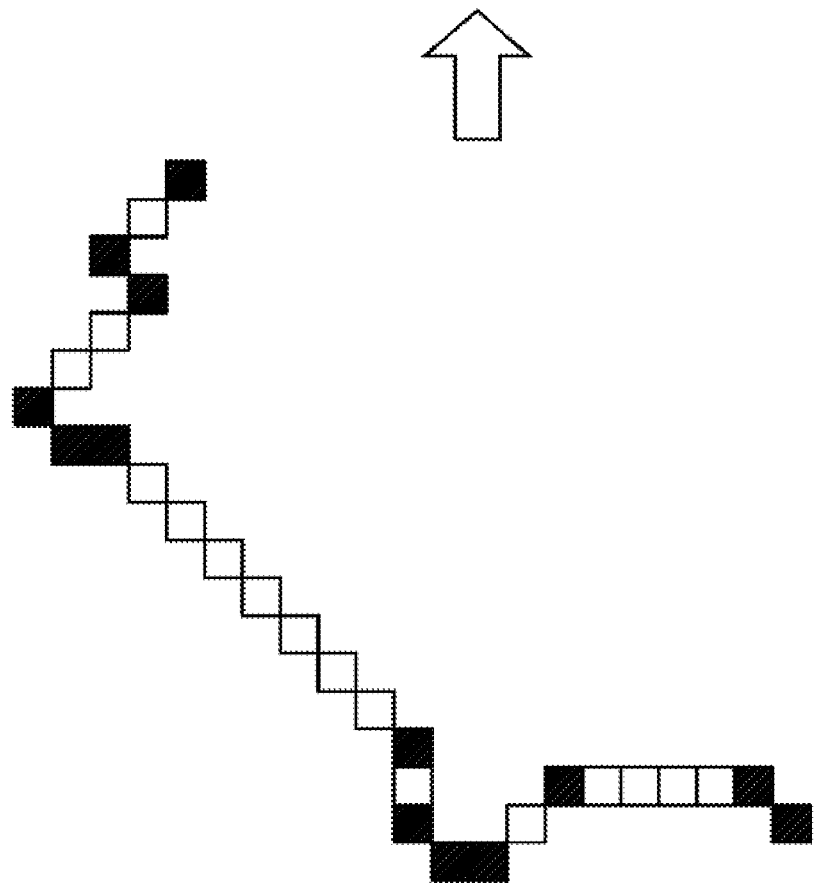
FIG. 35

FIG. 38A  IN CASE OF END POINT

FIG. 38B  IN CASE OF BRANCH POINT

FIG. 38C  IN CASE OF ISOLATED POINT

FEATURE POINT REDUCTION FOR BLOOD VESSEL BIOMETRIC SYSTEM

CROSS REFERENCE TO RELATED APPLICATION

The present invention contains subject matter related to Japanese Patent Applications JP 2007-046089 filed in the Japanese Patent Office on Feb. 26, 2007 and JP 2006-207033 filed on Jul. 28, 2006, the entire contents of which being incorporated herein by reference.

BACKGROUND OF THE INVENTION

1. Field of the Invention

The present invention relates to an image processing method, an image processing apparatus and a program therefor, and is applicable to a case of performing biometrics authentication, for example.

2. Description of the Related Art

Heretofore, as an object of biometrics authentication, there is a blood vessel. Generally, an authentication apparatus registers the image of blood vessels obtained by imaging in a memory as information to identify the living body that was imaged at the time, or determines whether or not the imaged person is the said registered person by comparing with the above registered image of blood vessels.

By the way, in recent years, reducing data amount when in registering data in a memory or the like has been desired. As a countermeasure to this, there has been a technique to register only a feature point (position) in blood vessels in the above image, without registering the image of the blood vessels (Japanese Patent Laid-Open No. 1998-295674, for example). As a concrete technique to extract a feature point from a blood vessel, there is a technique called Harris Corner, for example.

SUMMARY OF THE INVENTION

However, in the above technique, also a point at a gentle curve part in a blood vessel is extracted as a corner. Therefore, a point not becoming a feature component is often extracted, and it also often becomes insufficient in the amount of data reduction. More particularly, this problem clearly exists as the image quality of a camera for imaging a blood vessel becomes higher.

On the other hand, in the blood vessel in the same image, if too many points are eliminated, a meaning as identification information may be lost. Therefore, a technique which can properly extract a point as a feature component of a blood vessel without losing a meaning as identification information is desired.

In view of the foregoing, it is desirable to provide an image processing method, an image processing apparatus and a program therefor in that information amount can be suitably reduced.

According to an embodiment of the present invention, there is provided an image processing method, an image processing apparatus and a program therefor that eliminate a feature point being a feature as a component of an outline, in the outlines of an object included in the image of inputted image data, and in a branch point, en end point, and a curve point detected as the feature point of the outline, feature points from a branch point or an end point to the next branch point or an end point are assigned as a group. By assigning the feature points from a branch point or an end point to the next branch point or an end point as a group as the above, processing of the outline can be performed in a segment unit without branching. Then, the middle one of the three feature points satisfying the condition that the product of vectors in the continuous three feature points is smaller than a predetermined threshold value and being the smallest is eliminated, for every said group.

Because the size of the area of a parallelogram formed by continuous three feature points is simply added in consideration, the middle of the feature points in that the linearity of the segment connecting the three feature points is high can be accurately selected as an elimination object. Thereby, the feature point can be eliminated so that the outline after elimination becomes simple (smooth), as well as approximating the forms of the outline before elimination and the outline after elimination.

In addition to this, since a feature point at the part that most have the linearity in the feature points in a group is set as a sole elimination object, a feature point being an elimination object can be selected from a general viewpoint not locally, in comparison with the case of adopting the processing that watches the above two conditions at the same time, and eliminates a corresponding feature point every time when the above condition is satisfied. Thus, a feature point can be further accurately eliminated.

Furthermore, the two feature points satisfying the condition that a segment connecting continuous two feature points is smaller than a predetermined segment threshold value is replaced to either an inner dividing point that internally divides the segment at the rate of a first area that is formed by the above two feature points and a feature point connected to one of the two feature points, to a second area that is formed by the above two feature points and a feature point connected to the other of the two feature points, or the intersection of a prolongation line that connects one of the above two feature points and a feature point connected to this, and a prolongation line that connects the other of the above two feature points and a feature point connected to this, for every group. By generating a new feature point with adding in consideration the position of a feature point connected to the two feature points without only simply aiming at two feature points forming a short segment, a feature point can be eliminated so that the outline of an object after elimination becomes simple (smooth), as well as approximating the forms of the outline before elimination and the outline after elimination.

According to an embodiment of the present invention, an image processing method, an image processing apparatus and a program therefor in that information amount can be suitably reduced by eliminating a feature point so that the outline of an object becomes simple (smooth) as well as approximating the forms of the outline before elimination and the outline after elimination can be realized.

The nature, principle and utility of the present invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4A to 4C are schematic diagrams for explaining the direction of an end point, a branch point and an isolated point;

FIGS. 9A to 9C are schematic diagrams showing the search order patterns of a pixel in tracking;

FIGS. 31A to 31C are schematic diagrams showing blood vessel images before and after feature point extraction processing (1);

FIG. 35 is a schematic diagram showing a curve point before elimination and after elimination;

DETAILED DESCRIPTION OF THE EMBODIMENT

Figure 1:
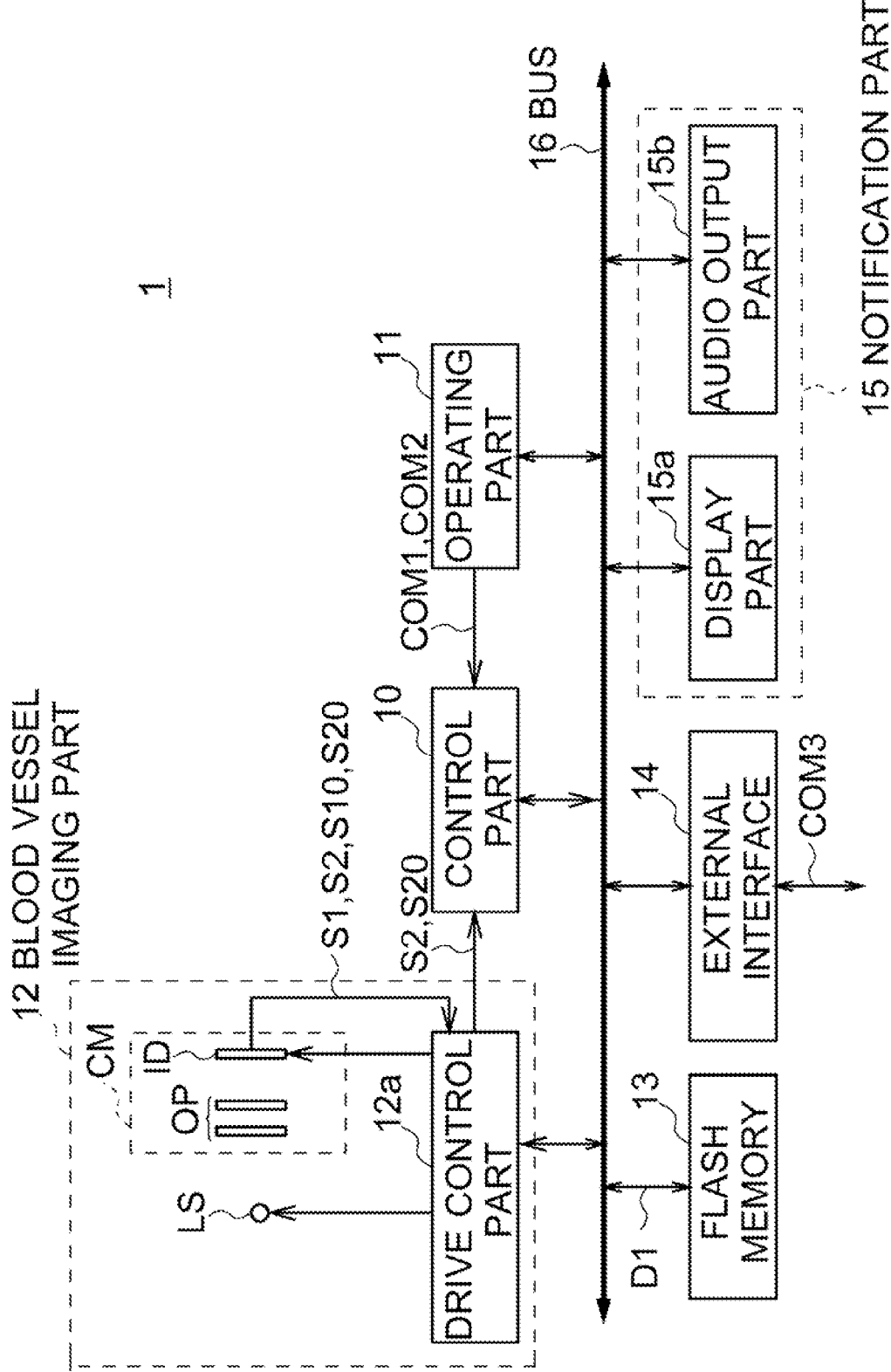
FIG. 1 is a block diagram showing the overall configuration of an authentication apparatus according to this embodiment.

Preferred embodiments of the present invention will be described with reference to the accompanying drawings:

(1) Overall Configuration of Authentication Apparatus According to this Embodiment FIG. 1 shows the overall configuration of an authentication apparatus according to this embodiment. The authentication apparatus 1 is formed by that an operating part 11, a blood vessel imaging part 12, a flash memory 13, an interface for transmitting/receiving data to/from an external apparatus (hereinafter, this is referred to as an external interface) 14 and a notification part 15 are connected to a control part 10 respectively via a bus 16.

The control part 10 is a microcomputer including a central processing unit (CPU) for controlling the whole authentication apparatus 1, a read only memory (ROM) in that various programs and set information are stored, and a random access memory (RAM) serving as a work memory for the above CPU.

To the control part 10, an execution command COM1 in a mode to register the blood vessels of a user to be registered (hereinafter, this is referred to as a registering person) (hereinafter, this is referred to as a blood vessel registration mode) or an execution command COM2 in a mode to determine the presence of the said registering person (hereinafter, this is referred to as an authentication mode) is supplied from the operating part 11, according to the user's operation.

The control part 10 determines a mode to be executed based on the above execution commands COM1, COM2. Based on a program corresponding to this determination result, the control part 10 properly controls the blood vessel imaging part 12, the flash memory 13, the external interface 14 and the notification part 15, to execute the blood vessel registration mode or the authentication mode.

(1-1) Blood Vessel Registration Mode

In the case where the control part 10 determined the blood vessel registration mode as a mode to be executed, the control part 10 shifts an operating mode to the blood vessel registration mode, and controls the blood vessel imaging part 12.

In this case, a drive control part 12a in the blood vessel imaging part 12 performs the drive control of one or more near infrared light sources LS for emitting near infrared lights to a predetermined position in the authentication apparatus 1, and an image pickup device ID for example being a charge coupled device (CCD) in an imaging camera CM.

When a finger is disposed at a predetermined, near infrared lights emitted from the near infrared light source LS passes through the inside of the finger as reflected and dispersed, and is emitted to the image pickup device ID via an optical system OP, as lights projecting the blood vessels of the finger (hereinafter, this is referred to as a blood vessel projecting light). The image pickup device ID performs optical/electrical conversion to the blood vessel projecting lights, and transmits the result of the above optical/electrical conversion to the drive control part 12a as an image signal S1.

In this connection, practically, some of the near infrared lights emitted to the finger are reflected on the surface of the above finger and then are emitted to the image pickup device ID. Therefore, the image of the image signal S1 outputted from the image pickup device ID becomes the state that the outline of the finger and the fingerprint are also included, in addition to the blood vessels inside the finger.

The drive control part 12a adjusts the lens position of an optical lens in the optical system OP so as to focus on the blood vessels inside the finger, based on the pixel value of this picture, and also adjusts an exposure time to the image pickup device ID so that an amount of incident light to be entered into the image pickup device ID becomes an adaptive amount. After the above adjustment, the drive control part 12a supplies an image signal S2 outputted from the image pickup device ID to the control part 10.

The control part 10 sequentially performs edge processing, smoothing processing, binary processing and line thinning processing to the image signal S2, to extract the blood vessels included in a picture in the above image signal S2. Then, in the blood vessel, the control part 10 executes the processing for extracting a point being a feature as a component of the above blood vessel (hereinafter, this is referred to as a feature point) (hereinafter, this is referred to as feature point extraction processing). Thus obtained information showing a plurality of feature points (hereinafter, this is referred to as position information) and information showing the connection relationship of these feature points (hereinafter, this is referred to as phase information) is stored in the flash memory 13 as registration data D1.

In this manner, the control part 10 can execute the blood vessel registration mode.

(1-2) Authentication Mode

On the other hand, in the case where the control part 10 determined the authentication mode as a mode to be executed, the control part 10 shifts to the authentication mode, and controls the blood vessel imaging part 12, similarly to the case of the aforementioned blood vessel registration mode.

In this case, the blood vessel imaging part 12 performs the drive control of the near infrared light source LS and the image pickup device ID, and also adjusts the lens position of the optical lens in the optical system OP and the exposure time of the image pickup device ID, based on an image signal S10 outputted from the above image pickup device ID. After the above adjustment, the blood vessel imaging part 12 supplies an image signal S20 outputted from the image pickup device ID to the control part 10.

The control part 10 performs edge processing, smoothing processing, binary processing and line thinning processing similar to the aforementioned blood vessel registration mode to the image signal S20, to extract the blood vessels included in the picture of the image signal S20.

Further, the control part 10 reads the registration data D1 registered in the flash memory 13, and restores the blood vessels based on the position information and phase information in the above registration data D1.

Then, the control part 10 compares these restored blood vessels with the blood vessels extracted from the image signal S20, and determines whether or not the user who put on his/her finger at the time is a registered person (regular user), according to the degree of the above comparison.

Here, when the user was determined to be the registered person, the control part 10 generates an execution command COM3 to make an operation processing apparatus connected to the external interface 14 (not shown) perform a predetermined operation, and transfers this to the operation processing apparatus via the external interface 14.

As an embodiment of this operation processing apparatus connected to the external interface 14, for example, in the case of adopting a door in a locked state, the control part 10 transfers the execution command COM3 to make the door perform an unlocking operation to the door. Further, as other embodiment of the operation processing apparatus, in the case of adopting a computer in the state that a part of operation mode has been restricted in a plurality of operation modes, the control part 10 transfers the execution command COM3 to make the computer release the restricted operation mode to the computer.

Note that, two examples have been given as the embodiments, the present invention is no only limited to this but also other embodiments can be suitably selected. Further, in this embodiment, it has dealt with case where the operation processing apparatus is connected to the external interface 14. However, the configuration of software and hardware in the operation processing apparatus may be built in the authentication apparatus 1.

On the contrary, when the user was determined not to be the registered person, the control part 10 displays that thing on a display part 15a in the notification part 15, and also performs audio output through an audio output part 15b in the notification part 15. Thereby, that the user was determined not to be the registered person is notified visually and by hearing.

In this manner, the control part 10 can execute the authentication mode.

(2) Concrete Processing Contents of First Feature Point Extraction Processing

Next, as the feature point extraction processing by the control part 10 executed in the registration mode, two concrete processing contents will be given in this embodiment. First, the concrete processing contents of first feature point extraction processing will be described.

Figure 2:
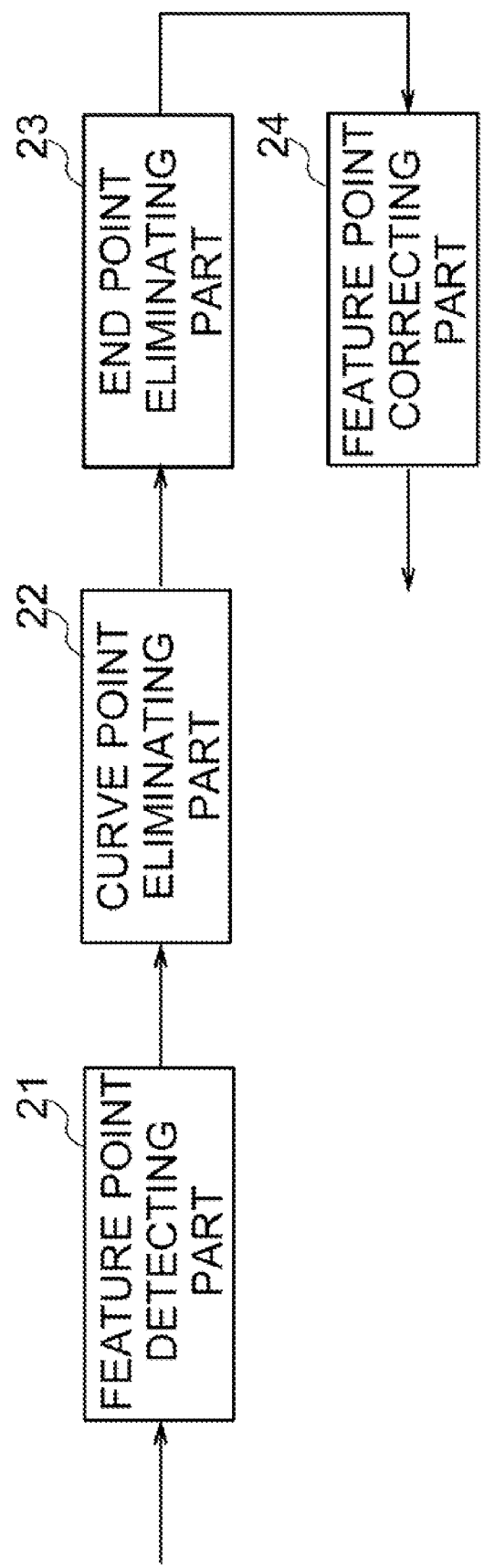
FIG. 2 is a block diagram showing the functional configuration of first feature point extraction processing.

As shown in FIG. 2, functionally, the first feature point extraction processing can be divided into a feature point detecting part 21, a curve point eliminating part 22, an end point eliminating part 23 and a feature point correcting part 24 respectively. Each of these feature point detecting part 21, curve point eliminating part 22, and end point eliminating part 23 and feature point correcting part 24 will be described in detail below.

(2-1) Detection of Feature Point

To the feature point detecting part 21, the processing result of the edge processing, smoothing processing, binary processing and line thinning processing to the image signal S2 outputted from the image pickup device ID (FIG. 1) is supplied as image data. The blood vessels included in the image of this image data are set to black pixels or the opposite white pixels by the binary processing, and their width (thickness) is set to "1" by the line processing.

This thing that the blood vessel width is "1" means that the blood vessel width is one pixel, that is, as a result that a line width in the image data was set to one pixel, a parameter (the number of pixels) in the orthogonal direction to the circulating direction of the blood vessels is fixed to a minimum unit, and the blood vessel was represented by a "line".

The detection processing of a feature point on this blood vessel in one pixel width (hereinafter, this is referred to as a blood vessel line) will be described below by separating stages. However, in this embodiment, it will be described by assuming the pixels of the blood vessel as black pixels.

(2-1-1) First Stage

As a first stage, the feature point detecting part 21 detects a branch point and an end point to be said as the essence of a feature in a blood vessel line, from pixels forming the blood vessel line (black pixels).

Concretely, in each of pixels forming an inputted image (image data), the feature point detecting part 21 sets a pixel (black pixels) other than a background pixel (white pixel) as an aimed pixel in a predetermined order, and checks the number of black pixels existing in the pixels in the neighborhood of the above aimed pixel (the total eight pixels of the four pixels in the upper, lower, right and left directions and the four pixels in the diagonal directions).

Figure 3C:
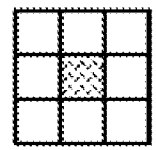
FIGS. 3A to 3C are schematic diagrams showing the appearance patterns of black pixels in the neighborhood of an end point, a branch point and an isolated point.
Figure 3B:
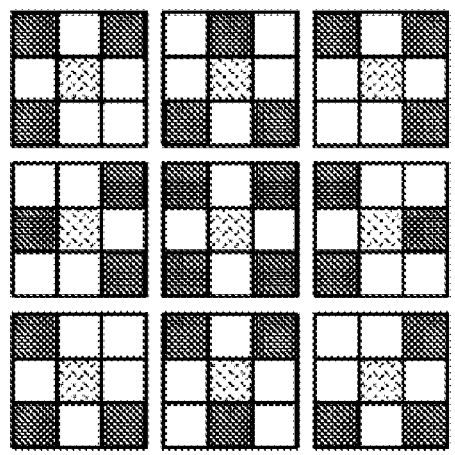
Figure 3A:
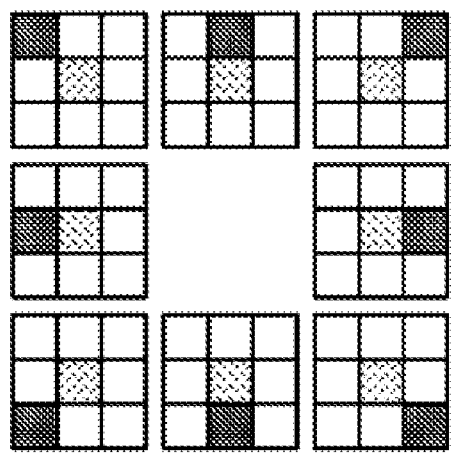

Here FIGS. 3A to 3C show the appearance patterns of a black pixel existing in an end point, a branch point and an isolated point in a blood vessel line, and in pixels in the neighborhood of them. As also obvious from FIGS. 3A to 3C, in the case where blood vessels are represented in one pixel width, the relationship between and end point, a branch point, and a isolated point in the blood vessel (that is, the blood vessel line), and the "number" of black pixels in the neighborhood of them becomes significant, and as a branch pattern, it typically becomes either three branches or four branches.

For example, as shown in FIGS. 4A to 4C, in the case where one black pixel exists in the neighborhood of a aimed pixel (FIG. 4A, the feature point detecting part 21 detects the aimed pixel as the end point of the blood vessel line. In the case where three black pixels exist in the neighborhood of a aimed pixel (FIG. 4B), or the case where four black pixels exist in the neighborhood of a aimed pixel (not shown), the feature point detecting part 21 detects the aimed pixel as a branch point. And in the case where a black pixel does not exist in the neighborhood of a aimed pixel (FIG. 4C), the feature point detecting part 21 detects the aimed pixel as an isolated point.

Then, in thus detected end point, branch point and isolated point, the feature point detecting part 21 eliminates the isolated point that will not be a component of the blood vessel line.

In this manner, in the first stage, the feature point detecting part 21 detects an end point and a branch point in a blood vessel line, according to the number of black pixels existing in the neighborhood of the black pixel set as a aimed pixel.

(2-1-2) Second Stage

Next, as a second stage, the feature point detecting part 21 detects a curve point from the pixels forming the blood vessel line (black pixels), based on the end point and branch point detected in the first stage.

For example, in the case shown in FIG. 5, the feature point detecting part 21 sets a branch point DP1 as the start point, and sets other feature points appearing following the above branch point DP1 set as the start point (end point EP1, end point EP2, branch point DP2) as the finish point (hereinafter, this is referred to as a partial blood vessel line). Similarly, the feature point detecting part 21 tracks a partial blood vessel line, by setting the branch point DP2 as the start point, and setting other feature points (end point EP3), end point EP4) appearing following the above the branch pint DP2 set as the start point as the finish point.

Figure 5:
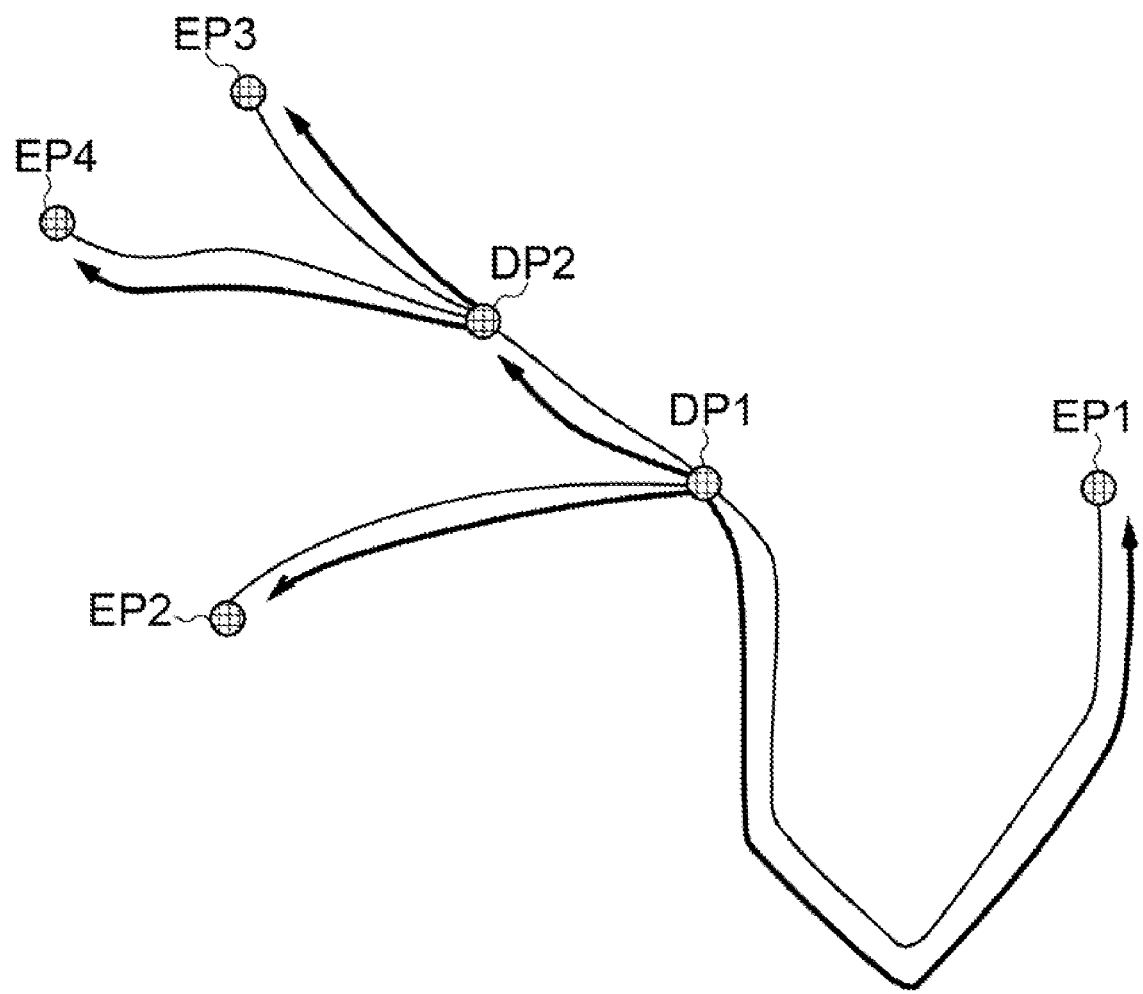
FIG. 5 is a schematic diagram for explaining the detection of a curve point based on an end point and a branch point.

In the example of this FIG. 5, the branch points DP1, DP2 are set as the start points, however, an end point may be set as the start point. In this connection, as also obvious from FIG. 5, an end point only can be typically either one of the start point and the finish point. However, a branch point can be typically one or both of the start point and the finish point in overlap.

Figure 6:
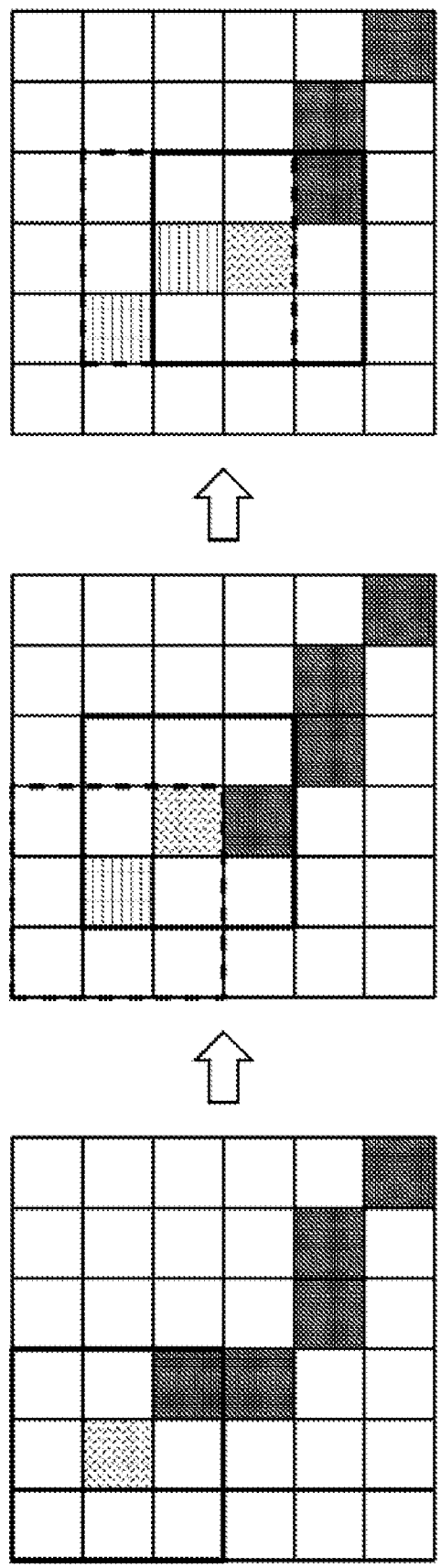
FIG. 6 is a schematic diagram for explaining the tracking rough line of a black pixel.

Here, FIG. 6 shows a concrete tracking scheme. In this FIG. 6, the feature point detecting part 21 sequentially tracks continuous black pixels, from the start point to the finish point of the black pixel existing in the neighborhood of the present aimed pixel, by setting a black pixel other than the black pixel that was set gas a aimed pixel before (pixel represented by horizontal hatching) in the black pixels existing in the neighborhood of the present aimed pixel (pixel represented by net hatching).

Figure 7A:
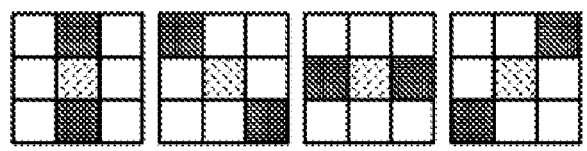
FIGS. 7A and 7B are schematic diagrams showing the appearance patterns of black pixels in the neighborhood of a point on a straight line and a curve point.
Figure 7B:
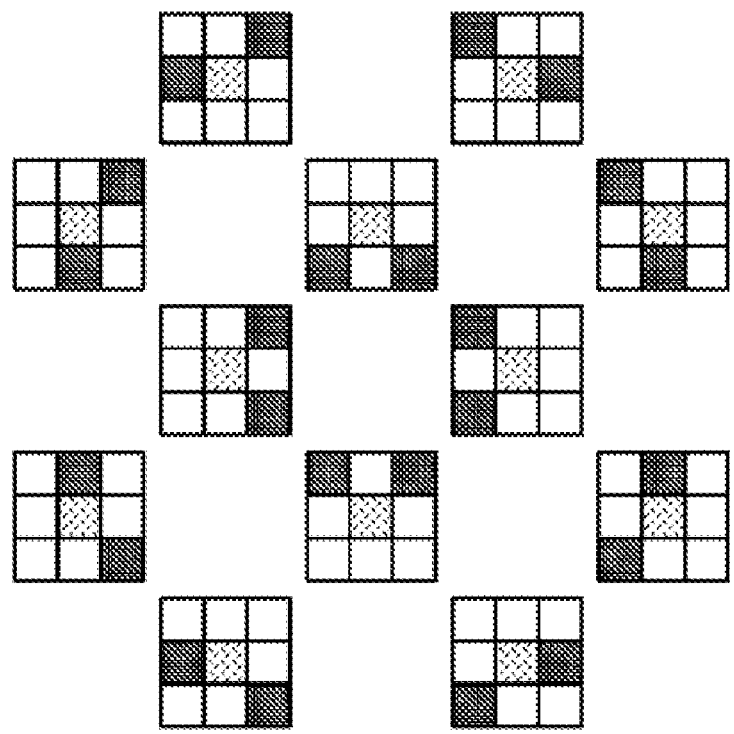

Since this continuous black pixels (partial blood vessel line) is a blood vessel line from a branch point or an end point to the next branch point or an end point, a branch does not exist. Therefore, an aimed pixel typically becomes a point on a straight line or a curve point. In this connection, FIGS. 7A and 7B show the appearance patterns of black pixels in the neighborhood of the point on a straight line and the curve point.

Figure 8:
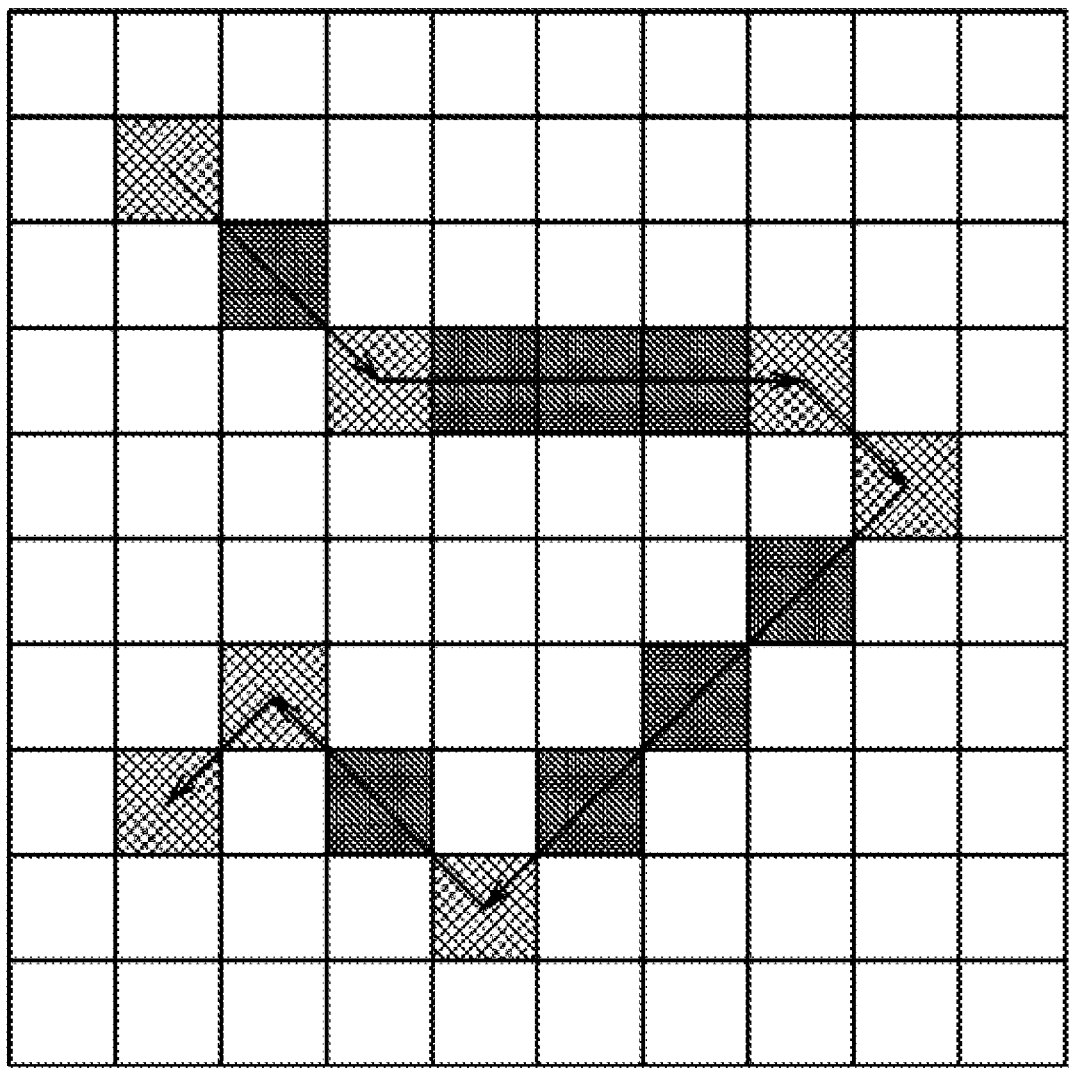
FIG. 8 is a schematic diagram for explaining the detection of a curve point.

For example, as shown in FIG. 8, in the tracking process between the start point and the finish point (pixels represented by diagonal check hatching), if the linearity of the black pixels before the present aimed pixel is lost from the black pixel set as the next aimed pixel, the feature point detecting part 21 detects the above present aimed pixel as a curve point (pixel represented by check hatching).

If reaching to the finish point soon, the feature point detecting part 21 assigns the feature points from the start point via the curve point to the finish point in this partial blood vessel line as a group.

In this manner, in the second stage, the feature point detecting part 21 tracks the blood vessel line for every partial blood vessel line from a branch point or an end point to the next branch point or an end point, and detects the position that the direction of the above tracking changes as a curve point. And also the feature point detecting part 21 assigns these feature points from the start point via the curve point to the finish point in the partial blood vessel line as a group.

In the case of this embodiment, as shown in FIGS. 7A and 7B, it is considered that the appearance patterns in the neighborhood of a point on a straight line and a curve point becomes significant. In the feature point detecting part 21, a tracking order pattern for a pixel in the neighborhood of a aimed pixel is set according to the positional relationship between the present aimed pixel and the pixel that was the aimed pixel preceding to it (hereinafter, this is referred to as an immediately-before aimed pixel).

Concretely, as shown in FIGS. 9A to 9C, tracking order patterns are respectively set in the cases where an immediately-before aimed pixel (pixel represented by horizontal hatching) is positioned in the horizontal direction, the vertical direction and the diagonal direction to the present aimed pixel, (pixel represented by net hatching). As also obvious from FIGS. 7A to 7B, in the cases where the immediately-before aimed pixel is positioned in the horizontal direction or the vertical direction to the present aimed pixel (FIGS. 9A, 9B), in a blood vessel line in one pixel width, the positions that appears next black pixel become a pixel Po1 facing to the immediately-before aimed pixel, and pixels Po2, Po3 adjacent to the pixel Po1. Therefore, in the tracking order pattern in this case, the above pixel Po1 us set to the first, and the pixels Po2, Po3 adjacent to the pixel Po1 are set to the second and the third.

On the other hand, as also obvious from FIGS. 7A and 7B, in the case where the immediately-before aimed pixel is positioned in the diagonal direction to the present aimed pixel (FIG. 9C), in a blood vessel line in one pixel width, in addition to the pixel Po1 facing to the immediately-before aimed pixel and the pixels Po2, Po3 adjacent to the pixel, the positions that appears next become pixels Po4, Po5 adjacent to the pixels Po2, Po3. Therefore, in the tracking order pattern in this case, the above pixel Po1 is set to the first, the pixels Po2, Po3 adjacent to the pixel Po1 are set to the second and the third, and the pixels Po4, Po5 adjacent to the pixels Po2, Po3 are set to the fourth and the fifth.

Figure 10:
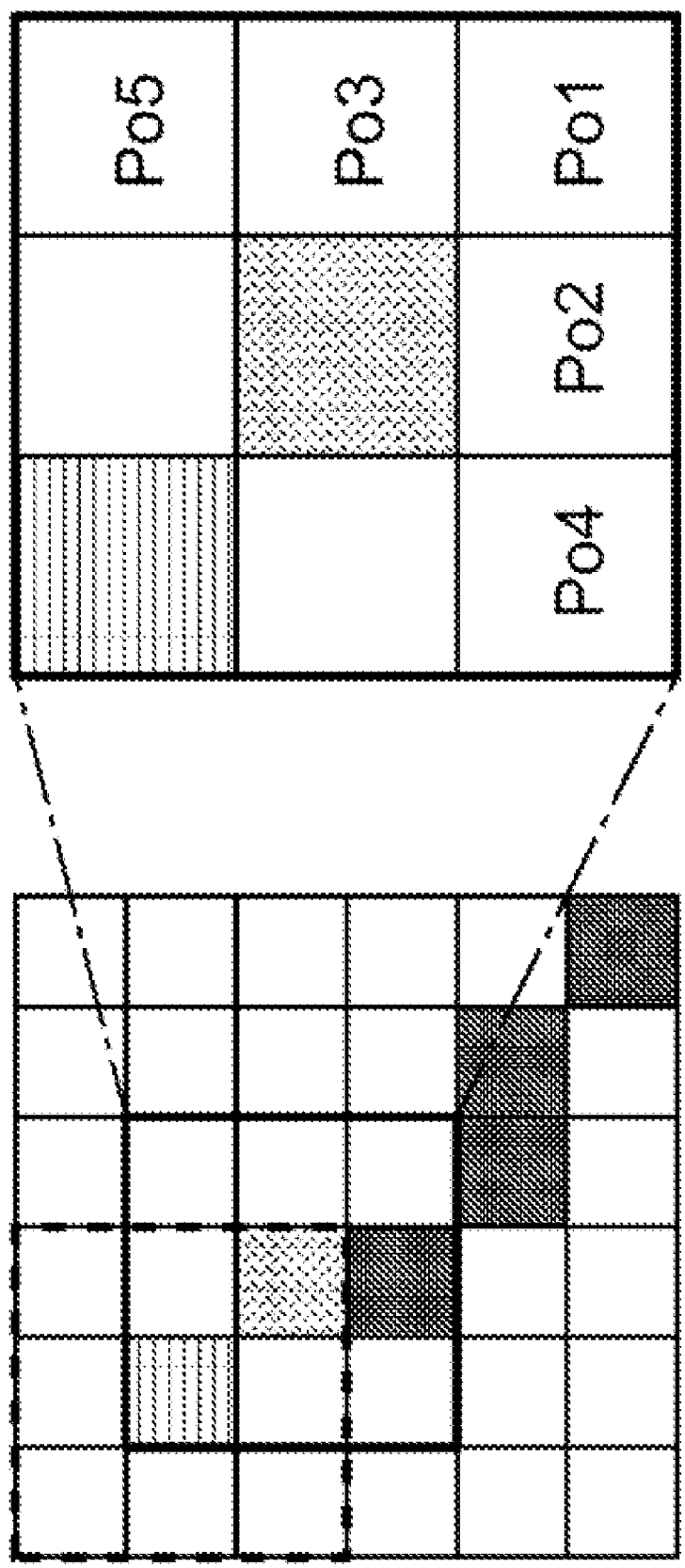
FIG. 10 is a schematic diagram for explaining the search of a black pixel.

In these tracking order patterns, for example, as shown in FIG. 10, in the case where the immediately-before aimed pixel is positioned in the diagonal direction to the present aimed pixel, the feature point detecting part 21 selects a corresponding tracking order pattern, and tracks a black pixel from a part in the neighborhood of the present aimed pixel in the order of this tracking order pattern.

In this manner, the feature point detecting part 21 tracks a part of pixels in the neighborhood of the present aimed pixel in the order according to the positional relationship between the present aimed pixel and the immediately-before aimed pixel. Thereby, a curve point can be detected at a higher speed, in comparison with the case of uniformly tracking all of the pixels in the neighborhood of the above present aimed pixel.

(2-2) Elimination of Curve Point

The curve point eliminating part 22 eliminates a curve point as the occasion demands, by setting feature points from the start point via a curve point to the finish point in a partial blood vessel line that have been assigned as a group by the feature point detecting part 21 (hereinafter, this is referred to as a partial blood vessel forming sequence) as a processing unit.

Figure 11:
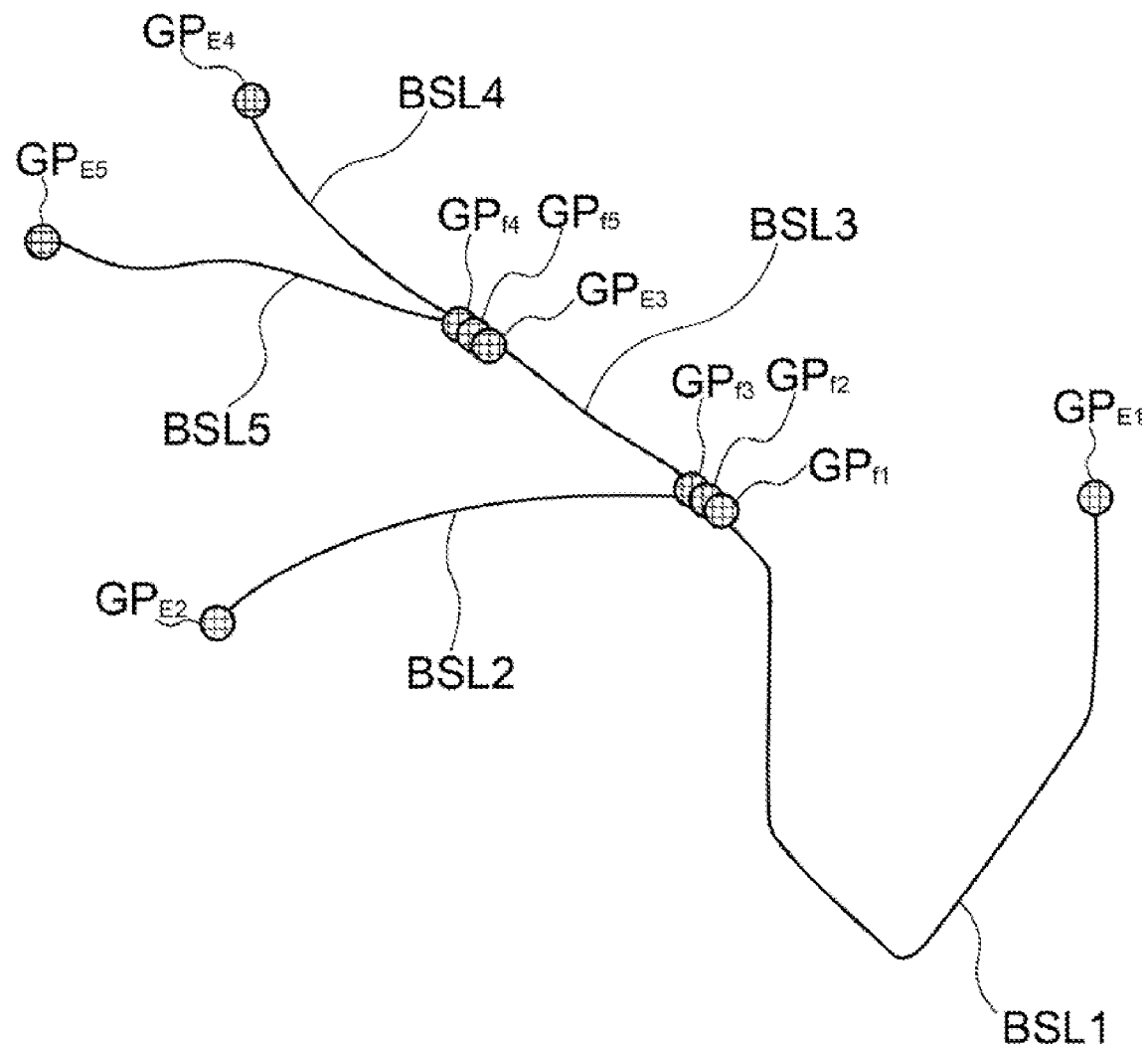
FIG. 11 is a schematic diagram for explaining the processing unit of curve point elimination.

In the case of using the blood vessel line in FIG. 5 as an example, as shown in FIG. 11, the partial blood vessel forming sequence is formed by the start point (branch point) $GP_{f1}$ and finish point (end point $GP_{E1}$ in a partial blood vessel line $BSL_1$, a curve point between the above start point and finish point (not shown), the start point (branch point) $GP_{f2}$ and the finish point (end point) $GP_{E2}$ in a partial blood vessel line $BSL_2$, a curve point between the above start point and finish point (not shown), the start point (branch point) $GP_{f2}$ and the finish point (end point) $GP_{E2}$ in a partial blood vessel line $BSL_3$, a curve point between the above start point and finish point (not shown), the start point (branch point) $GP_{f4}$ and the finish point (end point) $GP_{E4}$ in a partial blood vessel line $BSL_4$, a curve point between the above start point and finish point (not shown), and the start point (branch point) $GP_{f5}$ and the finish point (end point) $GP_{E5}$ in a partial blood vessel line $BSL_5$, and a curve point between the above start point and finish point (not shown). The curve points in these partial blood vessel forming sequences are eliminated as the occasion demands. In this connection, although the branch points $GP_{f1}$, $GP_{f2}$, and $GP_{f3}$, $GP_{f4}$ and $GP_{f5}$ in this FIG. 11 are the same as position (coordinate) information, they belong different groups. Thus, they are shown by separating for convenience.

Because the contents of the elimination processing of the curve points in these partial blood vessel forming sequence are the same, the above contents will be described about each stage, by limiting to the case where a certain partial blood vessel forming sequence is a processing object.

(2-2-1) First Stage

First, as a first stage, in the case where either one or both of the start point and the finish point in a partial blood vessel forming sequence are branch points, if there is a curve point in the neighborhood of the branch point, the curve point eliminating part 22 eliminates this.

Figure 12:
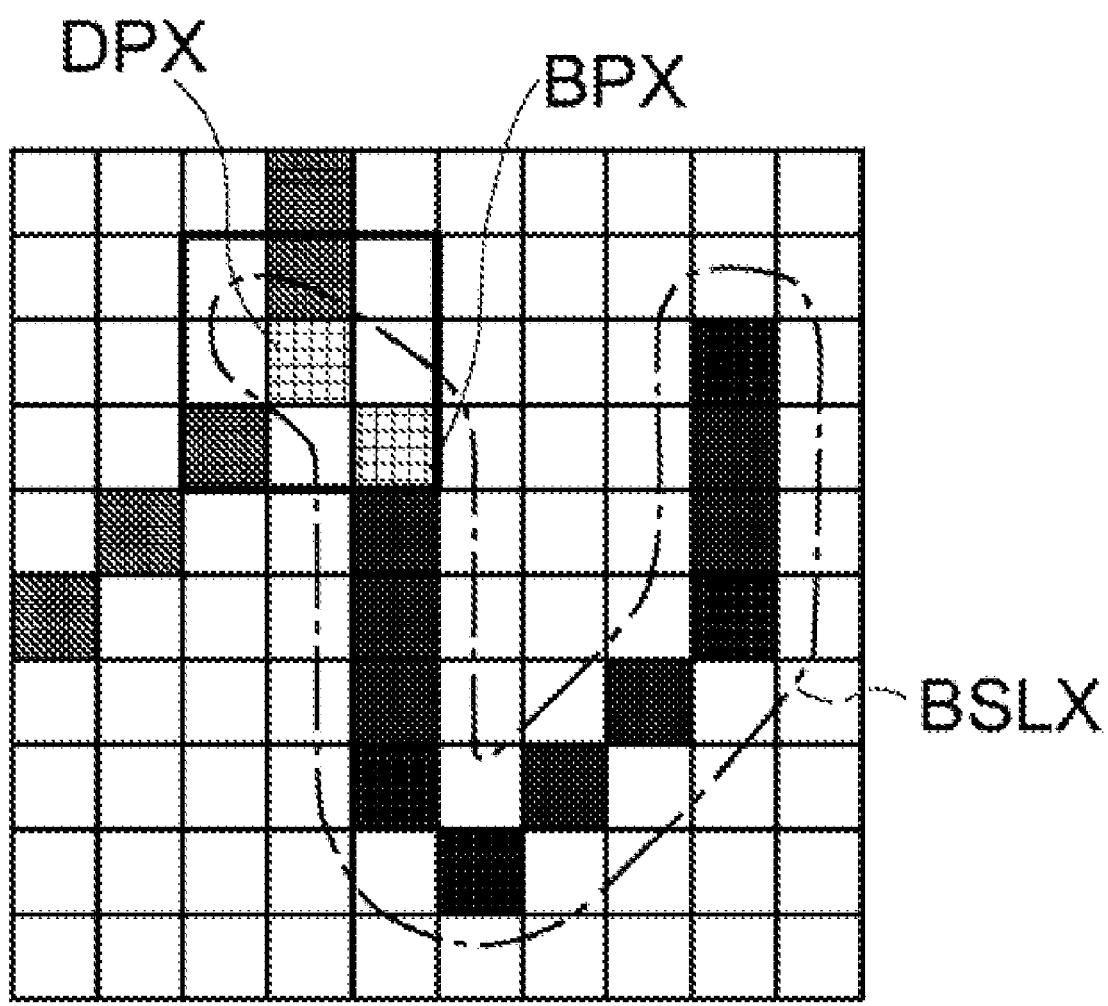
FIG. 12 is a schematic diagram for explaining the elimination of a curve point in the neighborhood of a branch point.

Concretely, for example, as shown in FIG. 12, in the case where the start point of a partial blood vessel forming sequence forming a partial blood vessel line $BSL_X$ is a branch point $D_{PX}$, the curve point eliminating part 22 eliminates a curve point $B_{PX}$ existing in the pixels surrounding the branch point $D_{PX}$ (the total eight pixels of the four pixels in the upper, lower, right and left directions and the four pixels in the diagonal directions).

Figure 13:
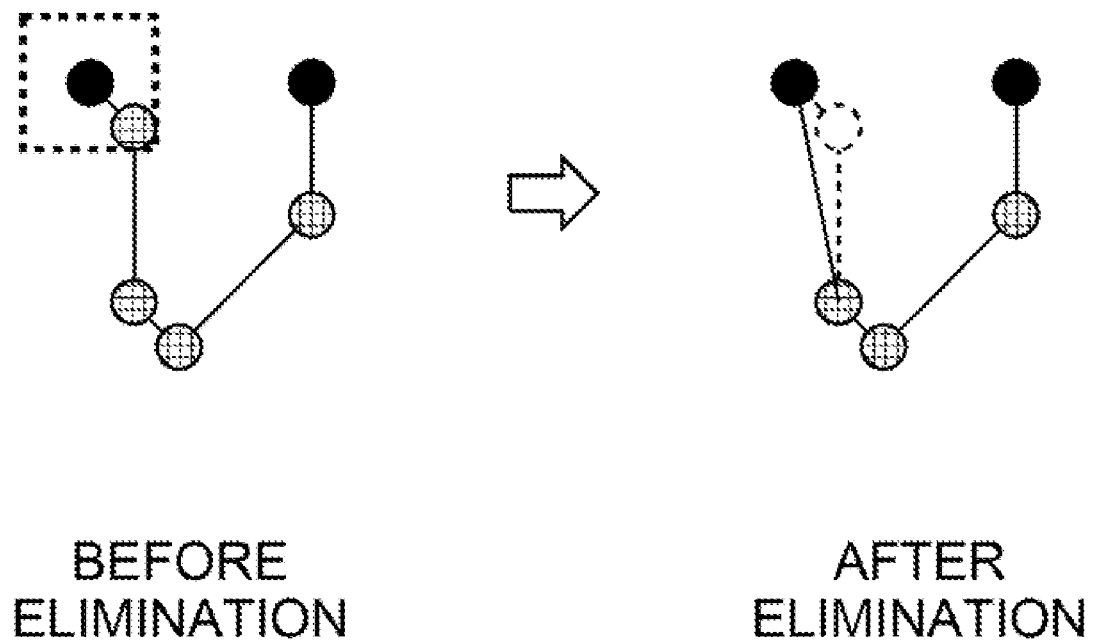
FIG. 13 is a schematic diagram for explaining a curve point before elimination and after elimination.

Accordingly, the curve point eliminating part 22 selects a curve point that is apt to frequently appear many but has the little meaning of existence as a feature component, as an elimination object. As a result, for example, as shown in FIG. 13, the curve point eliminating part 22 can eliminate a curve point so that the partial blood vessel line after elimination becomes simple (smooth), as well as approximating the form of the partial blood vessel line after elimination to the partial blood vessel line before elimination.

In this connection, in the example of FIG. 12, the neighborhood of the branch point $D_{PX}$ is set as the neighborhood of the branch point $D_{PX}$. However, instead of this, it may be set as a predetermined distance area from the branch point $D_{PX}$. Also in this case, the similar result as the case of the example of FIG. 12 can be obtained.

In this manner, in the first stage, the curve point eliminating part 22 aims to reduce data amount by eliminating a curve point existing in the "neighborhood" of a branch point.

Note that, in comparison with the case of executing elimination processing after a second stage without executing the elimination processing on this first stage, the curve point eliminating part 22 can further accurately eliminate a curve point after the above second stage. This has been obvious by experiment results by the present applicant. As on of the reasons, it is considered that by the presence of a curve point in the neighborhood of a branch point, other curve point which primarily should be a feature component is hidden.

(2-2-2) Second Stage

Next, as the second stage, in the case where in the partial blood vessel forming sequence, a segment formed by continuous three feature points is close to a straight line, the curve point eliminating part 22 eliminates the middle one of the above three feature points. As a condition to determine whether or not being close to a straight line as the above, a cosine formed by the continuous three feature points and the area of a parallelogram formed by these feature points are adopted. In this connection, although the both ends of such continuous three points are sometimes to be a branch point or an end point, the middle feature point is always to be a curve point.

Figure 14:
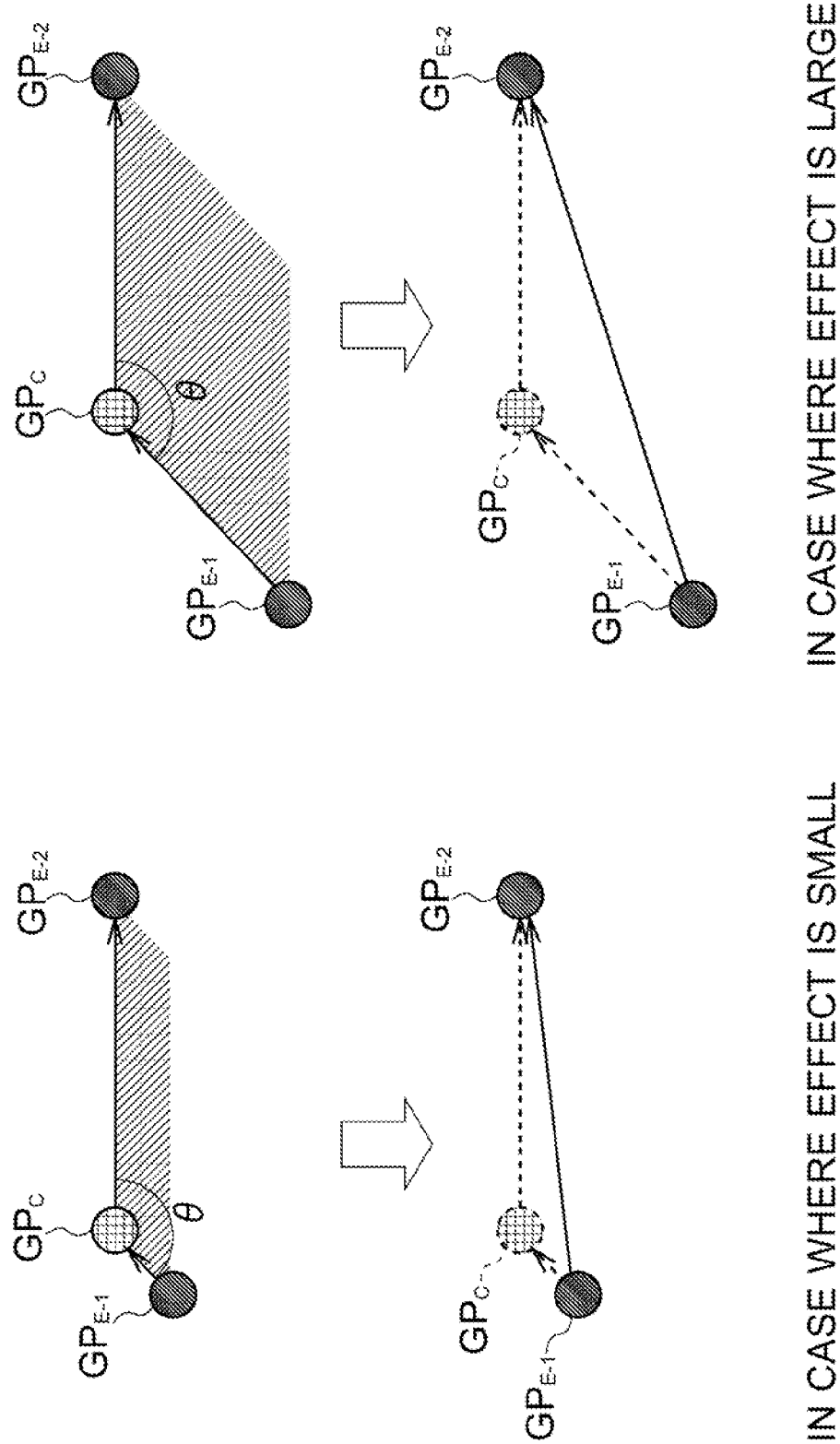
FIGS. 14A and 14B are schematic diagrams for explaining an effect on a blood vessel line by the elimination of a curve point.

Here, if it is only conditioned on a cosine formed by continuous three feature points, for example, as shown in FIGS. 14A and 14B, when the area of the parallelogram formed by the middle feature point $GP_C$ and the feature points of the both ends $GP_{E-1}$, $GP_{E-2}$ (area represented by hatching) is small (FIG. 14A), even if the middle feature point $GP_C$ is eliminated, the state of the blood vessel line after elimination is not quite different from the blood vessel line before elimination by the elimination.

However, when the area of the parallelogram formed by the middle feature point $GP_C$ and the feature points of the both ends $GP_{E-1}$, $GP_{E-2}$ is large (FIG. 14B), if the middle feature point $GP_C$ is eliminated, the state of the blood vessel line after elimination is quite different from the blood vessel line before elimination by the elimination.

In this manner, not only simply conditioning on the size of a cosine formed by continuous three feature points, by also adding the size of the area of the parallelogram formed by the above three feature points as the condition, a curve point can be accurately selected as an elimination object by that the partial blood vessel line after elimination can be smoothed, as well as approximating the forms of the partial blood vessel line before elimination and the partial blood vessel line after elimination.

Figure 15:
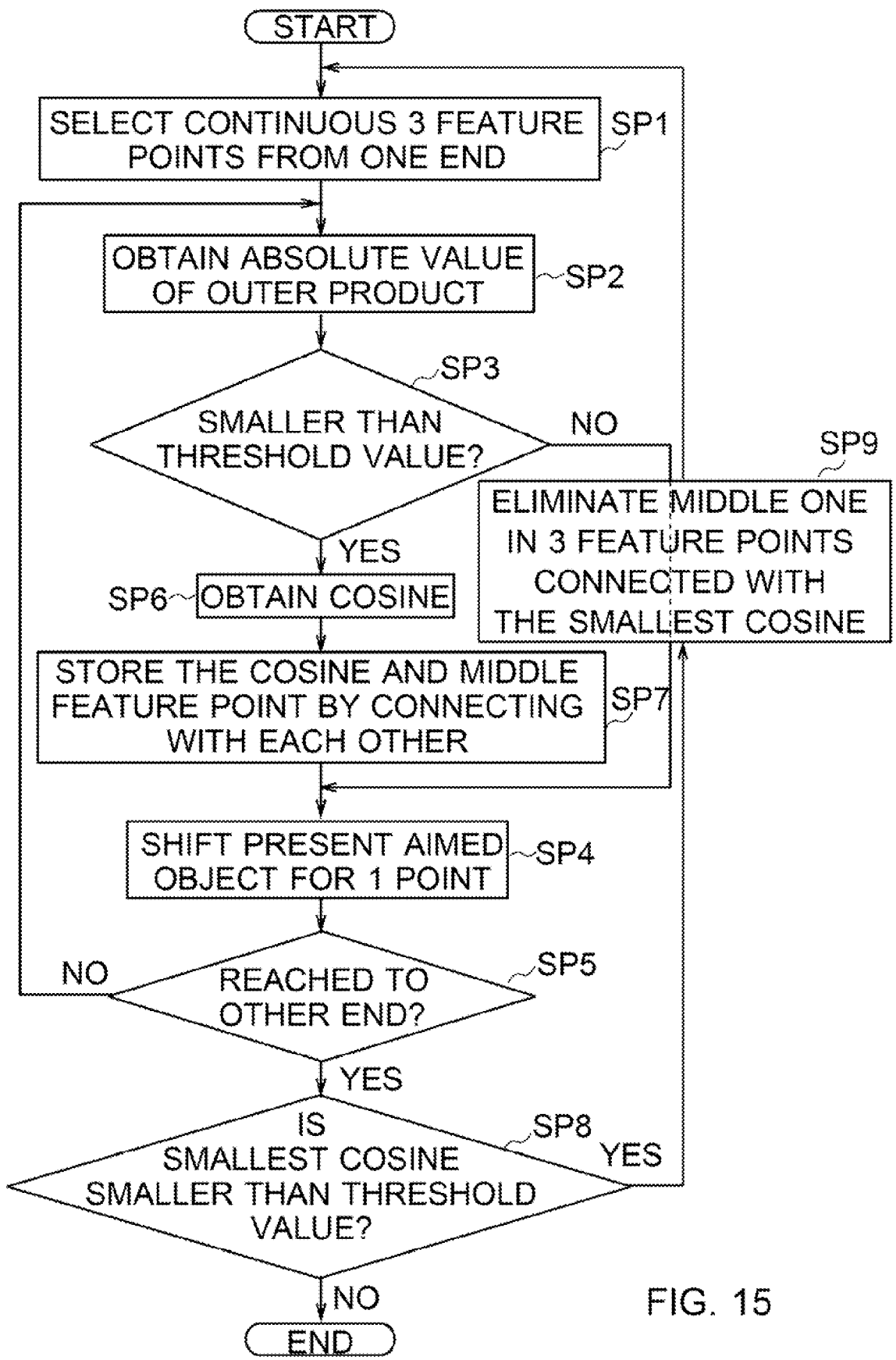
FIG. 15 is a flowchart showing the elimination processing procedure of a curve point on a second stage.

Concretely, the elimination processing of a curve point in this second stage is executed in a procedure shown in a flowchart of FIG. 15, from the start point in the partial blood vessel forming sequence. That is, the curve point eliminating part 22 selects continuous three feature points as the present aimed object (step SP1).

Figure 16:
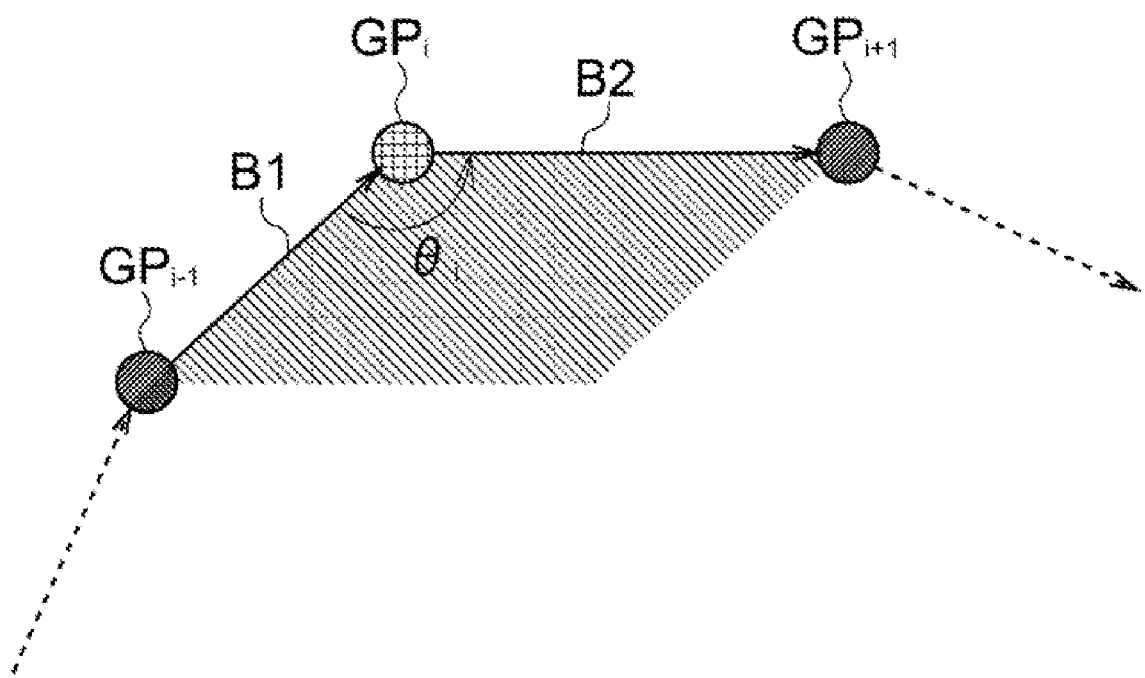
FIG. 16 is a schematic diagram for explaining the elimination of a curve point based on an outer product and a cosine.

Then, for example, as shown in FIG. 16, in the three feature points set as the present aimed object (hereinafter, these are referred to as the present aimed continuous three points) $GP_{i-1}, GP_i, GP_{i+1}$ (i=2, 3, . . . , m (m is an integer)), the curve point eliminating part 22 obtains the absolute value of the outer product of a vector B1 between the feature point of one end $GP_{i-1}$ and the middle feature point $GP_i$, and a vector B2 between the middle feature point $GP_i$ and the feature point of the other end $GP_{i+1}$ (step SP2), and determines whether or not the absolute value is smaller than a predetermined threshold value (hereinafter, this is referred to as an outer threshold value) (step SP3).

Here, if it is above the outer threshold value, this means that the area of a parallelogram formed by the present aimed continuous three points $GP_{i-1}$, $GP_i$, $GP_{i+1}$ is large. In this case, the curve point eliminating part 22 shifts the present aimed object for one point, from the start point side to the finish point side of the partial blood vessel forming sequence (step SP4), and determines whether or not to be able to select continuous three feature points that should be set as the present aimed object next (step SP5).

On the contrary, if it is smaller than the outer threshold value, that is, if the area of the parallelogram formed by the present aimed continuous three points $GP_{i-1}$, $GP_i$, $GP_{i+1}$ is small, the curve point eliminating part 22 obtains the cosine $\theta_i$ of the above aimed continuous three points $GP_{i-1}$, $GP_i$, $GP_{i+1}$ (step SP6), and temporarily stores the cosine $\theta_1$ and the middle feature point $GP_i$ by connecting with each other (step SP7). Then, the curve point eliminating part 22 shifts the present aimed object for one point, from the start point side to the finish point side of the partial blood vessel forming sequence (step SP4), and determines whether or not to be able to select continuous three feature points that should be set as the present aimed object next (step SP5).

In this manner, as to the partial blood vessel forming sequence, the curve point eliminating part 22 sequentially selects continuous three feature points as an aimed object, by shifting from the start point to the finish point of the partial blood vessel forming sequence for one point. And if the absolute value of the outer product of the vectors B1 and B2 in the present aimed continuous three points $GP_{i-1}$, $GP_i$, $GP_{i+1}$ selected at the time is smaller than the outer product threshold value, the curve point eliminating part 22 temporarily stores the cosine $\theta_1$ in the present aimed continuous three points $GP_{i-1}$, $GP_i$, $GP_{i+1}$ (FIG. 16) by connecting with each other (steps SP1-SP7).

And then, if it becomes impossible to select the next continuous three points, the curve point eliminating part 22 determines whether or not in the cosines that have been temporarily stored until the time, the smallest cosine is smaller than a predetermined threshold value (hereinafter, this is referred to as a cosine threshold) (step SP8).

Here, if it is smaller than the cosine threshold value, this means that the linearity of the line formed by continuous three feature points is high. In this case, the curve point eliminating part 22 eliminates the middle one of the three feature points connected with the smallest cosine (step SP9). And then, the curve point eliminating part 22 repeats again the aforementioned processing, from the start point in the partial blood vessel forming sequence until there are not three feature points forming a cosine smaller than the cosine threshold value in the partial blood vessel forming sequence.

$$GP_D = \frac{PD1 \cdot GP_j + PD2 \cdot GP_{j+1}}{PD1 + PD2} \quad (1)$$

On the contrary, if it is larger than the cosine threshold, that is, if there are no three feature points forming a smaller cosine than the cosine threshold value in the partial blood vessel forming sequence, the curve point eliminating part 22 finishes the elimination processing on this second stage.

The curve point eliminating part 22 executes the elimination processing of a curve point on the second stage by the above procedure.

In this connection, in the elimination processing in FIG. 16, as the procedure, in continuous three feature points in the partial blood vessel forming sequence, one in that the absolute value of the outer product of the vectors B1 and B2 (FIG. 16) is smaller than the outer product threshold value is previously selected, and if the smallest cosine $\theta_1$ in the cosine $\theta_1$ in the above selected three feature points (FIG. 16) is smaller than the cosine threshold value, the middle one of the three feature points connected with the smallest cosine $\theta_1$ is eliminated. However, instead of this, one in that the cosine in the above three feature points is smaller than the cosine threshold value is previously selected, and if the smallest absolute value in the absolute values of the outer products of the above selected three feature points is smaller than the outer product threshold value, the middle one of the three feature points connected with the smallest absolute value may be eliminated.

This means that the condition that the absolute value of the outer product of the vectors B1 and B2 (FIG. 16) in the present aimed continuous three points $GP_{i-1}$, $GP_i$, $GP_{i+1}$ (FIG. 16) is smaller than the outer product threshold value, or the condition that the cosine $\theta_1$ in the above present aimed continuous three points $GP_{i-1}$, $GP_i$, $GP_{i+1}$ is smaller than the cosine threshold value (FIG. 16) may be set as the condition for selecting three feature points to be proposed for an elimination object, and also it may be set as the condition for determining three feature points that should be set as an elimination object from among the three feature points proposed for selection.

In any case, since it is conditioned on the cosine formed by continuous three feature points and the area of the parallelogram formed by the above three feature points, as also described with reference to FIGS. 14A and 14B, the curve point eliminating part 22 accurately selects the middle feature point $GP_C$ of three feature points $GP_{E-1}$-$GP_C$-$GP_{E-2}$ having the highest linearity, in continuous three feature points in the partial blood vessel forming sequence, as an elimination object.

As a result, the curve point eliminating part 22 can eliminate a curve point so that the partial blood vessel line after elimination becomes simple (smooth), as well as approximating the form of the partial blood vessel line after elimination to the partial blood vessel line before elimination.

In this manner, on the second stage, the curve point eliminating part 22 aims to reduce data amount, in three feature points satisfying one of the condition that the absolute value of the outer product of vectors in continuous three feature points in the partial blood vessel forming sequence is smaller than the outer product threshold value, and the condition that the cosine in the above three feature points is smaller than the cosine value, by eliminating the middle one of the three feature points satisfying the other one of the above conditions and being the smallest.

Note that, the curve point eliminating part 22 repeatedly executes the processing for eliminating a curve point in a part having the highest linearity in the overall partial blood vessel forming sequence as a sole elimination object. Thus, a curve point of an elimination object in the partial blood vessel forming sequence can be selected from a general viewpoint not locally, in comparison with the case of adopting the processing that simultaneously watches the condition that the absolute value of the outer product of vectors in continuous three feature points in the partial blood vessel forming sequence is smaller than the outer product threshold value, and the condition that an internal angle formed by the above three feature points is smaller than a prescribed value, and immediately eliminates the corresponding curve point every time when the above conditions are satisfied. Therefore, the curve point can be further accurately eliminated.

(2-2-3) Third Stage

Figure 17:
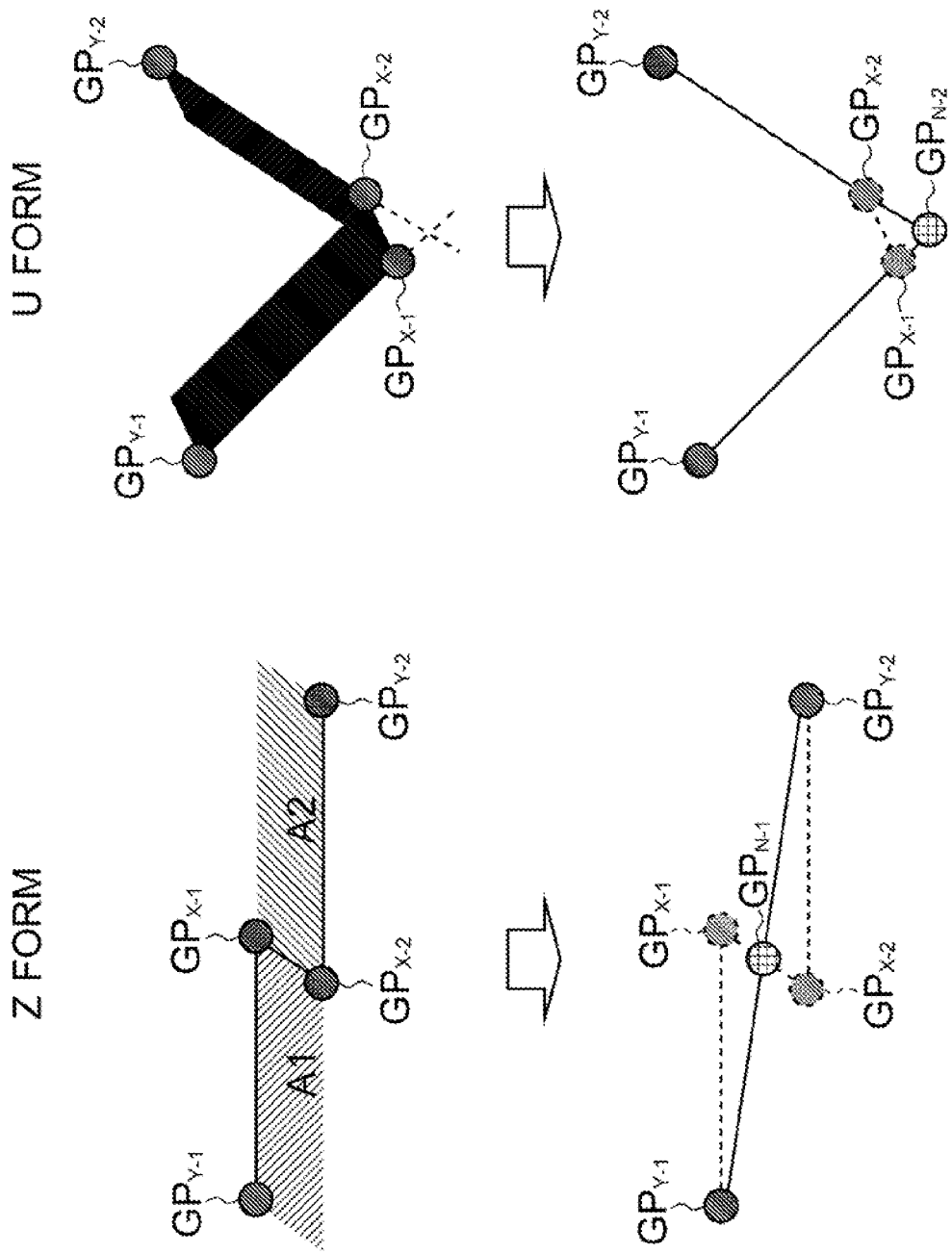
FIGS. 17A and 17B are schematic diagrams for explaining the replacement of a curve point.

Next, as a third stage, in the case where in the partial blood vessel forming sequence, a segment connecting continuous two feature points is shorter than a prescribed value, for example, as sown in FIGS. 17A and 17B, the curve point eliminating part 22 replaces feature points $GP_{X-1}$, $GP_{X-2}$ forming the short segment to a new feature point $GP_{N-1}$, $GP_{N-2}$, according to the form of a blood vessel line $GP_{Y-1}$-$GP_{X-1}$-$GP_{X-2}$-$GP_{Y-2}$ that connects four feature points including the feature points $GP_{Y-1}$, $GP_{Y-2}$ connected to the feature points $GP_{X-1}$, $GP_{X-2}$ forming the above short segment. In this connection, although the both ends of the continuous four feature points are sometimes to be a branch point or an end point, the two feature points $GP_{X-1}$, $GP_{X-2}$ to be a replacement object are typically to be curve points.

Here, as giving as the examples of these FIGS. 17A and 17B, the form of the blood vessel line $GP_{Y-1}$-$GP_{X-1}$-$GP_{X-2}$-$GP_{Y-2}$ connecting the continuous four feature points becomes almost either a "Z" form or a "U" form. In the case of having the "Z" form, the curve point eliminating part 22 sets a point internally divided by the ratio of the area A1 of the parallelogram formed by the feature point $GP_{X-1}$, $GP_{X-2}$ forming the short segment and the feature point $GP_{Y-1}$ connected to one of this, to the area A2 of the parallelogram formed by the above feature points $GP_{X-1}$, $GP_{X-2}$ and the feature point $GP_{Y-2}$ connected to the other end of this, as a new feature point $GP_{N-1}$, and makes the form of a blood vessel line $GP_{Y-1}$-$GP_{N-1}$-$GP_{Y-2}$ connecting the above three feature points into an "I" form.

On the other hand, in the case of having the "U" form, the curve point eliminating part 22 sets the intersection of the prolongation line of the segments $GP_{Y-1}$-$GP_{X-1}$, $GP_{Y-2}$-$GP_{X-2}$ connecting the feature points $GP_{X-1}$, $GP_{X-2}$ forming the short segment and the corresponding feature points $GP_{Y-1}$, $GP_{Y-2}$ connected to this, as a new feature point $GP_{N-2}$, and makes the form of a blood vessel line $GP_{Y-1}$-$GP_{N-2}$-$GP_{Y-2}$ connecting the above three feature points into a "V" form.

As also obvious from FIGS. 17A and 17B, not only aiming at the two feature points $GP_{X-1}$, $GP_{X-2}$ forming the short segment, by adding the positions of the feature points $GP_{Y-1}$, $GP_{Y-2}$ connected to the above two feature points $GP_{X-1}$, $GP_{X-2}$ in consideration, and generating new feature points $GP_{N-1}$, $GP_{N-2}$, a curve point can be accurately selected as an elimination object by that the partial blood vessel line after elimination can be simplified (smoother), as well as approximating the forms of the partial blood vessel line before elimination and the partial blood vessel line after elimination.

Figure 18:
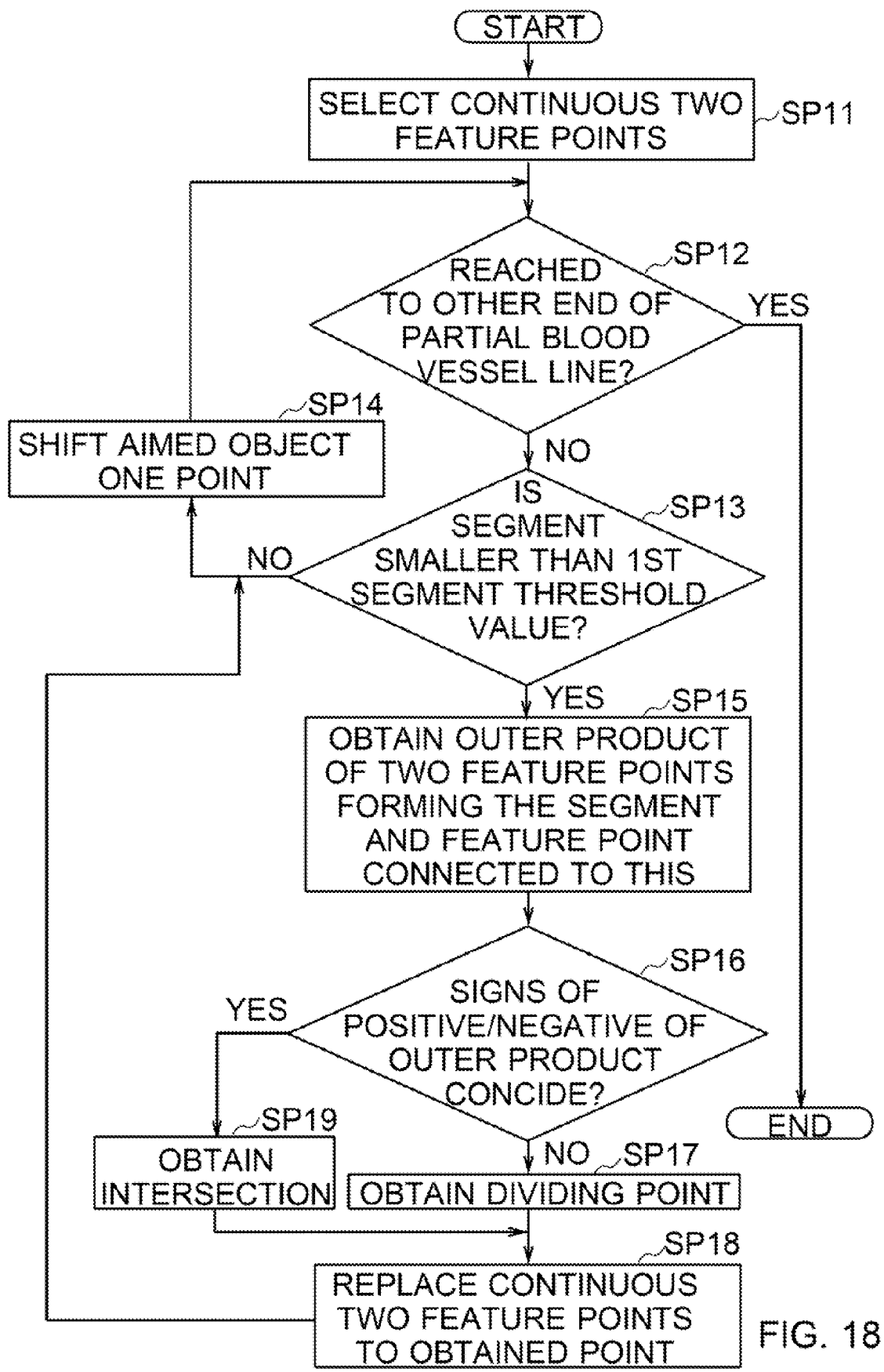
FIG. 18 is a flowchart showing the elimination processing procedure of a curve point on a third stage.

The elimination processing of a curve point on this third stage is executed in a procedure shown in a flowchart of FIG. 18, from the second feature point in the partial blood vessel forming sequence. That is, the curve point eliminating part 22 selects continuous two feature points as the present aimed object (step SP11).

Then, if the other end of the two feature points being the present aimed object does not reach the finish point of the partial blood vessel forming sequence (step SP12), the curve point eliminating part 22 determines whether or not the segment between the two feature points being selected at the time is smaller than a predetermined threshold value (hereinafter, this is referred to as a first segment threshold value) (step SP13). If it is above the first segment threshold value, the curve point eliminating part 22 shifts the present aimed object for one point, from the start point side to the finish point side of the partial blood vessel forming sequence (step SP14).

In this manner, the curve point eliminating part 22 sequentially selects continuous two feature points until selecting the two feature points satisfying the condition that the segment is smaller than the first segment threshold value, by shifting for one point from the start point to the finish point of the partial blood vessel forming sequence (steps SP11-SP14).

Figure 19:
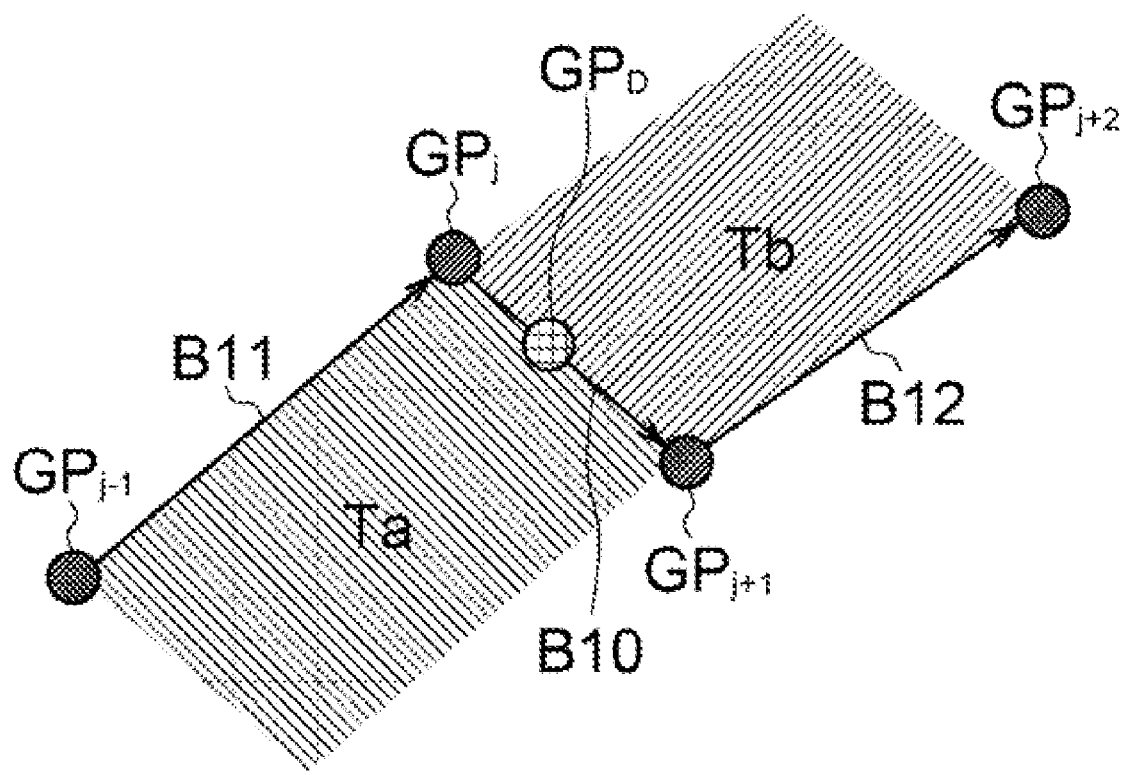
FIG. 19 is a schematic diagram for explaining the elimination of a curve point in a Z-form blood vessel line.

On the contrary, if the segment between the two feature points is smaller than the first segment threshold value, for example, as shown in FIG. 19, the curve point eliminating part 22 obtains the outer product of a vector B10 between the feature points $GP_j$ (j=2, 3, ..., n (n is an integer)) and $GP_{j+1}$ being the present aimed object and a vector B11 between the feature point $GP_j$ and a feature point $GP_{j-1}$ connected to one end side of the feature point $GP_j$. Further, the curve point eliminating part 22 obtains the outer product of the vector B10 between the two feature points $GP_j$ and $GP_{j+1}$ being the present aimed object, and a vector B12 between the feature point $GP_{j+1}$ and a feature point $GP_{j+2}$ connected to the other end side of the feature point $GP_{j+1}$ (step SP15). Then, the curve point eliminating part 22 determines whether or not the signs of positive and negative in the outer product of the vectors B10 and B11 and the outer product of the vectors B11 and B12 agree (step SP16).

Here, if the signs of positive and negative does not agree, as shown in this example of FIG. 19, this means that the form of a segment $GP_{j-1}$-$GP_j$-$GP_{j+1}$-$GP_{j+2}$ connecting the two feature points $GP_j$, $GP_{j+1}$ being the present aimed object and the feature points $GP_{j-1}$, $GP_{j+2}$ connected to this precedingly and followingly is a "Z" form.

In this case, the curve point eliminating part 22 sets the absolute value of the outer product of the vectors B10 and B11 (that is, the area Ta of a parallelogram formed by the feature points $GP_{j-1}$, $GP_j$, $GP_{j+1}$) as "PD1", and also sets the absolute value of the outer product of the vectors B10 and B12 (that is, the area Tb of a parallelogram formed by the feature points $GP_j$, $GP_{j+1}$, $GP_{j+2}$) as "PD2", and obtains a dividing point $GP_D$ that internally divides into the areas Ta:Tb (step SP17), according to the following equation (step SP17):

$$GP_D = \frac{PD1 \cdot GP_j + PD2 \cdot GP_{j+1}}{PD1 + PD2} \quad (1)$$

Then, the curve point eliminating part 22 generates the dividing point $GP_D$, and also eliminates the two feature points $GP_j$, $GP_{j+1}$ being the present aimed object (step SP18), and then shifts the present aimed object for one point from the start point side to the finish point side of the partial blood vessel forming sequence (step SP14), and repeats the aforementioned processing.

Figure 20:
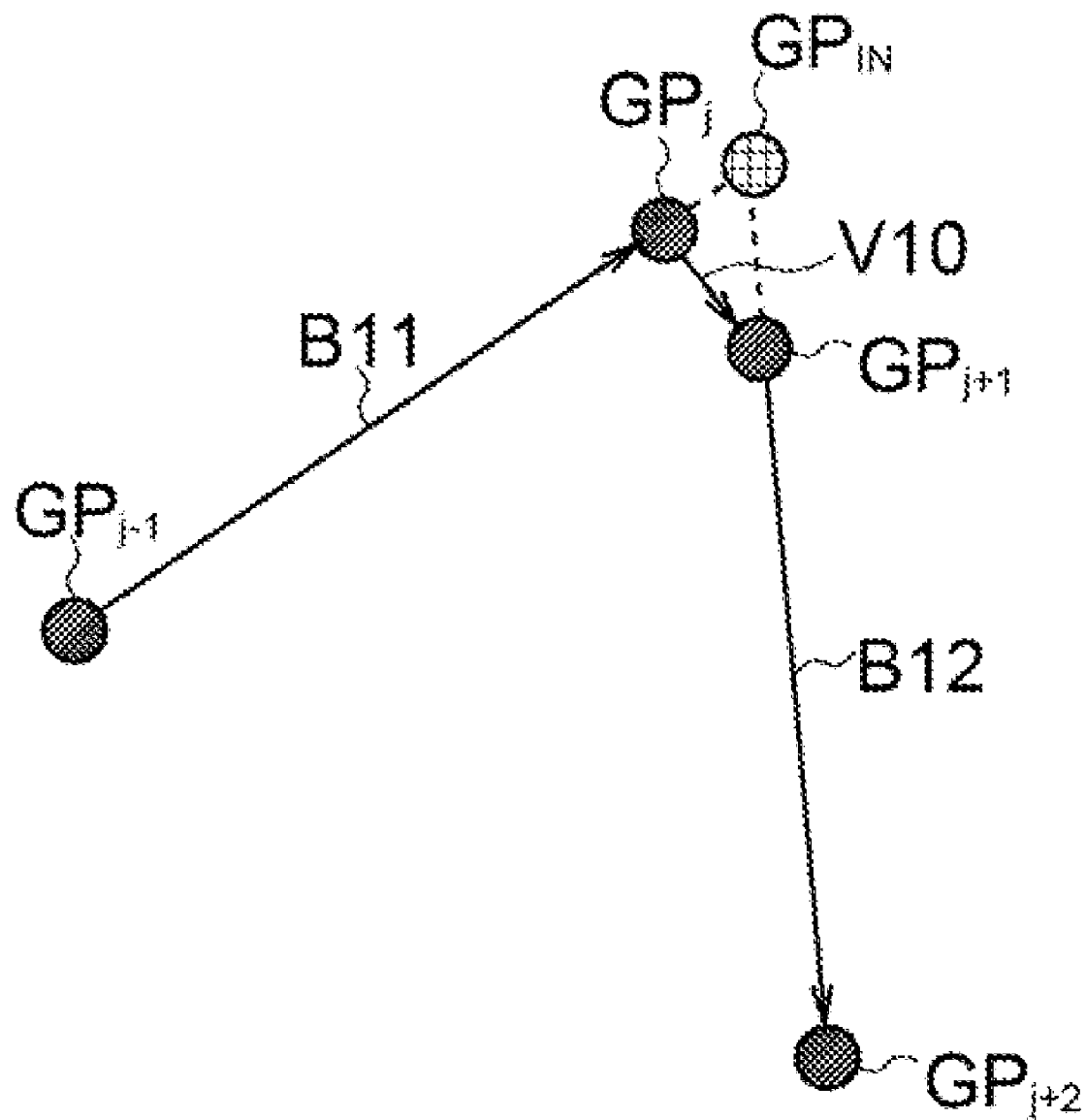
FIG. 20 is a schematic diagram for explaining the elimination of a curve point in a U-form blood vessel line.

On the contrary, if the signs of positive and negative agree, for example, as shown in FIG. 20, this means that the form of a segment $GP_{j-1}$-$GP_j$-$GP_{j+1}$-$GP_{j+2}$ connecting the two feature points $GP_j$, $GP_{j+1}$ being the present aimed object and the feature points $GP_{j-1}$, $GP_{j+2}$ connection to this precedingly and followingly is a "U" form.

In this case, the curve point eliminating part 22 sets the outer product of the vectors B10 and B12 as "PD3", and sets the outer product of the vectors B11 and B12 as "PD4", and obtains an intersection $GP_{IN}$ on the prolongation lines of the vectors B11 and B12, according to the following equation (step SP19):

$$GP_{IN} = GP_j + \frac{PD3}{PD4} \cdot B10 \quad (2)$$

Then, the curve point eliminating part 22 generates the intersection $GP_{IN}$, and also eliminates the two feature points $GP_j$, $GP_{j+1}$ being the present aimed object (SP18), and then shifts the present aimed object for one point from the start point side to the finish point side of the partial blood vessel forming sequence (step SP14), and repeats the aforementioned processing.

The curve point eliminating part 22 executes the elimination processing of a curve point on the third stage by the above procedure.

As also described in FIGS. 17A and 17B, the curve point eliminating part 22 adds in consideration the positions of the feature points $GP_{Y-1}$, $GP_{Y-2}$ connected to the continuous three feature points $GP_{X-1}$, $GP_{X-2}$ precedingly and followingly. Therefore, the two feature points $GP_{X-1}$, $GP_{X-2}$ that should be set to an elimination object can be accurately replaced to a new feature point $GP_{N-1}$, $GP_{N-2}$.

As a result, the curve point eliminating part 22 can eliminate a curve point so that the partial blood vessel line after elimination becomes simple (smooth), as well as approximating the form of the partial blood vessel line after elimination to the partial blood vessel line before elimination.

In this manner, on the third stage, the curve point eliminating part 22 aims to reduce data amount by replacing the two feature points $GP_{X-1}$, $GP_{X-2}$ satisfying the condition that the segment $GP_{X-1}$-$GP_{X-2}$ connecting continuous two feature points in the partial blood vessel forming sequence is smaller than the first segment threshold value, to the dividing pint $GP_D$ that internally divides the segment at the ratio of the area Ta formed by the two feature points and a feature point connected to one of the two feature points to the area Tb formed by the above two feature points and a feature point connected to the other of the two feature points, or to the intersection $GP_{IN}$ of a prolongation line connecting one of the two feature points and a feature point connected to this and a prolongation line connecting the other of the above two feature points and a feature point connected to this.

Note that, the curve point eliminating part 22 switches the point to be replaced ($GP_D$ or $GP_{IN}$) according to a difference in signs of positive and negative in the outer product of the continuous two feature points and a feature point connected to one of the two feature points, and the outer product of the above two feature points and a feature point connected to the other of the two feature points. That is, feature points can be accurately replaced by adding in consideration the connection state of the feature points $GP_{Y-1}$, $GP_{Y-2}$ connected to the continuous two feature points $GP_{X-1}$, $GP_{X-2}$ precedingly and followingly.

(2-2-4) Fourth Stage

Finally, as a fourth stage, as to the partial blood vessel forming sequence, if the area of a parallelogram formed by continuous three feature points is smaller than a prescribed value, the curve point eliminating part 22 eliminates the middle feature point. In this connection, the both ends of the continuous three feature points are sometimes to be a branch point or an end point, however, the middle feature point is typically to be a curve point.

Here, whereas on the second stage, the linearity is took into account by also adding in consideration the size of the cosine of a parallelogram formed by continuous three feature points, on this fourth stage, the linearity is not took into account, and if the area of the parallelogram is smaller than a prescribed value, the curve point is eliminated.

This is because in the elimination processing on the second and the third stages, a curve pint is eliminated by broadly grasping without going into the particulars of the partial blood vessel forming sequence, thus when the above elimination processing was finished, the part in that the area of the parallelogram formed by continuous three feature points in the partial blood vessel forming sequence is smaller than a prescribed value is almost limited to that curve points are not much away and are heavily concentrated, so that even if a curve point in this part is set as an elimination object, the state of the blood vessel line after elimination does not become quite different from the blood vessel line before elimination.

Figure 21:
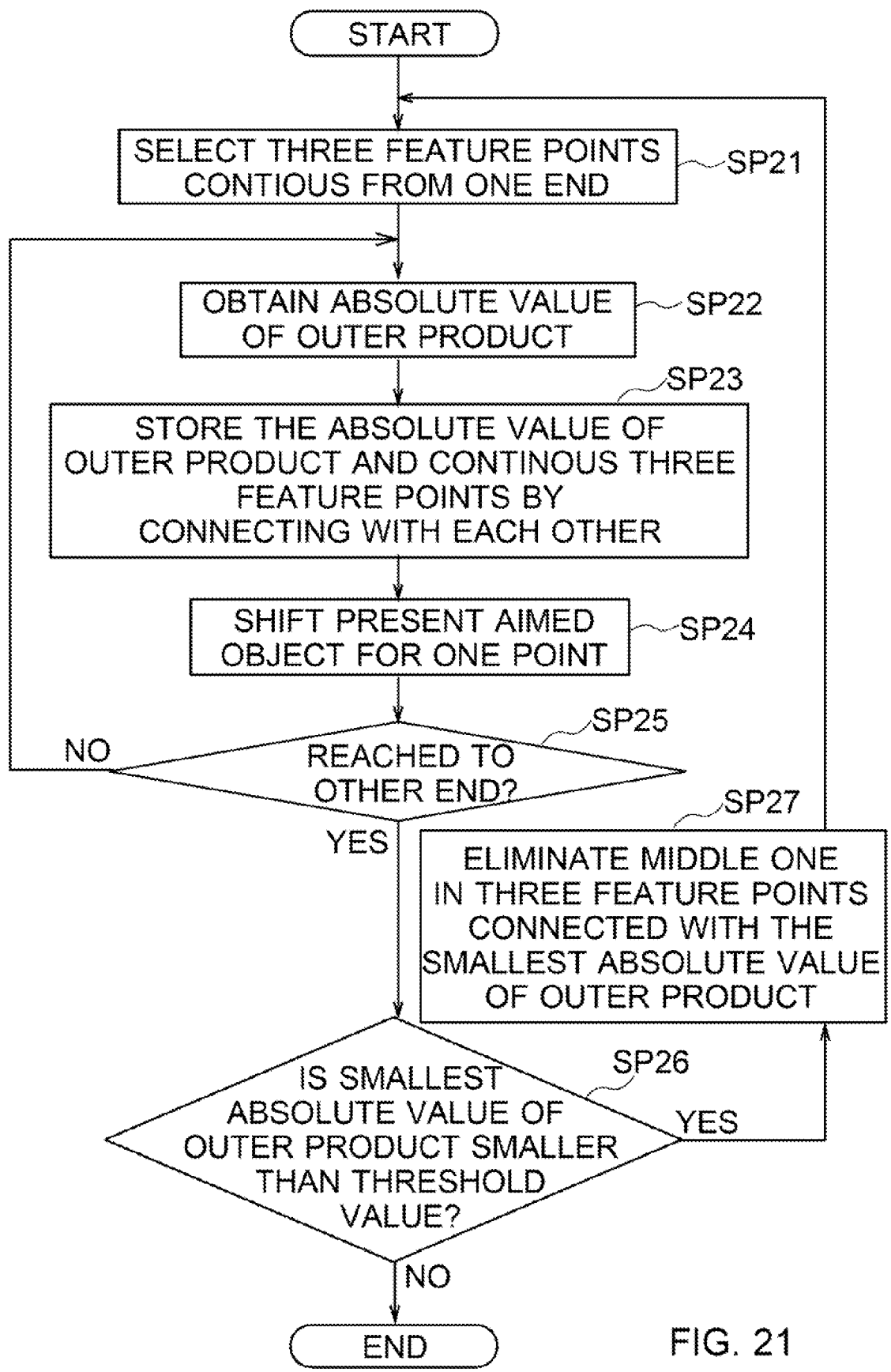
FIG. 21 is a flowchart showing the elimination processing procedure of a curve point on a fourth stage.

Concretely, the elimination processing of a curve point on the fourth stage is executed in a procedure shown in a flowchart of FIG. 21, from the start point in a partial blood vessel forming sequence. That is, the curve point eliminating part 22 selects continuous three feature points as the present aimed object (step SP21).

Figure 22:
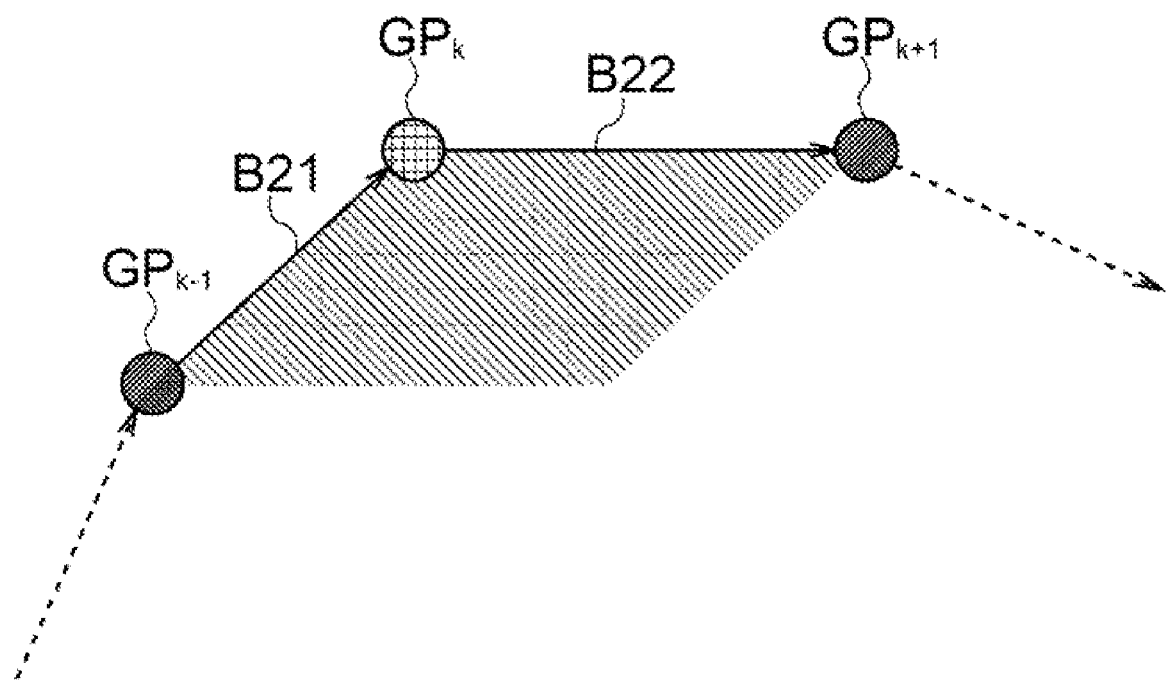
FIG. 22 is a schematic diagram for explaining the elimination of a curve point based on an outer product.

Then, for example, as shown in FIG. 22, in the present aimed continuous three points (three feature points set as the present aimed object) $GP_{k-1}$, $GP_k$, $GP_{k+1}$ (k=2, 3, . . . , s (s is an integer)), the curve point eliminating part 22 obtains the absolute value of the outer product of a vector B1 between a feature point at one end $GP_{k-1}$ and the middle feature point $GP_k$, and a vector B2 between the middle feature point $GP_k$ and a feature point at the other end $GP_{k+1}$ (step SP22), and temporarily stores this absolute value of the outer product and the present aimed continuous three points $GP_{k-1}$, $GP_k$, $GP_{k+1}$ (position information) by connecting with each other (step SP23).

Then, the curve point eliminating part 22 shifts the present aimed object for one point, from the start point side to the finish point side of the partial blood vessel forming sequence (step SP24), and determines whether or not to be able to select continuous three feature points that should be set as the present aimed object next (step SP25).

In this manner, as to the partial blood vessel forming sequence, the curve point eliminating part 22 sequentially selects an aimed object to the finish point, by shifting continuous three feature points for one point from the start point of the partial blood vessel forming sequence, and temporarily stores the area of the parallelogram formed by the present aimed continuous three points $GP_{k-1}$, $GP_k$, $GP_{k+1}$ selected at the time (FIG. 22) (the absolute value of the outer product of the vectors B1 and B2), and the present aimed continuous three points $GP_{k-1}$, $GP_k$, $GP_{k+1}$ (FIG. 16) selected at the time by connecting with each other (steps SP21-SP25).

Then, if it becomes impossible to select the next continuous three feature points, in the absolute values of the outer product that have been temporarily stored until the time, the curve point eliminating part 22 determines whether or not the absolute value of the smallest outer product is smaller than a predetermined threshold value (hereinafter, this is referred to as a second outer product threshold value) (step SP26).

Here, if the absolute value is smaller than the second outer product threshold value, the curve point eliminating part 22 eliminates the middle feature point $GP_k$ in the three feature points $GP_{k-1}$, $GP_k$, $GP_{k+1}$ (FIG. 22) connected to the smallest absolute value of the smallest outer product (step SP27). And then, the curve point eliminating part 22 repeats the aforementioned processing again from the start point in the partial blood vessel forming sequence, until there are not three feature points that form a smaller cosine than a cosine threshold value in the partial blood vessel forming sequence.

On the contrary, if the absolute value is larger than the second outer product threshold value, that is, if there became no three feature points forming a smaller area than the second outer product threshold value in the partial blood vessel forming sequence, the curve point eliminating part 22 finishes the elimination processing on the fourth stage.

The curve point eliminating part 22 executes the elimination processing of a curve point on the fourth stage by the above procedure.

Therefore, in the partial blood vessel forming sequence, the curve point eliminating part 22 sets the part in that curve points are not much away and the distribution is heavily concentrated as an elimination object. As a result, the curve point eliminating part 22 can select a curve point as an elimination object so that the partial blood vessel line after elimination becomes simple (smooth), as well as approximating the form of the partial blood vessel line after elimination to the partial blood vessel line before elimination.

In this manner, on the fourth stage, in the areas of parallelograms formed by continuous three feature points in the partial blood vessel forming sequence, the curve point eliminating part 22 aims at reducing data amount, by eliminating the middle feature point in the three feature points in that the area is the smallest and is smaller than a prescribed value.

Note that, similarly to the second stage, the curve point eliminating part 22 repeatedly executes the processing for eliminating a curve point in the part forming the smallest area in the overall partial blood vessel forming sequence as a sole elimination object. Therefore, it is possible to select a curve point being an elimination object in the partial blood vessel forming sequence from a general viewpoint not locally. Thus, the curve point can be further accurately eliminated, in comparison with the case of adopting the processing that "eliminates the middle one of three feature points every time when satisfying the condition that the area of the parallelogram formed by the continuous three feature points in the partial blood vessel forming sequence is smaller than the prescribed value".

(2-3) Elimination of End Point

The end point eliminating part 23 eliminates the start point or the finish point of the partial blood vessel forming sequence in each partial blood vessel line as the occasion demands. This elimination processing of the start point or the finish point of the partial blood vessel forming sequence will be described below, by separating stages.

(2-3-1) First Stage

Figure 23:
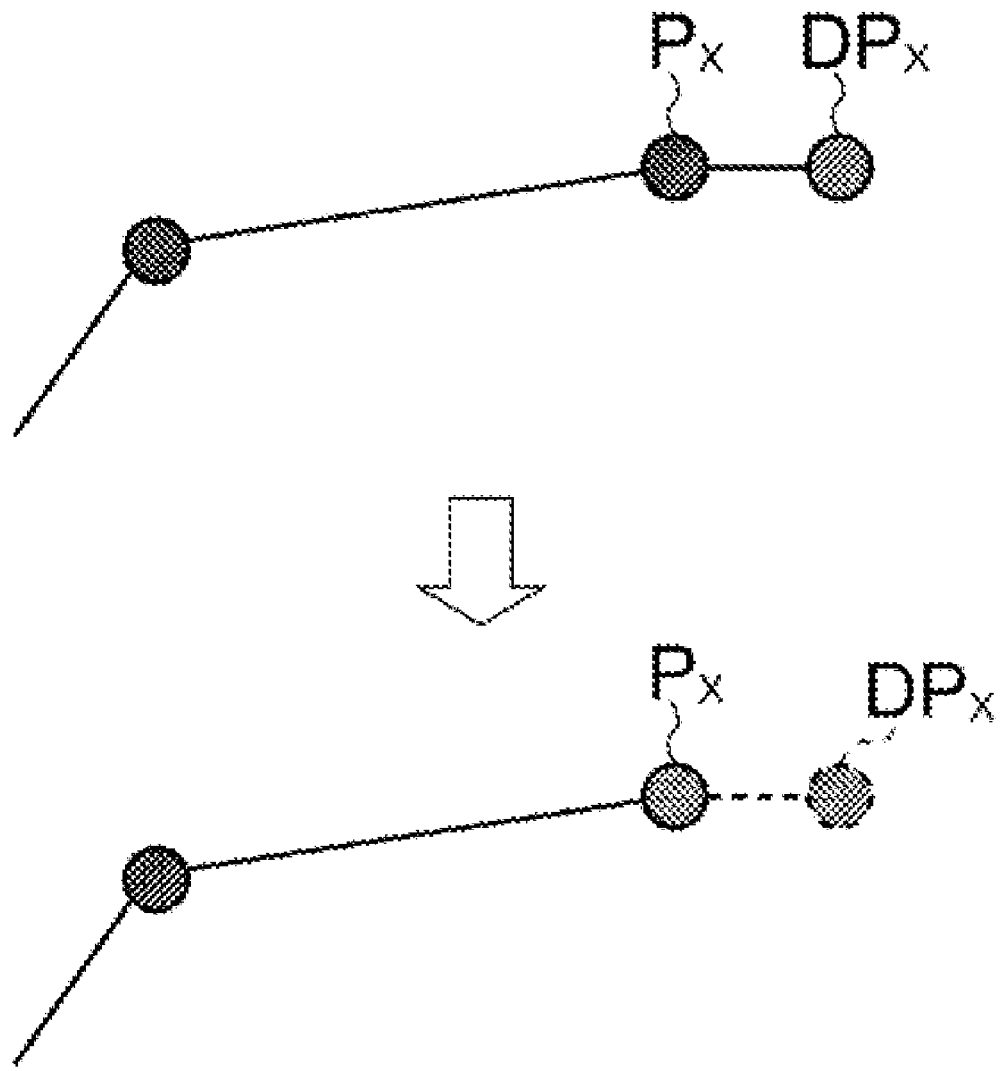
FIG. 23 is a schematic diagram for explaining the elimination of an end point.

As a first stage, for example, as shown in FIG. 23, in the case where either one or both of the start point and the finish point in the partial blood vessel forming sequence is an end point, if the distance between the end point DPx and a curve point Px connected to the above end point DPx is shorter than a predetermined threshold value, the end point eliminating part 23 eliminates the end point DPx.

Accordingly, the end point eliminating part 23 sets an end point that is poor in the meaning of presence as a feature component as an elimination object. As a result, the end point eliminating part 23 can eliminate an end point so that the partial blood vessel line after elimination becomes simple (smooth), as well as approximating the form of the blood vessel line after elimination to the blood vessel line before elimination.

In this manner, on the first stage, the end point eliminating part 23 aims at reducing data amount, by eliminating the end point in that the distance to a curve point connect to this is short in end points. In this connection, in this embodiment, an elimination object is defined as an end point, however, it may be a curve point connected to the end point. Thereby, the same effect as the case of using an point as an elimination object can be obtained.

(2-3-2) Second Stage

Next, as a second stage, if there is a pair of partial blood vessel lines in that the intersection angle of three or four partial blood vessel lines extending from a branch point in branch points on a blood vessel line is close to 180 degrees, the end point eliminating part 23 assigns a partial blood vessel forming sequence in the one pair of partial blood vessel line as one partial blood vessel forming sequence, and eliminates one of the start point and the finish point being the end points of the original partial blood vessel forming sequence. In this connection, as also described with reference to FIGS. 3A to 3C, in a blood vessel (blood vessel line) in one pixel width, partial blood vessel lines extending from a branch point become typically three or four.

Figure 24:
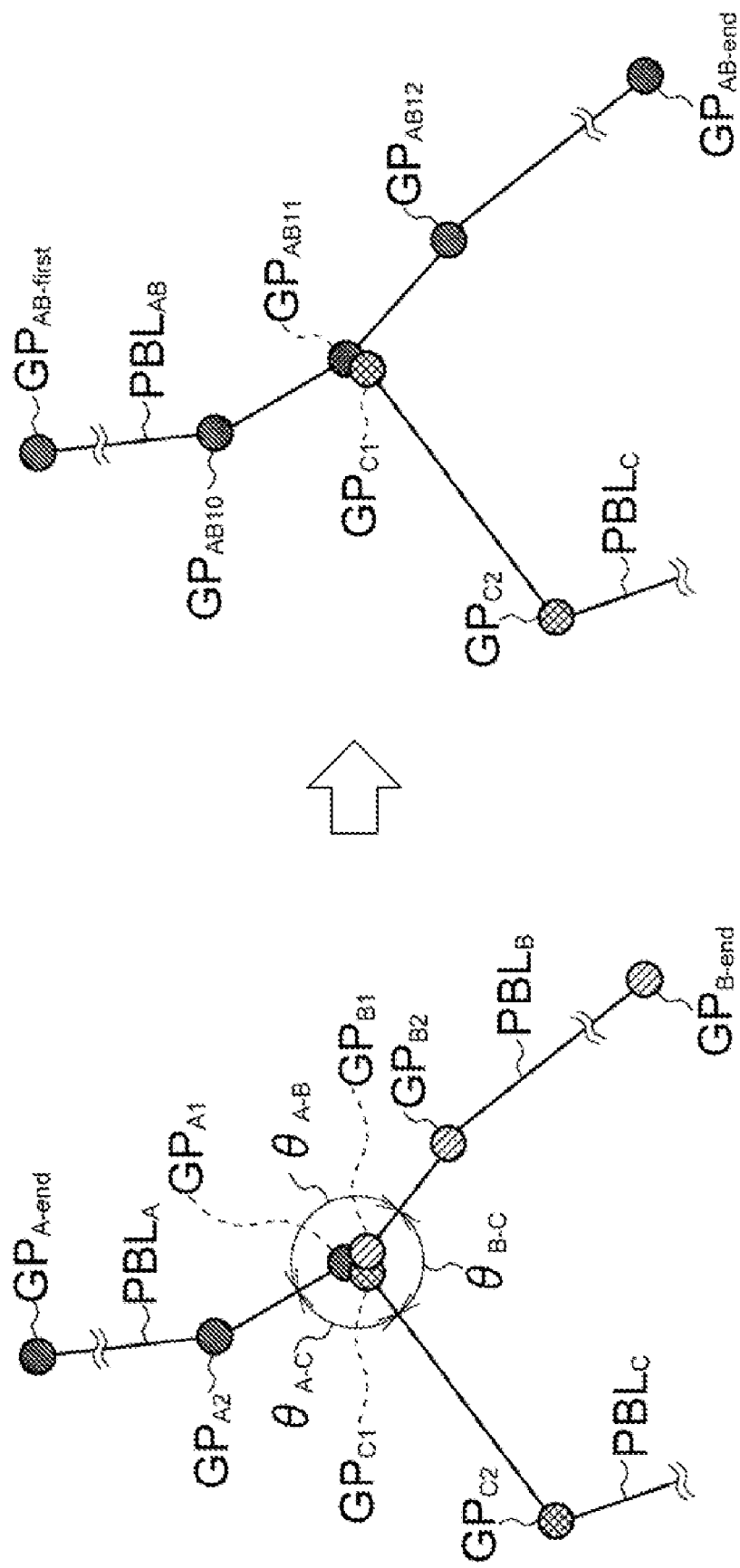
FIG. 24 is a schematic diagram for explaining a connection (three branches) of partial blood vessel lines.

Concretely, for example, as shown in FIG. 24, in the case where three partial blood vessel lines $PBL_A$, $PBL_B$, $PBL_C$ are extended from a branch point GP ($GP_{A1}$, $GP_{B1}$, $GP_{C1}$), the end point eliminating part 23 obtains, in these partial blood vessel lines $PBL_A$, $PBL_B$, $PBL_C$, the cosine ($\cos(\theta_{A-B})$, ($\cos(\theta_{A-C})$, ($\cos(\theta_{B-C})$) of the intersection angles $\theta_{A-B}$, $\theta_{A-C}$, $\theta_{B-C}$ of a pair of partial blood vessel lines.

Here, when the smallest cosine $\cos(\theta_{A-B})$ is smaller than a second cosine threshold value, this means that the intersection angle of the partial blood vessel line is closer to 180 degrees. At this time, in the both ends of the partial blood vessel forming sequences $GP_{A1}$, $GP_{A2}$, ..., $GP_{A-end}$ and $GP_{B1}$, $GP_{B2}$, ..., $GP_{B-end}$ of a pair of partial blood vessel lines corresponding to the smallest cosine $\cos(\theta_{A-B})$, the end point eliminating part 23 sets the points $GP_{A-end}$, $GP_{B-end}$ that are not overlapped as the start point or an end point, and reassigns the feature points between the start point and the end point as one group.

As a result, the one pair of blood vessel lines $PBL_A$, $PBL_B$ are connected. Therefore, for example, as shown in FIG. 24, if comparing to the partial blood vessel forming sequence of the one pair of partial blood vessel lines before connecting, the number of the partial blood vessel forming sequences $GP_{AB-first}$, ..., $GP_{AB10}$, $GP_{AB11}$, $GP_{AB12}$, ..., $GP_{AB-end}$ of the above connected partial blood vessel lines $PBL_{AB}$ reduces for one point, by that the two branch points $GP_{A1}$, $GP_{B1}$ that were the respective start points of the partial blood vessel lines of the above one pair of partial blood vessel lines were replaced to one intermediate point $GP_{AB11}$. Note that, since the partial blood vessel line $PBL_{AB}$ is that the one pair of partial blood vessel lines $PBL_A$, $PBL_B$ were simply connected, the form of the blood vessel line does not change between before and after connecting.

On the contrary, when the smallest cosine $\cos(\theta_{A-B})$ is larger than the second cosine threshold value, the end point eliminating part 23 does not reassigning a group. If there is a branch point that has not been a processing object yet, the end point eliminating part 23 shifts a processing object to the next branch point, and if there is no branch point that has not been a processing object yet, the end point eliminating part 23 finishes this processing.

Figure 25:
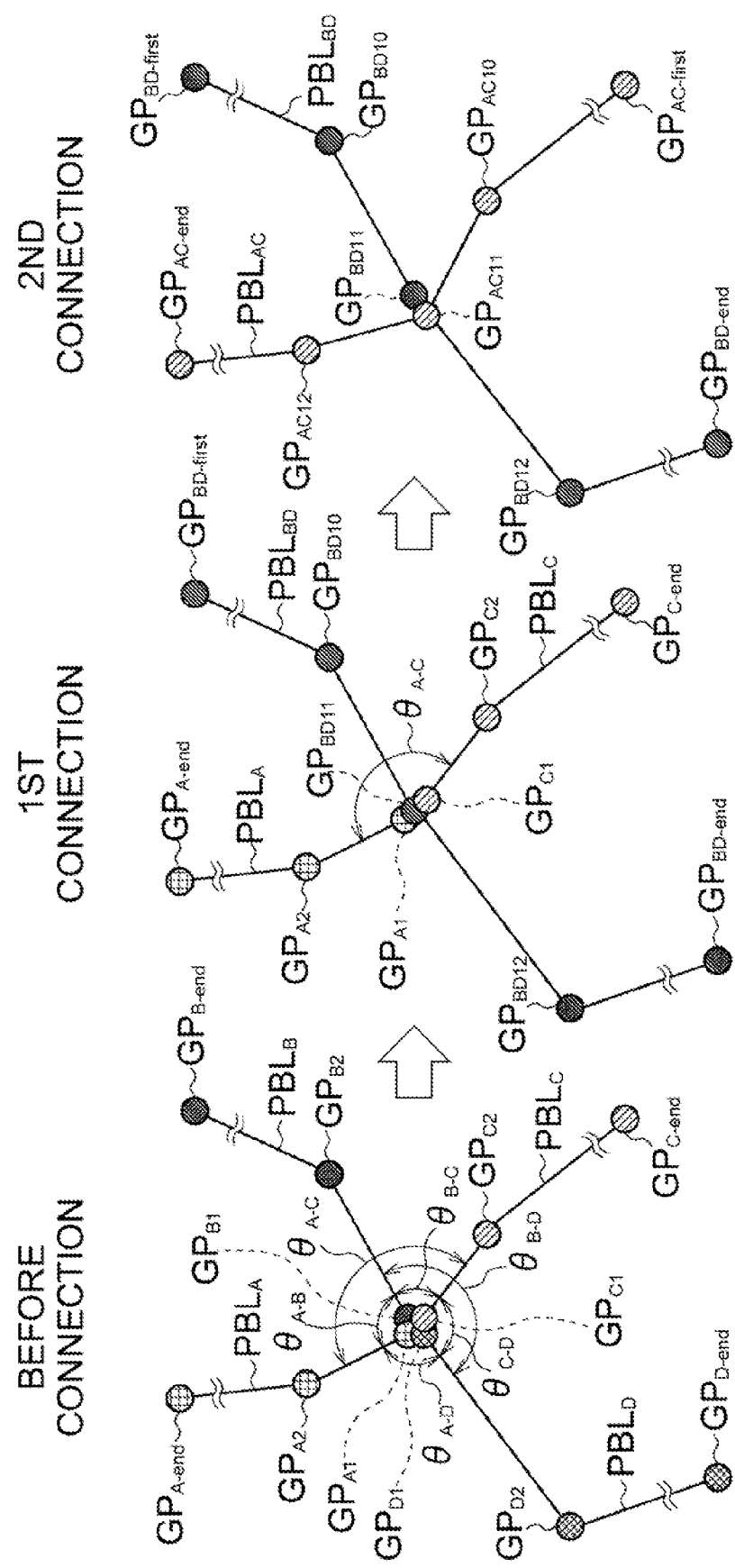
FIG. 25 is a schematic diagram for explaining a connection (four branches) of partial blood vessel lines.

On the other hand, for example, as shown in FIG. 25, in the case where four partial blood vessel forming sequences $PBL_A$, $PBL_B$, $PBL_C$, $PBL_D$ are extended from the branch point GP ($GP_{A1}$, $GP_{B1}$, $GP_{C1}$, $GP_{D1}$), in these partial blood vessel forming sequences $PBL_A$, $PBL_B$, $PBL_C$, $PBL_D$, the end point eliminating part 23 obtains the cosines ($\cos(\theta_{A-B})$, $\cos(\theta_{A-C})$, $\cos(\theta_{A-D})$, $\cos(\theta_{B-C})$, $\cos(\theta_{B-D})$, $\cos(\theta_{C-D})$), of the intersection angles $\theta_{A-B}$, $\theta_{A-C}$, $\theta_{A-D}$, $\theta_{B-C}$, $\theta_{B-D}$, $\theta_{C-D}$ of a pair of partial blood vessel lines.

Here, when the smallest cosine $\cos(\theta_{B-D})$ is smaller than a second cosine threshold value, this means that the intersection angle of the partial blood vessel line is close to 180 degrees. At this time, in the both ends of the partial blood vessel forming sequences $GP_{B1}$, $GP_{B2}$, ..., $GP_{B-end}$ and $GP_{D1}$, $GP_{D2}$, ..., $GP_{D-end}$ of a pair of partial blood vessel lines corresponding to the smallest cosine $\cos(\theta_{B-D})$, the end point eliminating part 23 sets the points $GP_{B-end}$, $GP_{D-end}$ that are not overlapped as the start point or an end point, and reassigns the feature points between the start point and the end point as one group.

As a result, the one pair of blood vessel lines $PBL_B$, $PBL_D$ are connected. Therefore, for example, as shown in FIG. 25, if comparing to the partial blood vessel forming sequence of the one pair of partial blood vessel lines before connecting, the number of the partial blood vessel forming sequences $GP_{BD-first}$, ..., $GP_{BD10}$, $GP_{BD11}$, $GP_{BD12}$, ..., $GP_{BD-end}$ of the above connected partial blood vessel line $PBL_{BD}$ reduces for one point, by that the two branch points $GP_{B1}$, $GP_{D1}$ that were the respective start points of the partial blood vessel lines of the above one pair of partial blood vessel lines were replaced to one intermediate point $GP_{BD11}$. Note that, since the partial blood vessel line $PBL_{BD}$ is that the one pair of partial blood vessel lines $PBL_B$, $PBL_D$ were simply connected, the form of the blood vessel line does not change between before and after connecting.

In the case of this four branches, even if the one pair of partial blood vessel lines $PBL_B$, $PBL_D$ were connected, the partial blood vessel lines $PBL_A$, $PBL_C$ that have not been connected yet remain. However, when the cosine ($\cos(\theta_{A-C})$) of the intersection angle $\theta_{A-C}$ of the remaining partial blood vessel lines $PBL_A$, $PBL_C$ is smaller than the second cosine threshold value, for example, as shown in FIG. 25, the end point eliminating part 23 replaces the respective partial blood vessel forming sequences of these partial blood vessel lines $PBL_A$, $PBL_C$ to one partial blood vessel forming sequence $GP_{AC-first}$, ..., $GP_{AC10}$, $GP_{AC11}$, $GP_{AC12}$, ..., $GP_{AC-end}$, similarly to the partial blood vessel forming sequences of the partial blood vessel lines $PBL_B$, $PBL_D$, and eliminates one of the start points $GP_{A1}$ and $GP_{C1}$ being the end points of the original partial blood vessel forming sequence.

On the contrary, when the smallest cosine $\cos(\theta_{A-B})$ is larger than the second cosine threshold value, the end point eliminating part 23 does not reassigns a group. If there is a branch point that has not been a processing object yet, the end point eliminating part 23 shifts a processing object to the next branch point, and if there is no branch point that has not been a processing object yet, the end point eliminating part 23 finishes this processing.

In this connection, although the points that a part of them is overlapped in FIGS. 24 and 25 are the same as position (coordinate) information, they are different in group. Thus, they are shown separately for convenience.

In this manner, on the second stage, in branch points on a blood vessel line, the end point eliminating part 23 replaces partial blood vessel forming sequences in the one pair of partial blood vessel lines satisfying the condition that the cosine of the intersection angle of partial blood vessel lines extending from the above branch point is smaller than the second cosine threshold value to one partial blood vessel forming sequence, and eliminates one of the start point and the finish point to be the end points of the original partial blood vessel forming sequence. Thereby, data amount can be reduced.

(2-4) Correction of Feature Point

The feature point correcting part 24 properly changes the positions of feature points that were remained as the aforementioned various elimination processing results so that a segment connecting the above feature points most approximate to the original blood vessel line (hereinafter, this is referred to as an original blood vessel line).

This straight line connecting the remained feature points becomes a blood vessel line that can be restored in authentication. Here, in the aforementioned various elimination processing, a feature point was eliminated so that the partial blood vessel line after elimination becomes simple (smooth), as well as approximating the form the partial blood vessel line after elimination to the partial blood vessel line before elimination. Thus, the straight line connecting the remaining feature points (hereinafter, this is referred to as a restoration object blood vessel line) is not vastly different from a characteristic form pattern in the original blood vessel line.

Figure 26:
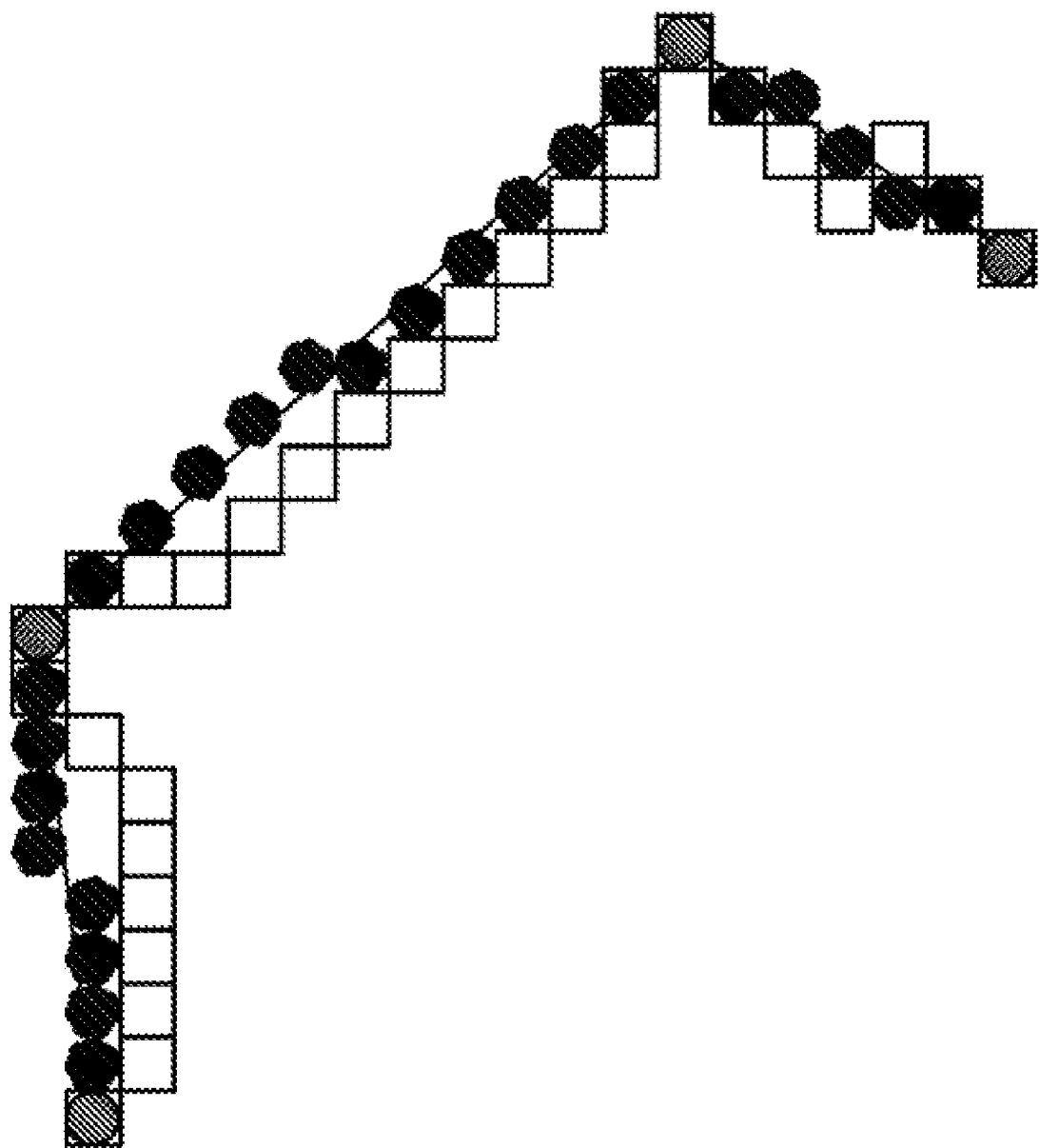
FIG. 26 is a schematic diagram showing the relationship between the pixels of an original blood vessel line and the pixels of a blood vessel line to be restored.

However, for example, as shown in FIG. 26, there is a case where the positions of the pixel of a restoration object blood vessel line (shown by a circle in the figure) and the pixel of an original blood vessel line (shown by a square in the figure) are slightly different. This difference does not particularly cause a problem when in simply used in reducing or enlargement of a map or the like. However, it might cause a problem when in used in bioauthentication or the like.

Then, in this embodiment, this correction processing of a feature point is adopted in order to make sure the approximation of a restoration object blood vessel line to an original blood vessel line.

Figure 27:
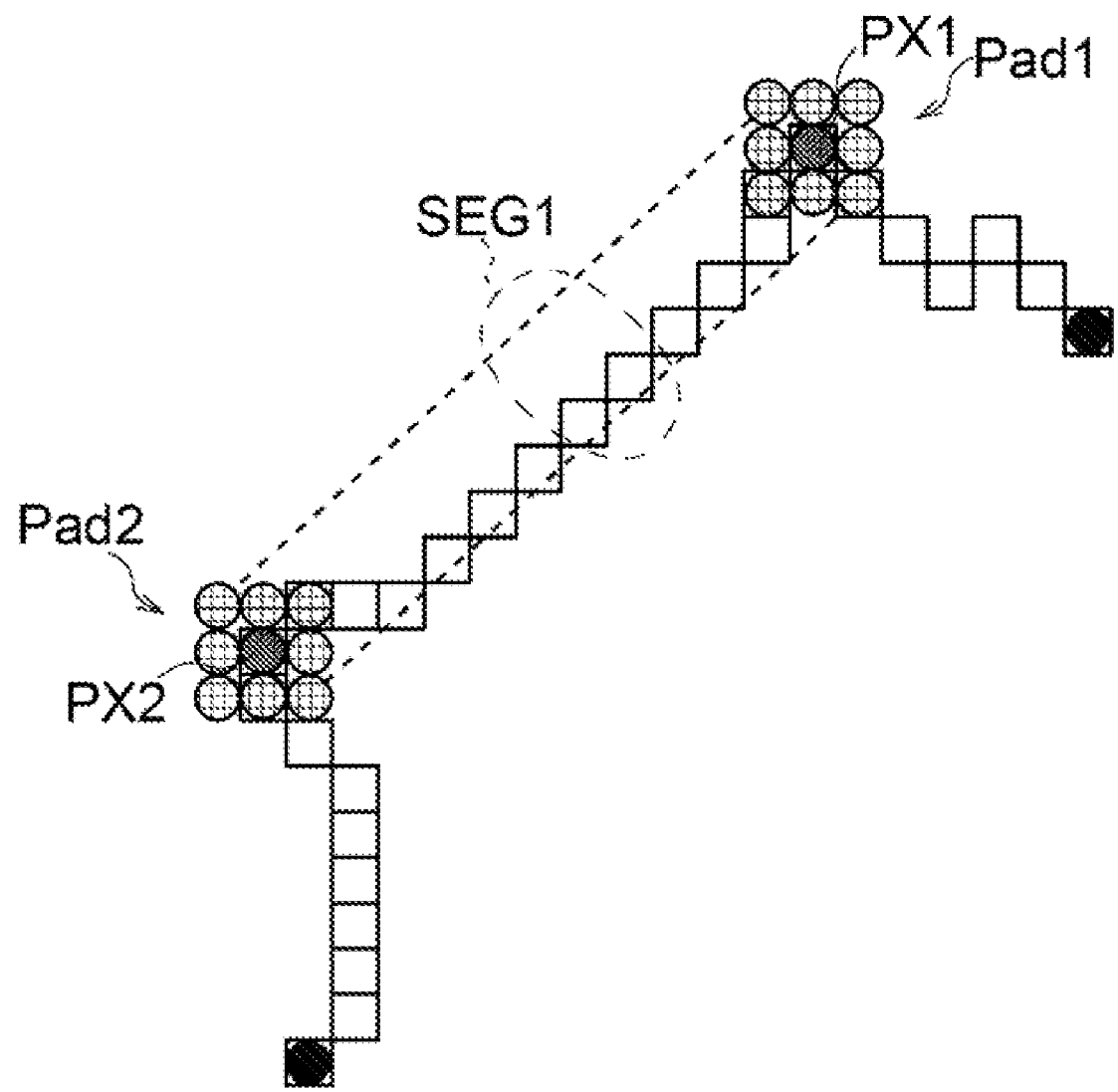
FIG. 27 is a schematic diagram for explaining the search of a first change position that is most approximate to an original blood vessel line.

Concretely, for example, as shown in FIG. 27, in remaining feature points, two feature points PX1, PX2 that form a segment being the longest in segments connecting mutually connected feature points are set as the present change object, and selects one of the feature points PX1 and point Pad1 surrounding it (the total eight pixels of the four pixels in the upper, lower, right and left directions and the four pixels in the diagonal directions), and the total nine positions of the other feature point PX2 and points Pad2 surrounding it, as positions proposed for change.

Then, the feature point correcting part 24 searches for a position corresponding to the segment in that the number of passing through a pixel in the original blood vessel line is the largest, in 81 patterns of segments SEG connecting mutual positions proposed for change, from the positions proposed for change, by using the Bresenham algorithm, for example.

Figure 28:
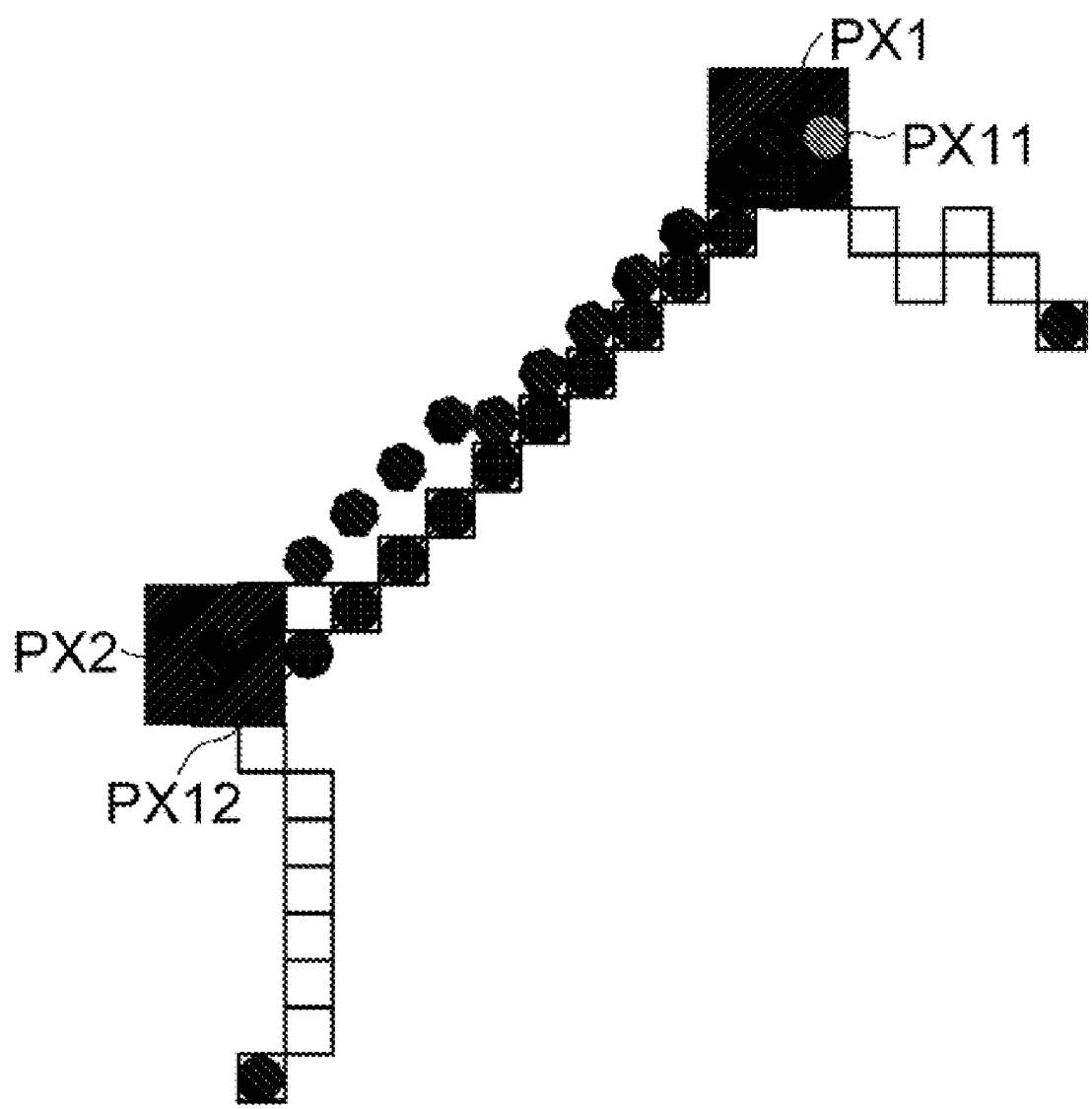
FIG. 28 is a schematic diagram showing the result of a first change.

As the search result, if a position corresponding to the segment in that the number of passing through a pixel in the original blood vessel line is the largest is detected, the feature point correcting part 24 moves the two feature points PX1, PX2 being the present change object to the above position. As a result, as shown in FIG. 28, as also obvious by comparing to FIG. 26 showing before change, a segment connecting feature points PX11, PX12 after change more approximates to the pixel of the corresponding original blood vessel line, than the segment connecting the feature points PX1, PX2 before change.

Figure 29:
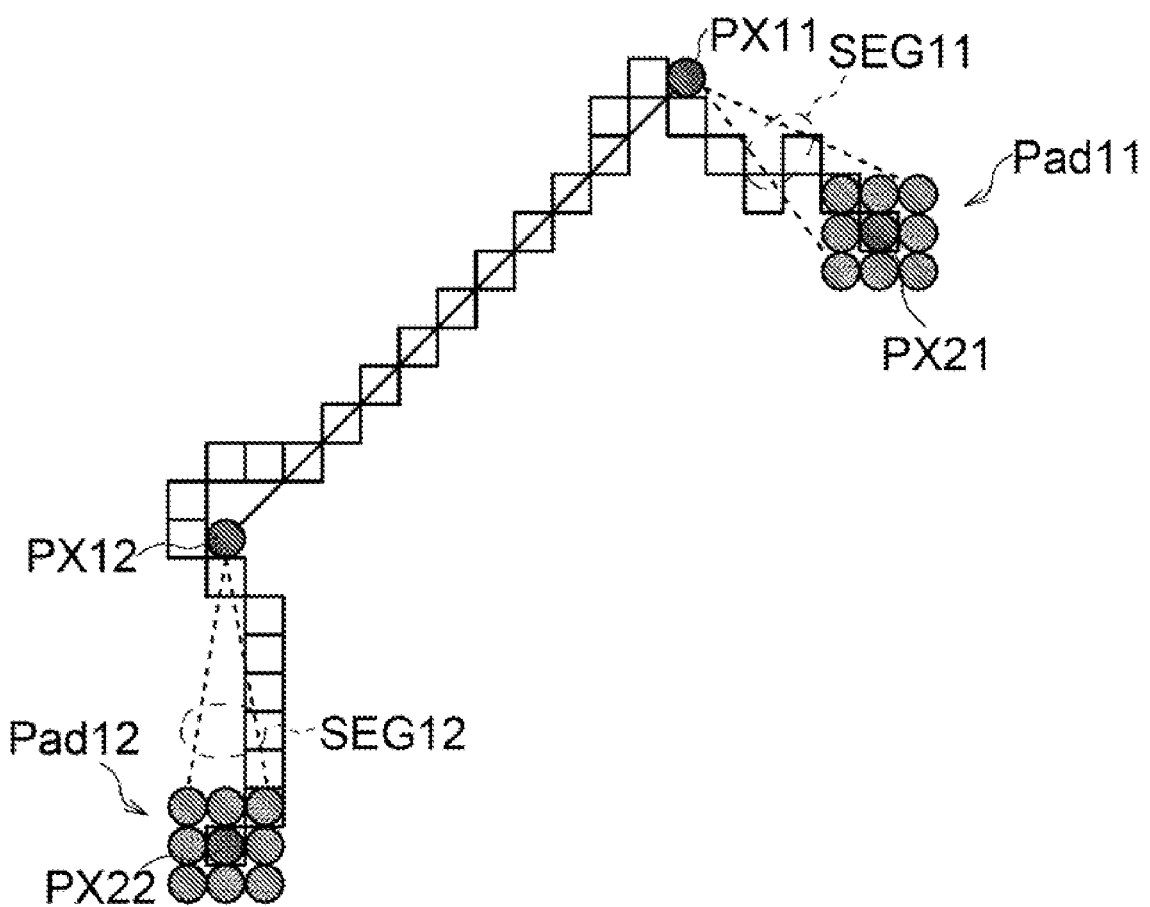
FIG. 29 is a schematic diagram for explaining the search of a second change position that is most approximate to an original blood vessel line.

Then, as shown in FIG. 29, the feature point connecting part 24 sets feature points PX21, PX22 connected to the feature points after change PX11, PX12 as the present change object, and selects the total nine positions of the feature points PX21, PX22 and points around them Pad1, Pad2 respectively, as a position proposed for change.

Then, the feature point correcting part 24 searches for a position corresponding to the segment in that the number of passing through a pixel in the original blood vessel line is the largest, respectively in 9 patterns of segment SEG11, SEG12 connecting the feature points after change PX11, PX12 and the positions proposed for change, from the positions proposed for change.

Figure 30:
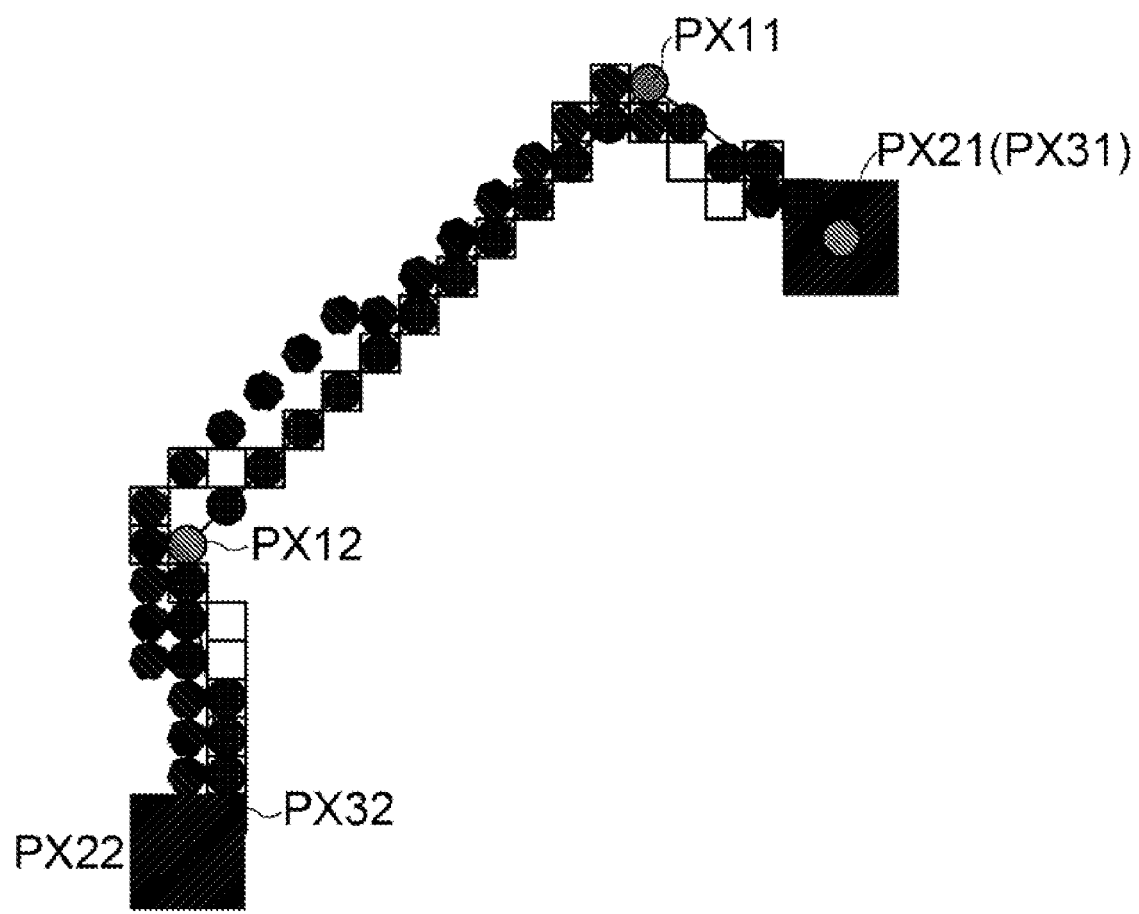
FIG. 30 is a schematic diagram showing the result of a second change.

As the search result, if a position corresponding to the segment in that the number of passing through a pixel in the original blood vessel line is the largest is detected, the feature point correcting part 24 moves the feature points PX21, PX22 being the present change object, respectively to the above position. As a result, as shown in FIG. 30, as also obvious by comparing to FIG. 26 showing before change, a segment connecting feature points after change PX31, PX32 more approximate to the pixel of the corresponding original blood vessel line, than the segment connecting the feature points before change PX21, PX22. In this connection, in the example of this FIG. 30, the feature point after change PX31 becomes (moving to) the same position as the position of the feature point before change PX21.

Further, in the case where the feature points after change PX31, PX32 are not end points, the feature point correcting part 24 sequentially selects a feature point being connected next as the present change object until to the finish end of the blood vessel line, and in the positions of the feature point being the present change object and in its neighborhood, moves the feature point being the present change object to a position corresponding to the segment in that the number of passing through a pixel in the original blood vessel line is the largest in the segments connected to the feature point that was the present change object preceding to the above present change object.

In this connection, in the example of FIGS. 27 to 30, the feature point being the present change object and the points surrounding it are set as the positions proposed for change. However, instead of this, the feature point being the present change object and a predetermined distance area from the feature point may be set as the position proposed for change. That is, the feature point being the present change object and points in the neighborhood of it can be set as the position proposed for change. Also in this case, the same effect as the case of the example of FIGS. 27 to 30 can be obtained.

In this manner, the feature point correcting part 24 sequentially selects a feature point on the blood vessel line as the present change object, from a pair of feature points forming the longest segment to the finish end of the blood vessel line, and moves the feature point selected as the above present change object to a position corresponding to the segment in that the number of passing through a pixel in the original blood vessel line is the largest, in the positions of the feature point and its neighborhood. Thereby, the restoration object blood vessel line can be further approximated to the original blood vessel line.

The control part 10 executes the feature point extraction processing as the above, and stores each partial blood vessel forming sequence obtained as the processing result (feature points from the start point via a curve point to the finish point in a partial blood vessel line) in the flash memory 13 (FIG. 1) as registration data D1 (FIG. 1).

Here, FIGS. 31A to 31C show the evaluation results by this feature point extraction processing. These FIGS. 31A to 31C show three samples of blood vessel lines before feature point extraction processing (white part in these figures), and blood vessel lines that were restored based on the feature points extracted by the above feature point extraction processing (white part in these figures). As also obvious from these FIGS. 31A to 31C, it is suggested that feature points were suitably extracted by the feature point extraction processing. Further, whereas the data of feature points in a blood vessel line before the feature point extraction processing was approximately 1 kBit, the data of feature points in the blood vessel line after the feature point extraction processing was approximately 256 Bit.

As also obvious from this experiment result, the control part 10 can suitably reduce information amount by the aforementioned feature point extraction processing.

Note that, in the authentication, the control part 10 sequentially connects segments from the start point sequentially via an adjacent curve point to the finish point in a partial blood vessel forming sequence, for every partial blood vessel forming sequence, (feature points from the start point via a curve point to the finish point in a partial blood vessel line) of the registration data D1, and restores the blood vessel line.

(2-5) Conclusion

As the first feature point extraction processing as described above, in branch points, end points, and curve points detected as the feature points of the outline, the control part 10 eliminates a curve point for every group of feature points that were assigned as a group from a branch point or an end point to the next branch point or an end point (partial blood vessel forming sequence), by gradually switching from an elimination state of g rasping in perspective to an elimination state of locally grasping so that the partial blood vessel line after elimination becomes simple (smooth), as well as approximating the forms of the partial blood vessel line before elimination and the partial blood vessel line after elimination (the elimination processing from the second stage to the fourth stage).

Thereby, the control part 10 can suitably reduce data amount, without losing the meaning as identification information.

Furthermore, as preprocessing of the elimination processing (the elimination processing on the first stage), the control part 10 eliminates a curve point existing in the neighborhood of a branch point. Thereby, the situation that is the elimination processing after the second stage, it is difficult to select other curve point that should become a feature component can be prevented, and a point as a feature component of a blood vessel can be further suitably extracted.

Further, in end points, the control part 10 eliminates the end point in that the distance to a curve point connected to it is short. At the same time, in branch points on a blood vessel line, if there is a pair of partial blood vessel lines in that the intersection angle of three or the four partial blood vessel lines extending from the branch points is close to 180 degrees, the control part 10 sets a partial blood vessel forming sequence in the one pair of partial blood vessel lines as one partial blood vessel forming sequence, and eliminates one of the start point and the finish point being the end points of the original partial blood vessel forming sequence.

Thereby, the control part 10 can eliminate a feature point without changing the forms of the blood vessel lines before and after elimination. Thus, data amount can be suitably reduced without losing the meaning as identification information.

Further, as processing after the above feature point extraction processing, the control part 10 corrects the position of a feature point so that a segment connecting a feature point that was remained after the above feature point extraction processing passes through the most pixels of the original blood vessel line. Thereby, the control part 10 can make the meaning as identification information further effective.

On the other hand, as a technique for detecting a feature point in the outline, the control part 10 sets an inputted imaged image as a binary image, and sets the outline width of blood vessels in the above binary image as one pixel. Then, the control part 10 detects an end point and a branch point from the blood vessel line of which the outline width is one pixel, and also detects a curve point, for every partial blood vessel line from a branch point or an end point to the next branch point or an end point, that is, in an unbranched segment unit.

Thereby, the control part 10 can remove a component surplus on detecting a point. Therefore, a feature point can be accurately detected without using a complicated calculation technique. As a result, data amount can be suitably reduced without losing the meaning as identification information.

Figure 32:
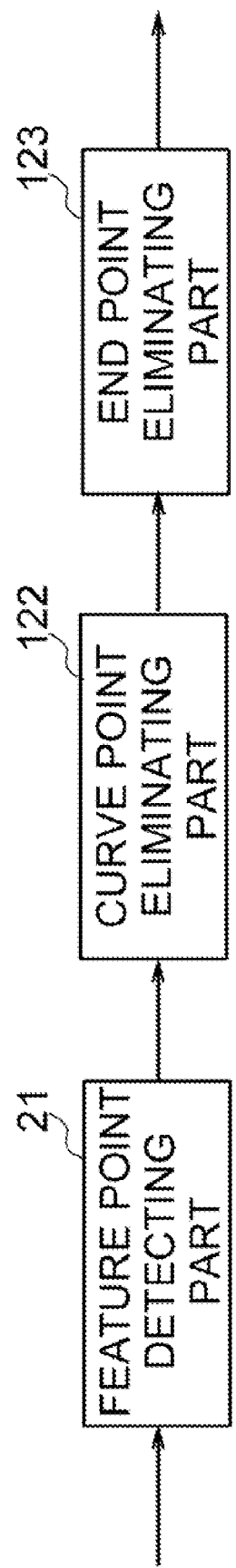
FIG. 32 is a block diagram showing the functional configuration of second feature point extraction processing.

(3) Concrete Processing Contents of Feature Point Extraction Processing According to Second Embodiment Next, concrete processing contents in second feature point extraction processing will be described. In function, as shown in FIG. 32 in that the same reference numeral is added to the corresponding part in FIG. 2, this second feature point extraction processing is formed by a feature point detecting part 21, a curve point eliminating part 122 and an end point eliminating part 123.

The second feature point extraction processing is different from the first feature point extraction processing in the point of adopting the curve point eliminating part 122 that eliminates a curve point based on the relationship between a segment connecting two feature points and an original blood vessel line from one of the feature points to the other feature point, instead of the curve point eliminating part 22 (FIG. 2) that eliminates a curve point based on the relationship between a feature point being an elimination object and a feature point connected to the feature point.

Furthermore, because the curve point eliminating part 122 corresponds to a part of the feature point correcting part 24 in the first feature point extraction processing, in the point of aiming at the relationship between a segment connecting two feature points and an original blood vessel line between these feature points. Therefore, the feature point correcting part 24 is omitted from the second feature point extraction processing.

Further, the second feature point extraction processing is different from the first feature point extraction processing, in the point of adopting the end point eliminating part 123 only for executing the end point elimination processing on the above second stage, instead of the end point eliminating part 23 (FIG. 2) that executes the end point elimination processing on the first stage and the second stage.

The above curve point eliminating part 122 and end point eliminating part 123 will be described in detail below.

(3-1) Elimination of Curve Point

The curve point eliminating part 122 eliminates a curve point as the occasion demands, by setting feature points from the start point via a curve point to the finish point in a partial blood vessel line (that is, partial blood vessel forming sequence) that have been assigned as a group by the feature point detecting part 21 as a processing unit.

Because the contents of the elimination processing of these partial blood vessel forming sequences are the same, the above contents will be described by limiting to the case where a certain partial blood vessel forming sequence is used as a processing object, with reference to FIG. 33, a square shows a pixel forming an original blood vessel line (hereinafter, this is referred to as an original blood vessel pixel), and a broken line is added to an end point and a curve point in the above original blood vessel pixels.

In feature points from the start point via a curve point to the finish point in a partial blood vessel line, until the passing rate of a segment SG ($SG_1$-$SG_3$) connecting a base point $GP_{bs}$ and a point proposed for elimination $GP_{cd}$ to original blood vessel pixels from the feature point selected as a base $GP_{bs}$ (hereinafter, this is referred to as a base point) to the point proposed for elimination $GP_{cd}$ ($GP_{cd1}$-$GP_{cd3}$) becomes smaller than a predetermines threshold value (hereinafter, this is referred to as a passing rate threshold value), the curve point eliminating part 122 sequentially obtains the passing rate by sequentially shifting the above point proposed for elimination $GP_{cd}$ to the finish end side.

Figure 33:
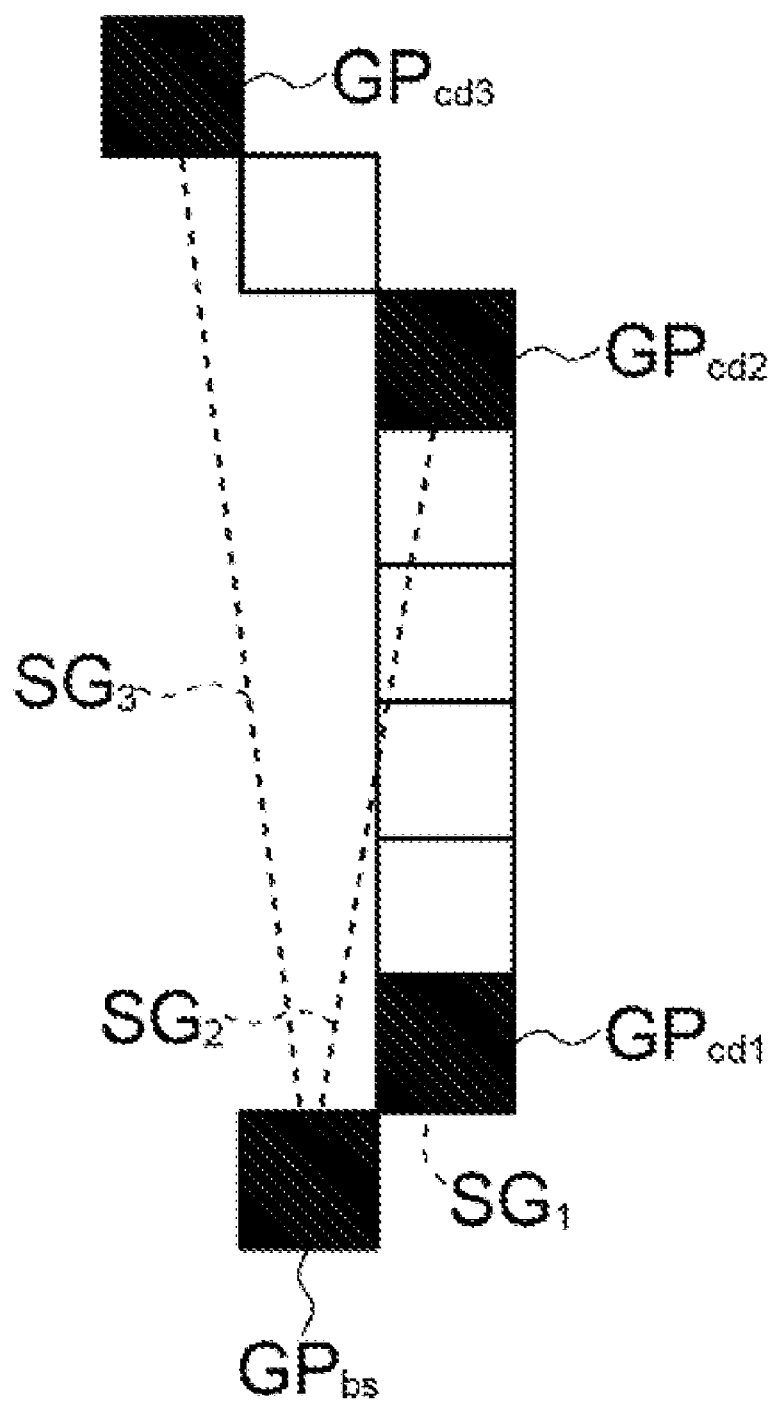
FIG. 33 is a schematic diagram for explaining the determination of the passing rate of a segment to an original blood vessel line pixel.
Figure 34A:
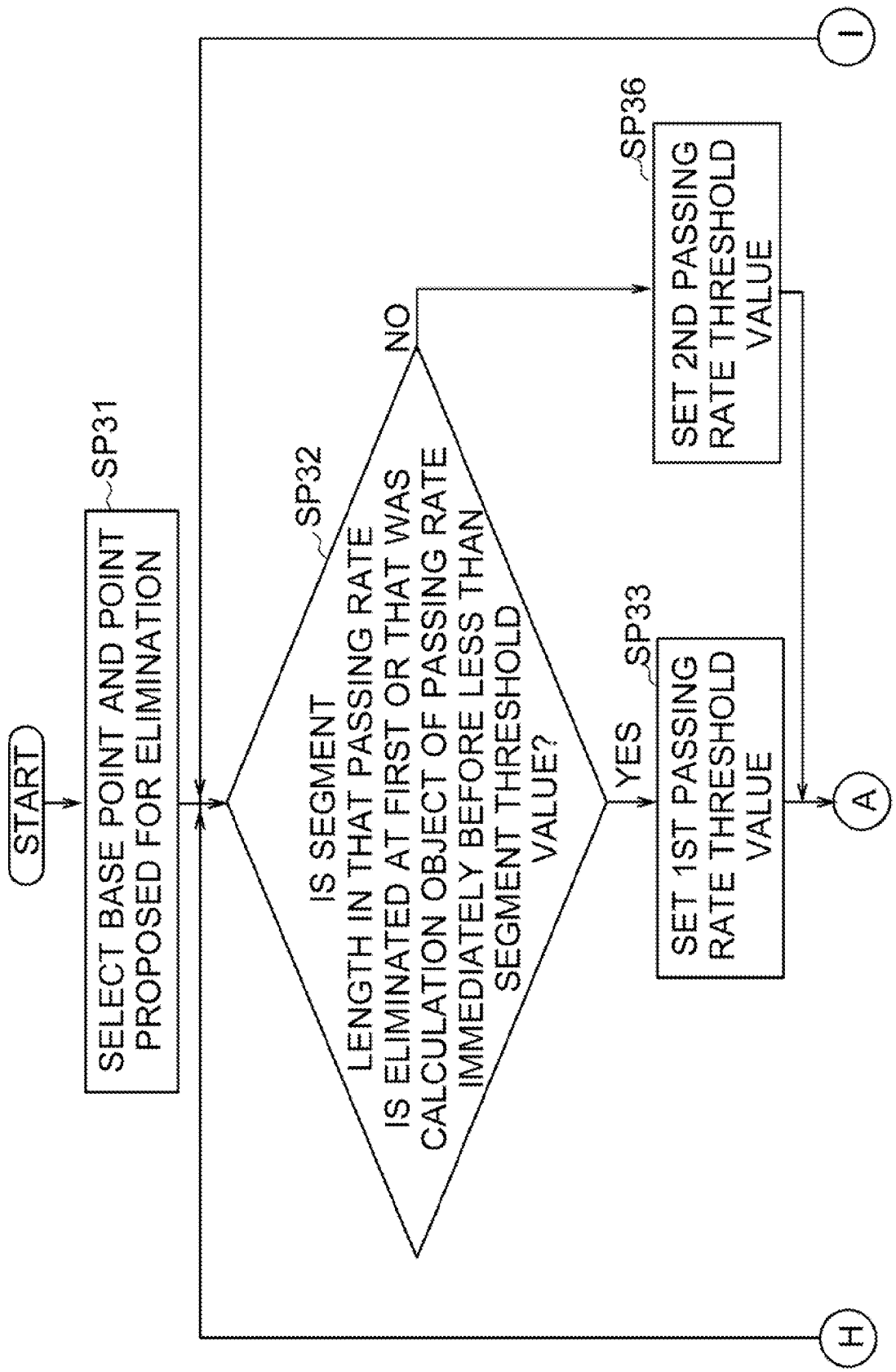
FIGS. 34A to 34D are flowcharts showing an elimination processing procedure.
Figure 34B:
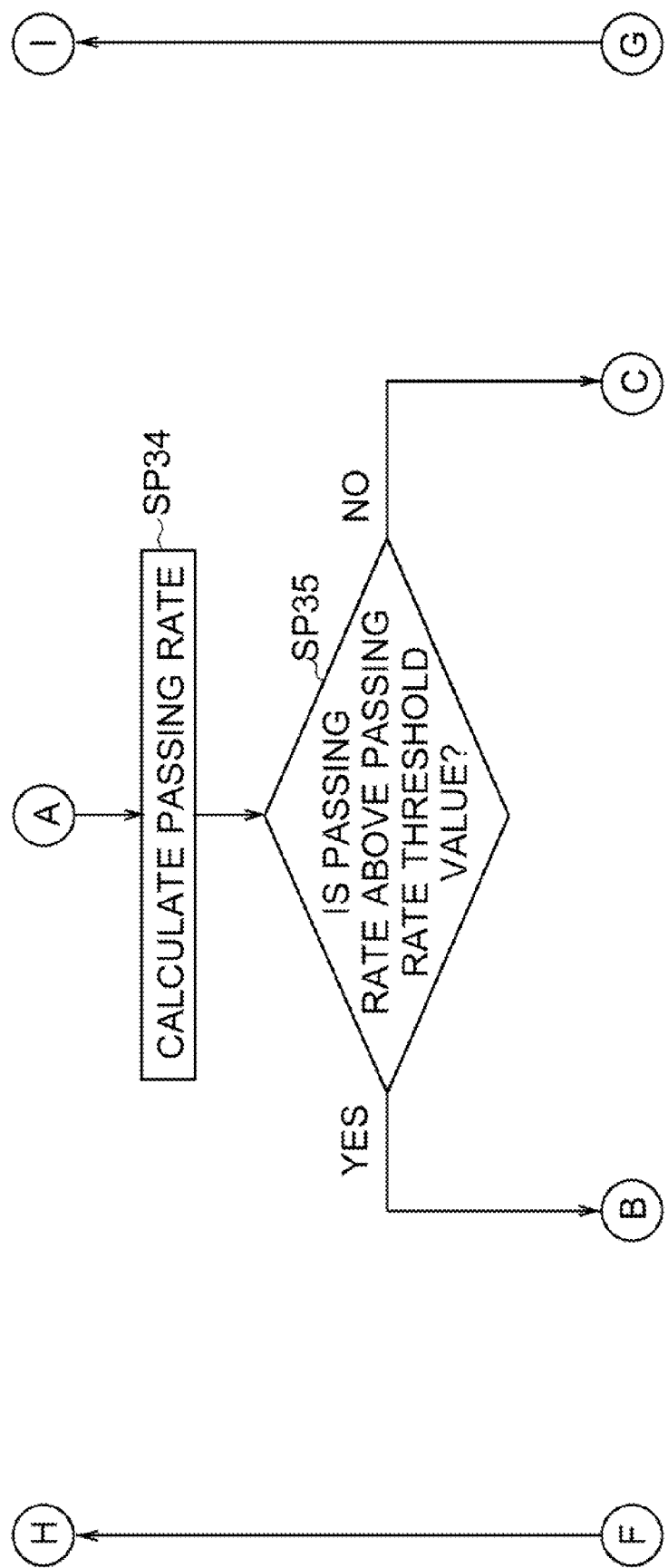
Figure 34C:
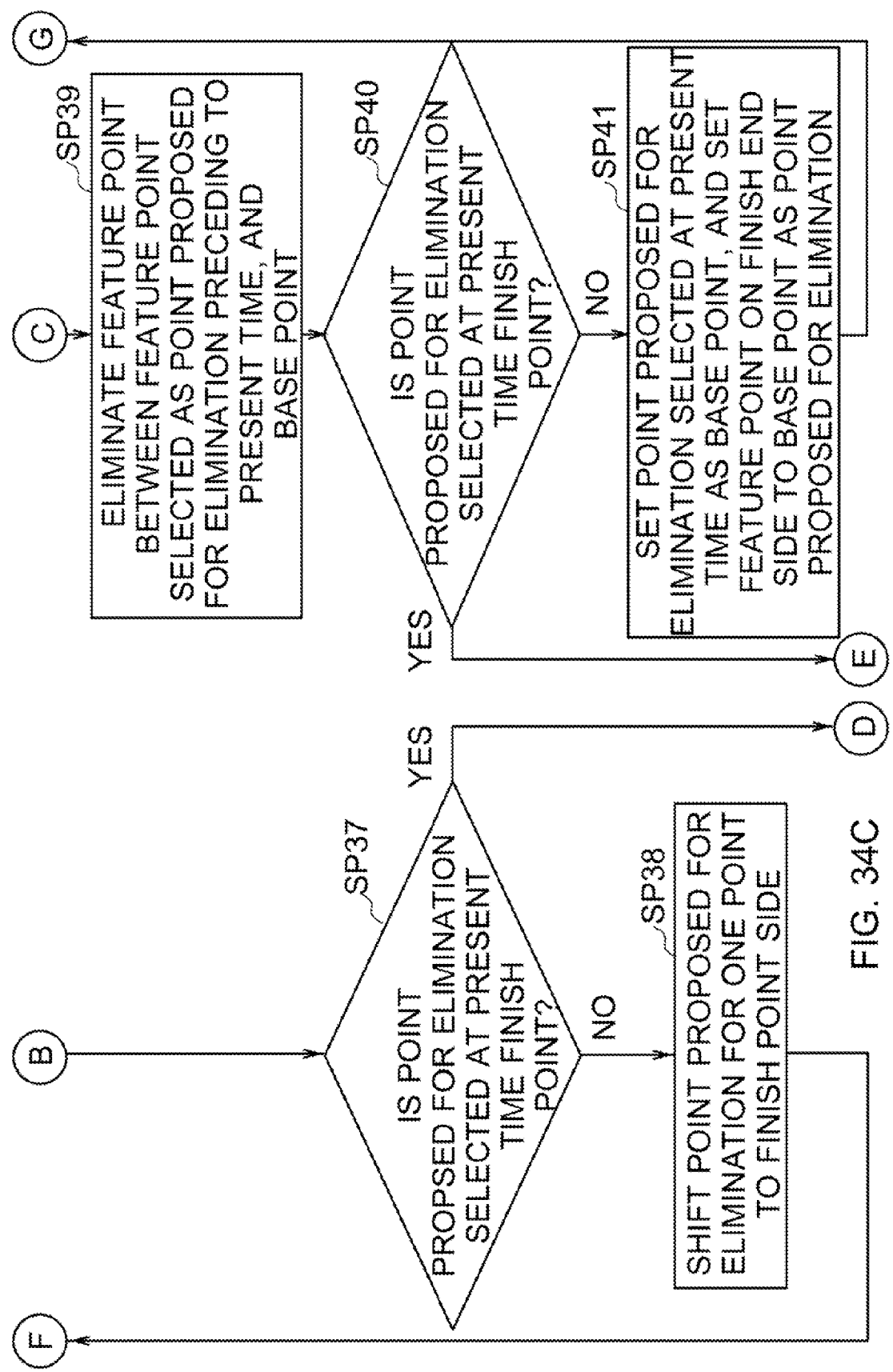
Figure 34D:
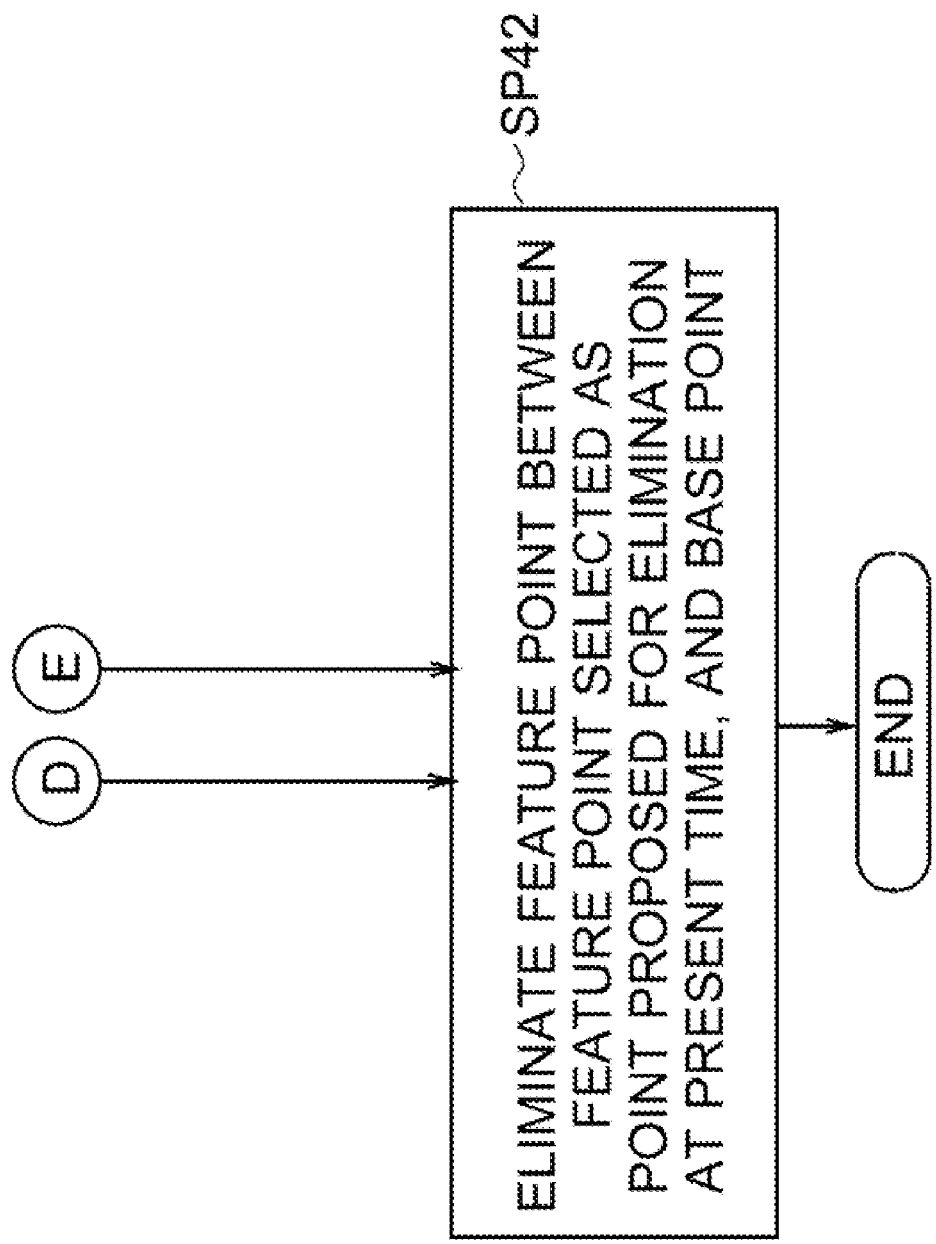

Referring to FIG. 33, the segment $SG_1$ passes through all of the original blood vessel pixels (two pixels) from the base point $GP_{bs}$ to a corresponding point proposed for elimination $GP_{cd3}$. The segment $SG_2$ passes through four pixels in the original blood vessel pixels (seven pixels) from the base point $GP_{bs}$ to the corresponding point proposed for elimination of $GP_{cd2}$. And the segment $SG_3$ passes through two pixels in the original blood vessel pixels (nine pixels) from the base point $GP_{bs}$ to the corresponding point proposed for elimination $GP_{cd2}$. In this connection, practically, the passing ratio of a segment to an original blood vessel pixel means the rate of the number of pixels overlapped to an original blood vessel pixel, to the number of pixels of original blood vessel pixels from the base point $GP_{bs}$ to the point proposed for elimination $GP_{cd}$, in the pixels forming a segment connecting the above base point $GP_{bs}$ and the point proposed for elimination $GP_{cd}$.

If the passing rate of the segment $SG_3$ to the original blood vessel pixel is smaller than the passing rate threshold value, the curve point eliminating part 122 eliminates a feature point $GP_{cd1}$ between a feature point that was selected as a point proposed for elimination $GP_{cd2}$ preceding to the feature point that was selected as the point proposed for elimination $GP_{cd3}$ at the time, and the base point $GP_{bs}$. Thereby, the feature point $GP_{cd1}$ can be eliminated, as well as approximating the segment $SG_2$ from the remained feature point $GP_{cd2}$ to the base point $GP_{bs}$ to the original blood vessel line.

Here, if the above passing rate threshold value is set to a small value, it may be caused that although the segment connecting the base point and a point proposed for elimination does not approximate to the original blood vessel pixels from the above base point to the point proposed for elimination, the feature point $GP_{cd}$ is reduced. On the contrary, if the passing rate threshold value is set to a large value, that it is difficult to eliminate the feature point $GP_{cd}$ may be caused.

Then, in this embodiment, the curve point eliminating part 122 switches the threshold value according to the segment length. Concretely, if assuming that the base point $GP_J$ (J=1, 2, ..., M (M is an integer)) and the ath point proposed for elimination from the base point as $GP_{j+a}$, in the case of obtaining the passing rate of the segment $GP_J$-$GP_{j+a}$ connecting the base point $GP_J$ and the point proposed for elimination $GP_{j+a}$ to the original blood vessel pixel, when the segment of which the passing rate was obtained immediately before that (hereinafter, this is referred to as an immediately-before segment) $GP_{J+(a-1)}$-$GP_{j+a}$ is above a predetermined threshold value (hereinafter, this is referred to as a segment threshold value), a first passing rate threshold value is set. On the contrary, when the segment length is less than the segment threshold value, a second passing rate threshold value larger than the first passing rate threshold value is set.

Thereby, a curve point can be accurately selected, by that the partial blood vessel line after elimination can be smoothed, as well as approximating the forms of the partial blood vessel line before elimination and the partial blood vessel line after elimination.

Concretely, this elimination processing of a curve point is executed in a procedure shown in flowcharts of FIGS. 34A-34D, from the start point in a partial blood vessel forming sequence. That is, the curve point eliminating part 122 selects the start point of the partial blood vessel forming sequence as a base point, and also selects the first feature point from the above base point as point proposed for elimination (step SP31).

Then, the curve point eliminating part 122 determines whether to be the case of obtaining a passing rate for the first time after started the elimination processing of a curve point, or whether the immediately-before segment $GP_{J+(a-1)}$-$GP_{j+a}$ of the segment $GP_J$-$GP_{j+a}$ connecting the base point $GP_J$ and a point proposed for elimination $GP_{j+a}$ that is a selection object at the present time is less than the segment threshold value (step SP32).

If it is in the case of obtaining the passing rate for the first time after started the elimination processing a curve point, or in the case where the immediately-before segment $GP_{J+(a-1)}$-$GP_{j+a}$ is less than the segment threshold value, the curve point eliminating part 122 sets the first passing rate threshold value as a passing rate threshold value (step SP33). And then the curve point eliminating part 122 obtains the passing rate of the segment $GP_J$-$GP_{j+a}$ connecting the base point $GP_J$ and the point proposed for elimination $GP_{j+a}$ that is a selection object at the present time, to the original blood vessel pixel (step 34), and determines whether or not this passing rate is above the first passing rate threshold value (step SP35).

On the contrary, if the number of times to obtain the passing rate is two times or more after started the elimination processing of a curve point, and if the immediately-before segment $GP_{J+(a-1)}$-$GP_{j+a}$ is above the segment threshold value, the curve point eliminating part 122 sets the second passing rate threshold value as a passing rate threshold value (step SP36). And then, the curve point eliminating part 122 obtains the passing rate of the segment $GP_J$-$GP_{j+a}$ connecting the base point $GP_J$ and the point proposed for elimination $GP_{j+a}$ that is a selection object at the present time to the original blood vessel pixel (step SP34), and determines whether or not this passing rate is above the second passing rate threshold value (step SP35).

Here, if the passing rate is above the passing rate threshold value, this means that the segment $GP_J$-$GP_{j+a}$ connecting the base point $GP_J$ being a selection object at the present time and the approximates to or the same as the original blood vessel line from the above base point $GP_J$ to the point proposed for elimination $GP_{j+a}$.

In this case, the curve point eliminating part 122 determines whether or not the point proposed for elimination $GP_{j+a}$ being a selection object at the present time is the finish point of the partial blood vessel forming sequence (step SP37). When it is not the finish point, the curve point eliminating part 122 selects a feature point on the finish point side to the feature point selected as the above point proposed for elimination $GP_{j+a}$ (step SP38), and then the curve point eliminating part 122 returns to the aforementioned processing (step SP32).

On the contrary, if the passing rate is less than the passing rate threshold value, this means that the segment $GP_J$-$GP_{j+a}$ connecting the base point $GP_J$ being the selection object at the present time and the point proposed for elimination $GP_{j+a}$ is quite different from the original blood vessel line from the above base point $GP_J$ to the point proposed for elimination $GP_{j+a}$.

In this case, the curve point eliminating part 122 eliminates all of one or more feature points between the feature point that has been selected as the point proposed for elimination $GP_{j+a}$ preceding to the present point time and the feature point that is selected as the base point $GP_j$ at the present time (step SP39).

Then, the curve point eliminating part 122 determines whether or not the point proposed for elimination $GP_{j+a}$ being the selection object at the present time is the finish point of the partial blood vessel forming sequence (step SP40). If it is not the finish point, the curve point eliminating part 122 selects the point proposed for elimination $GP_{j+a}$ being the selection object at the present time as the base point $GP_j$, and also selects the feature point on the finish point side to the base point $GP_j$ as a new point proposed for elimination $GP_{j+a}$ (step SP41). And then, the curve point eliminating part 122 returns to the aforementioned processing (step SP32).

On the contrary, if the point proposed for elimination $GP_{j+a}$ being the selection object at the present time is determined as the finish point of the partial blood vessel forming sequence (step (SP37 (Y) or step SP40 (Y)), the curve point eliminating part 122 eliminates all or one or more feature points between the feature point selected as the point proposed for elimination $GP_{j+a}$ at the present time and the feature point selected as the base point $GP_j$ at the present time (step SP42). And then, the curve point eliminating part 122 finishes the elimination processing of a curve point.

The curve point eliminating part 122 executes the elimination processing of a curve point by the above procedure. Note that, FIG. 35 shows the state before the elimination processing and after the elimination processing. FIG. 35 shows the case where the segment threshold value in the elimination processing is set to 5 mm, the first passing rate threshold value is set to 0.5 (50%), and the second passing rate threshold value is set to 0.7 (70%). In FIG. 35, a square shows an original blood vessel pixel, a circle shows a pixel forming a segment, and a broken line is added to an end point and a curve point in the original blood vessel pixel.

As also obvious from this FIG. 35, it can be found that a curve point can be accurately remained, by that the partial blood vessel line after elimination can be smoothed, as well as approximating the forms of the partial blood vessel line before elimination and the partial blood vessel line after elimination.

(3-2) Elimination of End Point

The processing is the same as the end point elimination processing on the second stage in the end point eliminating part 23 (FIG. 2). When there is a pair of partial blood vessel lines in that the intersection angle of three or four partial blood vessel lines extending from a branch point in branch points on the blood vessel line is close to 180 degrees, the end point eliminating part 123 assigns partial blood vessel forming sequences in the one pair of partial blood vessel lines as one partial blood vessel forming sequence, and eliminates one of the start point and the finish point being the end points of the original partial blood vessel forming sequence.

Concretely, as described above with reference to FIGS. 24 and 25, in the branch points on the blood vessel line, a partial blood vessel forming sequence in a pair of partial blood vessel lines satisfying the condition that the cosine of the intersection angle of partial blood vessel lines extending from the above branch point is smaller than a second cosine threshold value is set as one partial blood vessel forming sequence, and one of the start point and the finish point being the end points of the original partial blood vessel forming sequence is eliminated.

The control part 10 executes the second feature point extraction processing as the above, and stores each partial blood vessel forming sequence obtained as the processing result (feature points from the start point via a curve point to the finish point in a partial blood vessel line) in the flash memory 13 (FIG. 1) as registration data D1 (FIG. 1).

Figure 36A:
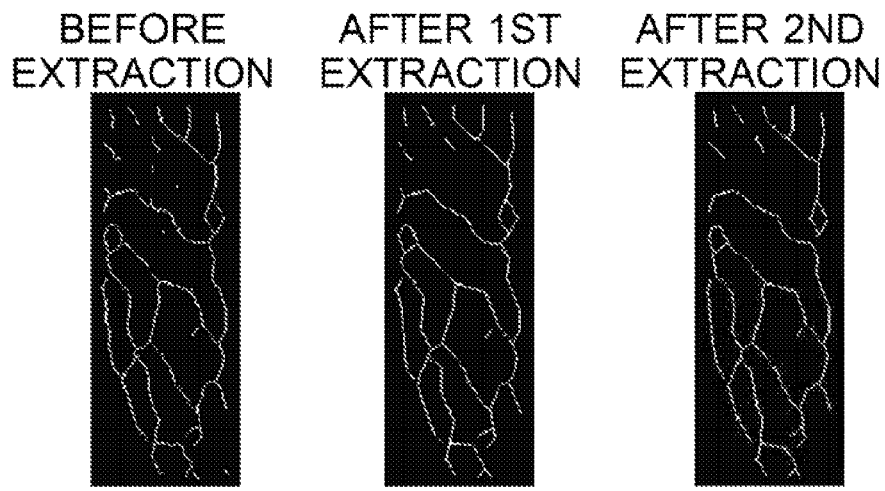
FIGS. 36A to 36C are schematic diagrams showing blood vessel images before and after feature point extraction processing (2)
Figure 36B:
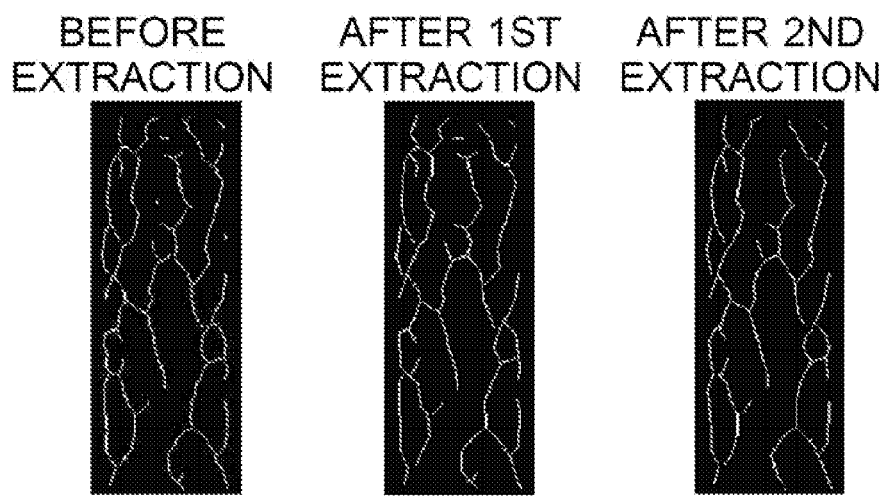
Figure 36C:
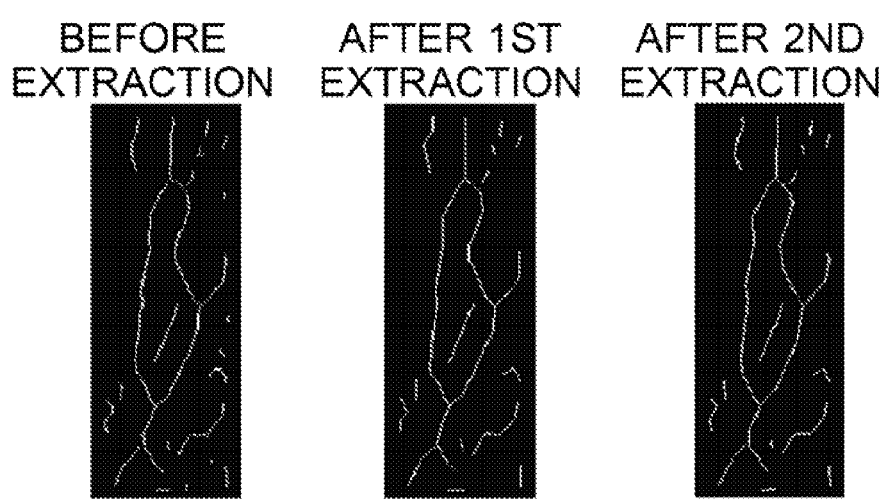

Here, FIGS. 36A to 36C show the evaluation results of this second feature point extraction processing. FIGS. 36A to 36C show three samples of blood vessel lines before the second feature point extraction processing (white part in these figures), and blood vessel lines that were restored based on feature points extracted by the first feature point extraction processing or the second feature point extraction processing (white part in these figures).

As also obvious from these FIGS. 36A to 36C, it has been suggested that a feature point was suitably extracted by the feature point extraction processing. Further, whereas the data of a feature point in the blood vessel line before the feature point extraction processing was approximately 1 kBit, the data of a feature point in the blood vessel line after the first feature point extraction processing and the second feature point extraction processing was approximately 256 Bit.

Further, time for the second feature point extraction processing was shorter 1.48 times than the first feature point extraction processing for 192 samples. This is because as processing for determining whether or not be to be a desirable curve point as an elimination object, whereas the first feature point extraction processing eliminates a curve point via a plurality of stages so as to get to the detail after further broadly grasping a partial blood vessel forming sequence, and then properly corrects the position of a remaining feature point so as to approximate to an original blood vessel line, the second feature point extraction processing eliminates a feature point other than the feature points forming a segment approximate to an original blood vessel line. The second feature point extraction processing does not eliminate a feature point via a plurality of stages, and the elimination state includes the processing corresponding to the correction in the first feature point extraction processing.

Note that, in comparison with the first feature point extraction processing, the second feature point extraction processing has some change in the forms of blood vessel lines between before and after elimination. However, it does not lose the meaning as identification information, and there is no problem in the point of aiming at suitably reducing data amount.

As also obvious from this experiment results, the control part 10 can suitably reduce information amount by the aforementioned second feature point extraction processing, at higher speed than the first feature point extraction processing.

(3-3) Conclusion

As the second feature point extraction processing as the above, the control part 10 sequentially obtains the passing rate of the segment $GP_j$-$GP_{j+a}$ connecting the base point $GP_j$ and the point proposed for elimination $GP_{j+a}$ and the point proposed for elimination $GP_{j+a}$ to the original blood vessel pixel, by sequentially shifting the above point proposed for elimination $GP_{j+a}$ to the finish point side, until the passing rate becomes smaller than the passing rate threshold value, for every feature point from a branch point or an end point to the next branch point or an end point that have been assigned as a group (partial blood vessel forming sequence) in the branch points, end points and curve points detected as the feature points of the outline.

Then, when the passing rate became smaller than the passing rate threshold value, the curve point eliminating part 122 eliminates all or one or more feature points between the feature point that was selected as the point proposed for elimination $GP_{j+a}$ preceding to the present time, and the feature point (start point) beginning selected as the base point $GP_j$ at the present time. Further, the curve point eliminating part 122 selects the point proposed for elimination $GP_{j+a}$ being the selection object at the present time as the base point $GP_j$, being the selection object at the present time as the base point $GP_j$, and sequentially shifts a feature point on the finish point side to the base point $GP_j$ as the point proposed for elimination $GP_{j+a}$, until the passing rate becomes smaller than the passing rate threshold value.

That is, the curve point eliminating part 122 eliminates a feature point that is put between the both ends in a part of the outline including at least more than three feature points were connected for every partial blood vessel forming sequence, the condition that the rate of a part overlapped to the one part of the outline in the straight lines connecting the above both ends to a part of the outline is above a predetermined threshold value, and the rate is the closest rate to the above threshold value.

Thereby, in the control part 10, the processing contents are more simple than the first feature point extraction processing (since a curve point is eliminated not via a plurality of stages, and the elimination state includes the processing corresponding to the correction in the first feature point extraction processing). Therefore, the processing can be performed at higher speed, and data mount can be reduced without losing the meaning as identification information.

Further, the control part 10 switches the above passing rate threshold value to the first passing rate threshold value, or the second passing rate threshold value larger than the first passing rate threshold value, according to the segment length of the immediately-before segment $GP_{j+(a-1)}$-$GP_{j+a}$.

Thereby, the control part 10 can be accurately remain only curve point, by that can make the partial blood vessel line after elimination can be smoothed, as well as approximating the form of the partial blood vessel line before elimination to the partial blood vessel line after elimination. Therefore, data amount can be further reduced without losing the meaning as identification information.

(4) Other Embodiments

In the aforementioned embodiment, it has dealt with the case where a blood vessel is applied as an object included in the image of input image data. However, the present invention is not only limited to this but also a bioidentification object such as a fingerprint, mouthprint and a nerve may be applied, or a picture pattern such as a map and a photograph may be applied. This means that the aforementioned processing by the control part 10 can be widely applied to various image processing such as used for preprocessing, interprocessing and postprocessing in other image processing, not only limited to image processing in biometrics authentication.

Further, in the aforementioned embodiment, it has dealt with the case where curve point elimination processing or the like is executed after setting an inputted multivalue image to a binary image, and the outline width of the outline to an object (blood vessels) included in the above binary image to one pixel. However, the present invention is not only limited to this but also curve point elimination processing or the like may be executed on a binary image or a multivalue image including the object outline having the outline width other than one pixel. Also in this case, the same effect as the aforementioned embodiment can be obtained.

Note that, whether adopting either of the aforementioned first feature point extraction processing or second feature point extraction processing can be properly selected, according to the form of an embodiment applying this image processing and a type of an object or the like. Further, the curve point elimination processing, end point elimination processing and feature point correction processing in the first feature point extraction processing, or the curve point elimination processing, and end point elimination processing the second feature point extraction processing can be properly selected, according to the form of an embodiment applying this image processing and a type of an object or the like.

Further, in the aforementioned embodiment, as feature point detection processing, it has dealt with the case where the processing having content described as to the feature point detecting part 21 is applied. However, the present invention is not only limited to this but also feature point detection processing called the Harris corner, and already-known feature point detection processing may be applied instead of this. Also in this case, as to a part of the aforementioned embodiment, the same effect can be obtained.

Further, in the aforementioned embodiment, it has dealt with the case where the feature point of a blood vessel line represented in the second dimension (xy coordinate system) (hereinafter, this is referred to as a two-dimensional blood vessel line) is extracted by the first feature point extraction processing or the second feature point extraction processing. However, the present invention is not only limited to this but also it is also possible to extract a blood vessel line represented in the three dimensions (xyz coordinate system) such as a voxel (hereinafter, this is referred to as a three-dimensional blood vessel line) by the first feature point extraction processing or the second feature point extraction processing.

However, because a three-dimensional blood vessel line is a solid image, it is necessary to change the setting of a search area to detect an end point, a branch point and a curve point in the above three-dimensional blood vessel line.

Figure 37:
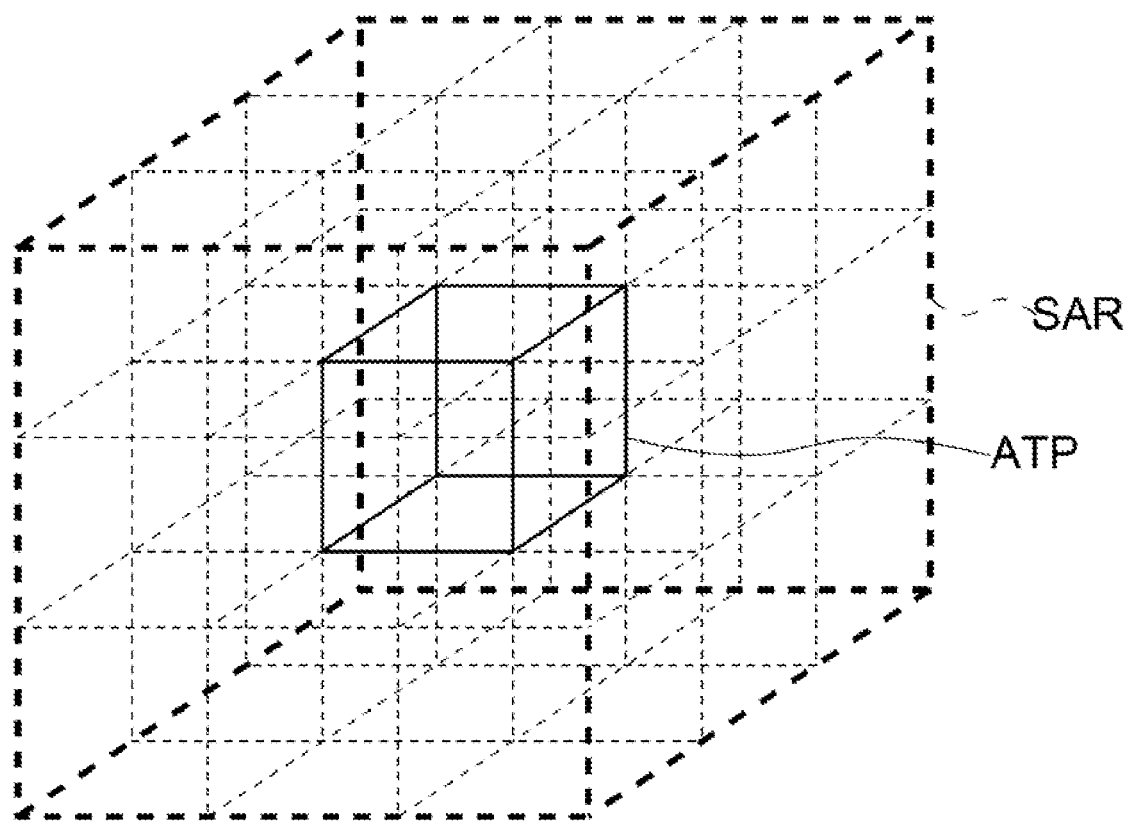
FIG. 37 is a schematic diagram for explaining a search area on the three dimensions centering a remarked pixel.

That is, in both of the case of detecting an end point and a branch point (FIGS. 4A to 4C) and the case of detecting a curve point in the above blood vessel line (FIGS. 6 and 9A-9C), a search area for a two-dimensional blood vessel line has been set as the surrounding eight pixels in the xy direction centering an aimed pixel (hereinafter, this is referred to as two-dimensional surroundings). On the other hand, as shown in FIG. 37, a search area SAR for a three-dimensional blood vessel line is set as the surrounding 26 pixels in the xyz direction centering an aimed pixel ATP (hereinafter, this is referred to as three-dimensional surroundings).

Figure 38:
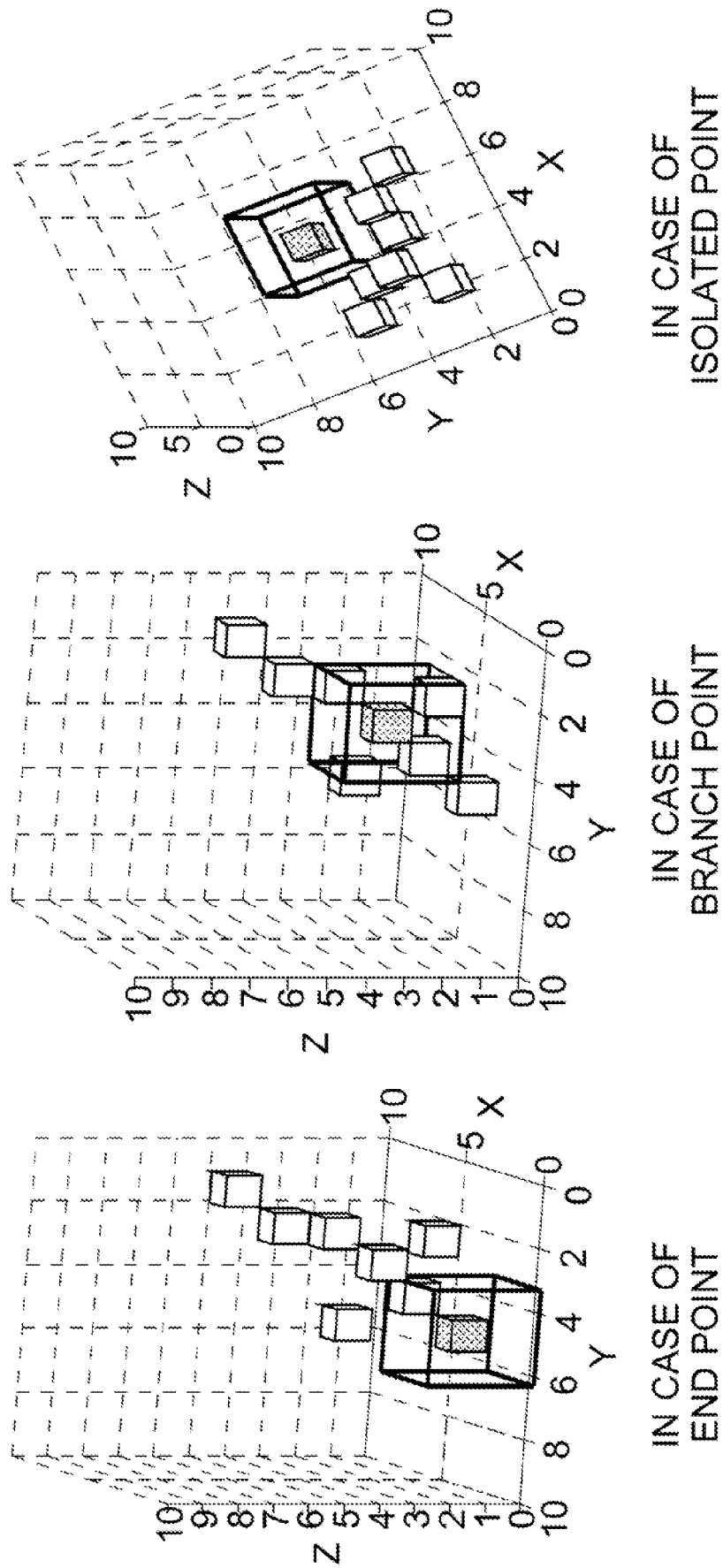
FIGS. 38A to 38C are schematic diagrams for explaining the detection of an end point, a branch point, an isolated point in a three-dimensional blood vessel line.

In this connection, in the case of detecting a feature point in a three-dimensional blood vessel line, similarly to the feature point detecting part 21 for detecting a feature point in a two-dimensional blood vessel line, on a first stage, for example, as shown in FIGS. 38A to 38C, when one pixel exists in the search area SAR centering the aimed pixel ATP (FIG. 38A), the aimed pixel ATP is detected as an end point. On the other hand, when three pixels exist in the search area SAR (FIG. 38B) or when four pixels exist (not shown), the aimed pixel ATP is detected as a branch point. And when a pixel does not exist in the search area SAR (FIG. 38C), the aimed pixel ATP is detected as an isolated point.

Figure 39:
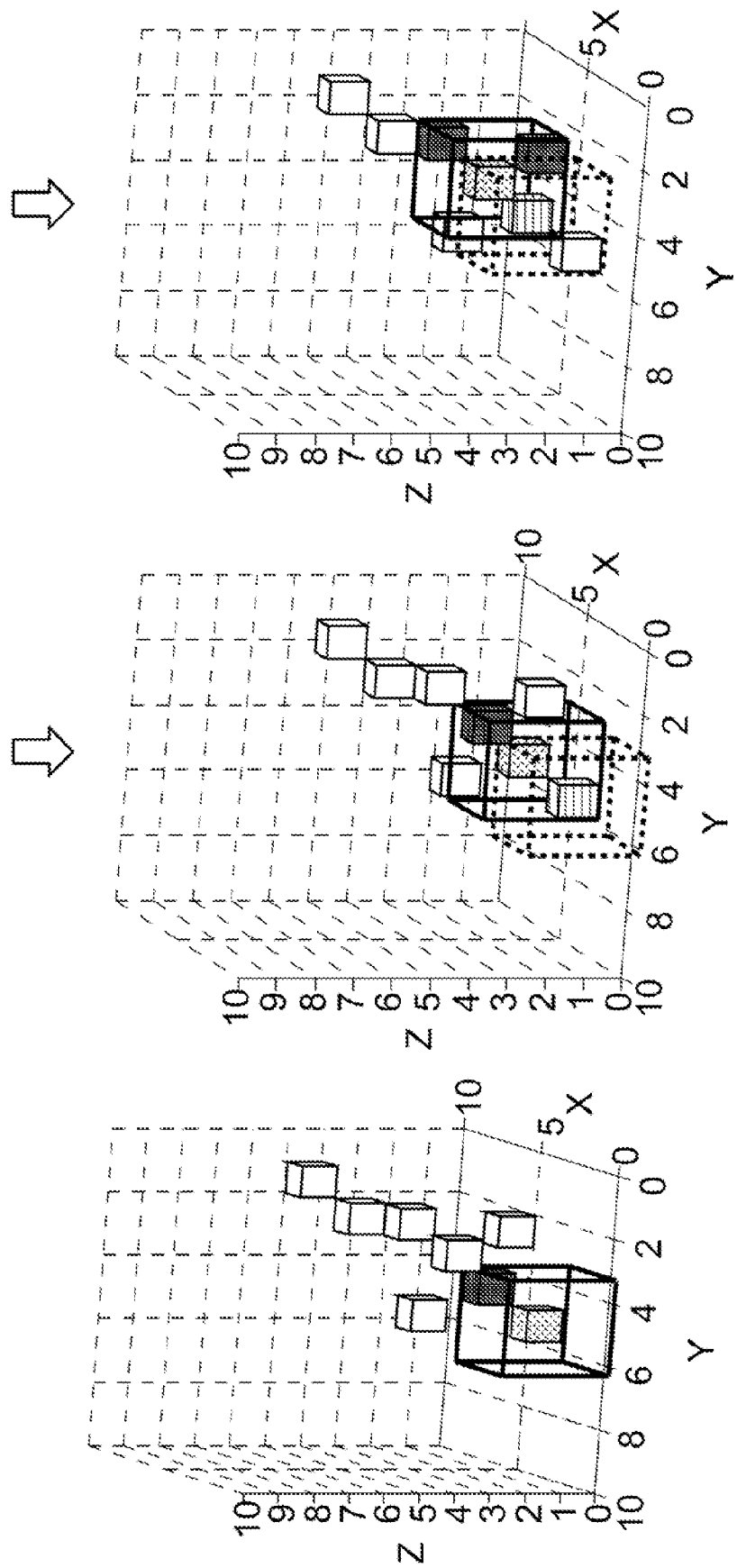
FIG. 39 is a schematic diagram for explaining the tracking of a three-dimensional blood vessel line.

Further, on a second stage, by setting the end point and branch point detected on the first stage as the start point or the finish point, a curve point in the blood vessel line from the above start point to end point (partial blood vessel line) is detected. Concretely, for example, as shown in FIG. 39, in blood vessel pixels existing in the three-dimensional surrounds (the search area SAR) of the present aimed pixel (a pixel represented by net hatching), a blood vessel pixel (a pixel represented by check hatching) except the blood vessel pixel that was set as the aimed pixel before (a pixel represented by horizontal hatching) is set as the next aimed pixel. And continuous aimed pixels are sequentially tracked from the start point, until a blood vessel pixel existing in the three-dimensional surroundings (the search area SAR) of the above present aimed pixel becomes the finish point. In this tracking process, when the linearity of the aimed pixel that is set as the next aimed pixel, the above present aimed pixel is detected as a curve point.

In this manner, by setting a search area SAR as the surrounding 26 pixels in the XYZ direction centering the aimed pixel ATP (hereinafter, this is referred to as three-dimensional surroundings), a three-dimensional blood vessel line can be extracted by the first feature point extraction processing or the second feature point extraction processing.

Note that, in the case of detecting a curve point in a two-dimensional blood vessel line, it is considered that a point on a straight line and an appearing pattern in the neighborhood of a curve point become significant, and a tracking order pattern for the pixels in the neighborhood of the aimed pixel is set according to the positional relationship between the present aimed pixel and the immediately-before aimed pixel.

Also in the case of detecting a curve point in a three-dimensional blood vessel line, a point on a straight line and an appearing pattern in the neighborhood of a curve point become significant. Therefore, the tracking order pattern is set according to the positional relationship between the present aimed pixel and the immediately-before aimed pixel. However, since a blood vessel line is a solid image, in the positional relationship between the present aimed pixel and the immediately-before aimed pixel, z direction is added in addition to xy direction (FIGS. 9A to 9C), and the number of the tracking order patterns increases. Thus, it is necessary to pay attention.

The description of concrete tracking order patterns will be omitted because the number is large. However, in the case where a z component in the position vector of the present aimed pixel to the immediately-before aimed pixel is other than "0", that is, in the case where there is a position change in the z direction between the immediately-before aimed pixel and the present aimed pixel, as shown in FIG. 40A, as a search area SAR, areas equally divided into three in the direction orthogonal to z axis $SAR_1$, $SAR_2$, $SAR_3$ are set as one group.

Figure 40B:
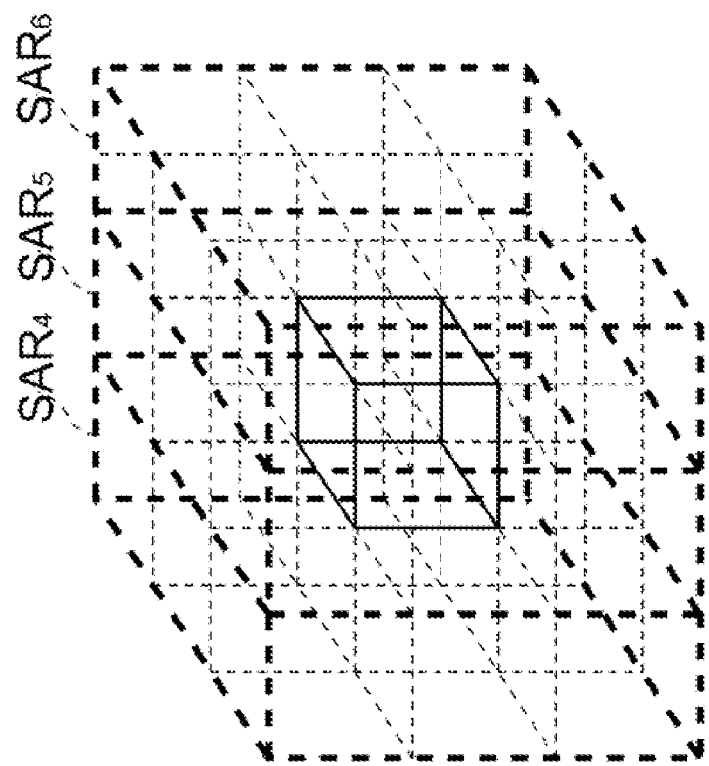
FIGS. 40A and 40B are schematic diagrams for explaining the switching of a division pattern in a search area.
Figure 40A:
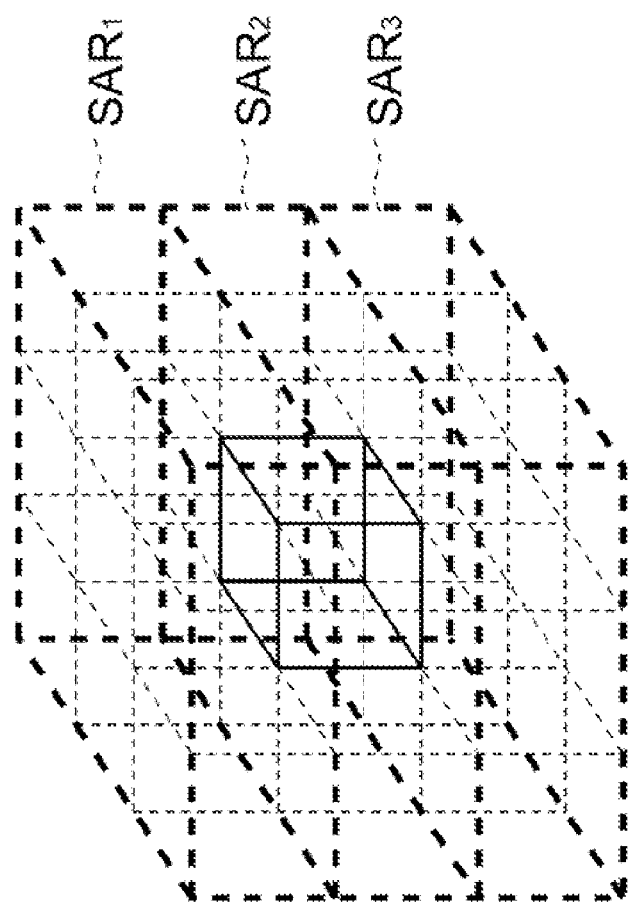

On the contrary, in the case where there is not a position change in the z direction between the immediately-before aimed pixel and the present aimed pixel, as shown in FIG. 40B, as the search area SAR, the tracking order pattern is set by setting areas equally divided into three in the direction parallel to the z axis $SAR_4$, $SAR_5$, $SAR_6$ as one group.

Because the data amount of these tracking order patterns become comparatively large, instead of storing the above tracking order patterns, in the case where there is a position change in the z direction between the immediately-before aimed pixel and the present aimed pixel, in the area that the search area SAR is equally divided into three in the direction orthogonal to the Z axis, the area $SAR_1$ or $SAR_3$ except an area including the immediately-before aimed pixel and the present aimed pixel is set as a first search area. In the case where there is not position change, in the area that the search area SAR is equally divided into three in parallel to the Z axis, a search may be performed by setting the area $SAR_5$ including the present aimed pixel as a first search area.

In this manner, by switching a pattern to divide a search area SAR according to the presence of a position change in the z direction between the immediately-before aimed pixel and the present aimed pixel, and determining an area to be first search according to the position relationship between the immediately-before aimed pixel and the present aimed pixel in each area $SAR_1$, $SAR_2$, $SAR_3$, $SAR_4$, $SAR_5$, $SAR_6$ divided by the above switched pattern, a curve point can be detected at higher speed while reducing the data amount of tracking order patterns, in comparison with the case of uniformly tracking all pixels in the three-dimensional surroundings of the above present aimed pixel.

The present invention is applicable to the field of image processing, more particularly to the case of extracting points forming a line in an image.

While there has been described in connection with the preferred embodiments of the present invention, it will be obvious to those skilled in the art that various changes, modification, combinations, sub-combinations and alternations may be aimed, therefore, to cover in the appended claims all such changes and modifications as fall within the scope of the present invention.

What is claimed is:

1. A computer-implemented image processing method, executed by a processor, for eliminating a feature point being a feature as a component of an outline, in the outline of an object included in the image of inputted image data, the method comprising:
a first step of assigning feature points including at least one of a first branch point, a first end point, a second branch point, and a second end point, from branch points, end points and curve points detected as said feature points of said outline; and
a second step of eliminating a middle feature point of three continuous feature points, the three continuous feature points including a first feature point, a second feature point, and the middle feature point located between the first and the second feature points, where the middle feature point is eliminated when the product of the vector formed by the first feature point and the middle feature point and the vector formed by the middle feature point and the second feature point is smaller than a predetermined threshold value.

2. The image processing method according to claim 1, wherein:
the second includes further includes a preprocessing step of eliminating a feature point existing in the neighborhood of said detected branch point, before eliminating the middle feature point of said three continuous feature points.

3. The image processing method according to claim 1, wherein:
the second step further includes eliminating a middle feature point when a cosine of the angle between the vector formed by the first feature point and the middle feature point and the vector formed by the middle feature point and the second feature point if smaller than a predetermined cosine threshold value.

4. The image processing method according to claim 1, including:
a step of replacing two continuous feature points when a segment connecting the continuous two feature points is smaller than a predetermined segment threshold value,
wherein the two continuous feature points are replaced by an inner dividing point located on a line connecting the two continuous feature points.

5. The image processing method according to claim 1, including:
a step of replacing two continuous feature points when:
a segment connecting the continuous two feature points is smaller than a predetermined segment threshold value, and
signs of positive and negative are the same for the product of:
a line connecting an adjacent feature point and a first feature point of the two continuous feature points, and
an other line connecting an other adjacent feature point and a second feature point of the two continuous feature points;
wherein the two continuous feature points are replaced by an inner dividing point located on a line connecting the two continuous feature points.

6. The image processing method according to claim 1, including:
the second step further includes eliminating the middle feature point when the absolute value of the product is smaller than a predetermined product threshold value.

7. The image processing method according to claim 1, including:
a step of eliminating at least one of the first and second end points when the distance to a feature point connected to at least one of the first and second end points is smaller than a predetermined distance threshold value.

8. The image processing method according to claim 1, including:
a step of assigning, after said middle feature point is eliminated, a first and a second outline segments connecting the at least two of the first branch point, the second branch point, the first end point, and the second end point,
wherein the cosine of the intersection angle of the first and second outline segments is smaller than a predetermined second cosine threshold value.

9. The image processing method according to claim 1, including:
a step of sequentially selecting, after said middle feature point is eliminated, a remaining feature point as a position change object, from two feature points forming the longest outline segment; and
a step of changing the feature point selected as said position change object to a position corresponding to a straight line that passes through the most pixels forming said outline.

10. The image processing method according to claim 1, including:
a step of replacing two continuous feature points when a segment connecting the continuous two feature points is smaller than a predetermined segment threshold value, wherein the two continuous feature points are replaced by point located at the intersection of a line that extends from an adjacent feature point through a first feature point of the two continuous feature points and, and an other line that extends from an other adjacent feature point through a second feature point of the two continuous feature points.

11. The image processing method according to claim 1, including:
a step of replacing two continuous feature points when:
a segment connecting the continuous two feature points is smaller than a predetermined segment threshold value, and
signs of positive and negative are different for the product of:
a line connecting an adjacent feature point and a first feature point of the two continuous feature points, and
an other line connecting an other adjacent feature point and a second feature point of the two continuous feature points;
wherein the two continuous feature points are replaced by point located at the intersection of a prolongation line that extends from the adjacent feature point through the first feature point and, and the other prolongation line that extends from the other adjacent feature point through the second feature point.

12. An image processing apparatus for eliminating a feature point being a component of an outline, in the outline of an object included in the image of inputted image data, comprising:
a feature point detecting unit configured to assign feature points including at least one of a first branch point, a first end point, a second branch point, and a second end point, from the branch points, end points and curve points detected as said feature points of said outline; and
a curve point eliminating part configured to eliminate the middle feature point of three continuous feature points, the three continuous feature points including a first feature point, a second feature point, and the middle feature pint located between the first and the second feature point;
wherein the middle feature point is eliminated when the product of the vector formed by the first feature point and the middle feature point and the vector formed by the middle feature point and the second feature point is smaller than a predetermined threshold value.

13. A non-transitory computer-readable storage medium comprising a program which, when executed by a computer, performs a method for making image processing means for eliminating a feature point being a component of an outline, in the outline of an object included in the image of image data stored in storing means, the method inducing:
assigning the feature points including at least one of a first branch point, a first end point, a second branch point, and a second end point, from the branch points, end points and curve points detected as said feature points of said outline; and
eliminating a middle feature point of three continuous feature points, the three continuous feature points including a first feature point, a second feature point, and the middle feature point located between the first and the second feature points, where the middle feature point is eliminated when the product of the vector formed by the first feature point and the middle feature point and the vector formed by the middle feature point and the second feature point is smaller than a predetermined threshold value.

14. A computer-implemented image processing method, executed by a processor, for eliminating a feature point being a feature as a component of an outline, in the outline of an object included in the image of inputted image data, the method comprising:
assigning the feature points including at least one of a first branch point, a second end point, a second next branch point, and a second end point, from branch points, end points and curve points detected as said feature points of said outline;
eliminating a middle feature point of a set of continuous feature points, the continuous feature points including a first feature point, a second feature point, and the middle feature point located between the first and second feature point, where the middle feature point is eliminated when the product of the vector formed by the first feature point and the middle feature point and the vector formed by the middle feature point and the second feature point is smaller than a predetermined threshold value; and
extracting at least one feature point other than the middle feature point, when two or more feature points are connected and the connected line corresponds to said outline.

* * * * *